US012648026B2

(12) United States Patent
Zhou et al.

(10) Patent No.: US 12,648,026 B2
(45) Date of Patent: Jun. 2, 2026

(54) RECEPTION OF ON-DEMAND SYSTEM INFORMATION BLOCK 1

(71) Applicant: KONINKLIJKE PHILIPS N.V., Eindhoven (NL)

(72) Inventors: Hua Zhou, Vienna, VA (US); Yunjung Yi, Vienna, VA (US); Esmael Hejazi Dinan, McLean, VA (US); Hyoungsuk Jeon, Centreville, VA (US); Muhammad Ali Kazmi, Reston, VA (US); Kyungmin Park, Vienna, VA (US); Taehun Kim, Fairfax, VA (US); Ali Cagatay Cirik, Chantilly, VA (US)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 19/372,881

(22) Filed: Oct. 29, 2025

(65) Prior Publication Data

US 2026/0122692 A1     Apr. 30, 2026

Related U.S. Application Data

(60) Provisional application No. 63/713,456, filed on Oct. 29, 2024.

(51) Int. Cl.
*H04W 4/00*          (2018.01)
*H04L 1/00*          (2006.01)
(Continued)

(52) U.S. Cl.
CPC ....... *H04W 74/0833* (2013.01); *H04L 1/0061* (2013.01); *H04W 56/0015* (2013.01); *H04W 72/231* (2023.01)

(58) Field of Classification Search
CPC ........... H04W 72/231; H04W 74/0833; H04W 56/0015; H04L 1/0061
(Continued)

(56) References Cited

U.S. PATENT DOCUMENTS

2018/0270866 A1*   9/2018   Loehr .................... H04W 72/23
2020/0245293 A1*   7/2020   Peisa .................... H04W 48/16
(Continued)

FOREIGN PATENT DOCUMENTS

WO          2025206275 A1    10/2025

OTHER PUBLICATIONS

3GPP TS 38.212 V18.3.0 (Jun. 2024); Technical Specification; 3rd Generation Partnership Project; Technical Specification Group Radio Access Network; NR; Multiplexing and channel coding (Release 18).
(Continued)

*Primary Examiner* — Temica M Beamer

(57)          ABSTRACT

A method can include receiving, by a wireless device, two search space zero information elements (IEs) of a second cell and two control resource set (coreset) zero IEs of the second cell. A first search space zero IE and a first coreset zero IE of the second cell are included in on-demand system information block 1 (OD-SIB1) request configuration IE. A second search space zero IE and a second coreset zero IE of the second cell are included in a master information block (MIB) message. The method can also include transmitting a preamble indicating a request of the OD-SIB1 of the second cell and monitoring, in response to an IE indicating a RA search space associated with the RA procedure being absent in the OD-SIB1 request configuration IE, a physical downlink control channel (PDCCH), for receiving a response corresponding to the transmitting the preamble.

20 Claims, 40 Drawing Sheets

(51) Int. Cl.
*H04W 56/00* (2009.01)
*H04W 72/231* (2023.01)
*H04W 74/0833* (2024.01)

(58) Field of Classification Search
USPC ......................................................... 370/329
See application file for complete search history.

(56) References Cited

U.S. PATENT DOCUMENTS

2021/0160926 A1* 5/2021 Tao ........................ H04W 48/12
2022/0046690 A1* 2/2022 Lee .......................... H04W 4/08
2022/0167420 A1* 5/2022 Zhang ................. H04L 41/0803
2023/0189078 A1* 6/2023 Turtinen ............... H04W 28/18
709/227
2024/0306079 A1* 9/2024 Parichehrehteroujeni ...................
H04W 74/0833

OTHER PUBLICATIONS

3GPP TS 38.213 V18.3.0 (Jun. 2024); Technical Specification; 3rd Generation Partnership Project; Technical Specification Group Radio Access Network; NR; Physical layer procedures for control (Release 18).

3GPP TS 38.214 V18.3.0 (Jun. 2024); Technical Specification; 3rd Generation Partnership Project; Technical Specification Group Radio Access Network; NR; Physical layer procedures for data (Release 18).

3GPP TS 38.304 V18.2.0 (Jun. 2024); Technical Specification; 3rd Generation Partnership Project; Technical Specification Group Radio Access Network; NR; User Equipment (UE) procedures in Idle mode and RRC Inactive state (Release 18).

3GPP TS 38.331 V18.2.0 (Jun. 2024); Technical Specification; 3rd Generation Partnership Project; Technical Specification Group Radio Access Network; NR; Radio Resource Control (RRC) protocol specification (Release 18).

R1-2407620; 3GPP TSG RAN WG1 #118bis; Hefei, China, Oct. 14-18, 2024; Agenda Item: 9.5.2; Source: Futurewei; Title: Discussion of on-demand SIB1 for idle/inactive mode UEs; Document for: Discussion and decision.

R1-2407686; 3GPP TSG-RAN WG1 Meeting #118bis; Hefei, China, Oct. 14-18, 2024; Agenda item: 9.5.2; Source: Huawei, HiSilicon; Title: Discussion on on-demand SIB1 for eNES; Document for: Discussion and Decision.

R1-2407712; 3GPP TSG RAN WG1 #118bis; Hefei, China, Oct. 14-18, 2024; Agenda Item: 9.5.2; Source: Spreadtrum Communications; Title: Discussion on on-demand SIB1 for idle/inactive mode UEs; Document for: Discussion and decision.

R1-2407739; 3GPP TSG RAN WG1 #118-bis; Hefei, China, Oct. 14-18, 2024; Agenda Item: 9.5.2; Source: China Telecom; Title: Discussion on on-demand SIB1 for idle/inactive mode UEs; Document for: Discussion and decision.

R1-2407758; 3GPP TSG RAN WG1 #118-bis; Hefei, CN, Oct. 14-18, 2024; Agenda item: 9.5.2; Source: Tejas Networks Ltd; Title: On On-demand SIB1 for IDLE/INACTIVE mode UEs; Document for: Discussion and Decision.

R1-2407793; 3GPP TSG RAN WG1 Meeting #118bis; Hefei, China, Oct. 14-18, 2024; Agenda item: 9.5.2; Source: Nokia, Nokia Shanghai Bell; Title: On-demand SIB1 for Idle/Inactive mode UEs; Document for: Discussion and Decision.

R1-2407867; 3GPP TSG RAN WG1 #118bis; Hefei, China, Oct. 14-18, 2024; Source: vivo; Title: On-demand SIB1 for idle/inactive mode UEs; Agenda Item: 9.5.2; Document for: Discussion and Decision.

R1-2407911; 3GPP TSG RAN WG1 #118-bis; Hefei, Anhui Province, China, Oct. 14-Oct. 18, 2024; Source: CMCC; Title: Discussion on on-demand SIB1 for UEs in idle/inactive mode; Agenda item: 9.5.2; Document for: Discussion & Decision.

R1-2407975; 3GPP TSG RAN WG1 #118bis; Hefei, China, Oct. 14-18, 2024; Agenda item: 9.5.2; Source: Xiaomi; Title: Discussion on on-demand SIB1 for Idle/Inactive mode UEs; Document for: Discussion.

R1-2407996; 3GPP TSG RAN WG1 #118b; Hefei, China, Oct. 14-18, 2024; Agenda Item: 9.5.2; Source: Google; Title: On-demand SIB1 for idle/inactive mode UE; Document for: Discussion/Decision.

R1-2408053; 3GPP TSG RAN WG1 #118bis; Hefei, China, Oct. 14-18, 2024; Source: CATT; Title: Discussion on on-demand SIB1; Agenda Item: 9.5.2; Document for: Discussion and Decision.

R1-2408072; 3GPP TSG RAN WG1 meeting #118bis; Hefei, China, Oct. 14-18, 2024; Title: Discussion on on-demand SIB1 for NES; Source: ZTE Corporation, Sanechips; Agenda item: 9.5.2; Document for: Discussion and decision.

R1-2408122; 3GPP TSG RAN WG1 #118bis; Hefei, China, Oct. 14-18, 2024; Source: Transsion Holdings; Title: Discussion on on-demand SIB1 transmission for idle/inactive mode UEs; Agenda item: 9.5.2; Document for: Discussion & Decision.

R1-2408133; 3GPP TSG RAN WG1 #118bis; Hefei, China, Oct. 14-18, 2024; Source: OPPO; Title: Discussion on the enhancement to support on demand SIB1 for idle/inactive mode UE; Agenda Item: 9.5.2; Document for: Discussion and Decision.

R1-2408312; 3GPP TSG RAN WG1 #118bis; Hefei, China, Oct. 14-18, 2024; Agenda Item: 9.5.2; Source: InterDigital Inc.; Title: Discussion on on-demand SIB1 for idle/inactive mode UEs; Document for: Discussion.

R1-2408321; 3GPP TSG RAN WG1 #118bis; Hefei, China, Oct. 14-18, 2024; Agenda item: 9.5.2; Source: KT Corp.; Title: Discussion on on-demand SIB1 for idle/inactive mode UEs; Document for: Discussion and decision.

R1-2408327; 3GPP TSG RAN WG1 #118bis; Hefei, China, Oct. 14-18, 2024; Agenda item: 9.5.2; Source: Lenovo; Title: On-demand SIB1 for idle/inactive mode UEs; Document for: Discussion and Decision.

R1-2408343; 3GPP TSG RAN WG1 #118bis; Hefei, China, Oct. 14-18, 2024; Agenda Item: 9.5.2; Source: Panasonic; Title: Discussion on on-demand SIB1 for idle/inactive mode UEs; Document for: Discussion/Decision.

R1-2408377; 3GPP TSG RAN WG1 #118bis; Hefei, China, Oct. 14-18, 2024; Agenda item: 9.5.2; Source: NEC; Title: Discussion on on-demand SIB1 for UEs in Idle/Inactive mode; Document for: Discussion.

R1-2408414; 3GPP TSG RAN WG1#118-bis; Hefei, China, Oct. 14-18, 2024; Agenda Item: 9.5.2; Source: Sony; Title: On-demand SIB1 for idle/inactive mode UEs; Document for: Discussion.

R1-2408474; 3GPP TSG RAN WG1 #118bis; Hefei, China, Oct. 14-18, 2024; Agenda item: 9.5.2; Source: Apple; Title: On On-demand SIB1 for Idle/Inactive mode UEs; Document for: Discussion/Decision.

R1-2408502; 3GPP TSG RAN WG1 #118bis; Hefei, China, Oct. 14-18, 2024; Agenda Item: 9.5.2; Source: Fujitsu; Title: Discussion on on-demand SIB1 transmission for network energy savings; Document for: Discussion/Decision.

R1-2408573; 3GPP TSG RAN WG1 #118bis; Hefei, China, Oct. 14-18, 2024; Source: ETRI; Title: On-demand SIB1 for idle/inactive mode UEs; Document for: Discussion/Decision.

R1-2408582; 3GPP TSG RAN WG1 Meeting #118bis; Hefei, China, Oct. 14-18, 2024; Agenda item: 9.5.2; Source: III; Title: On-demand SIB1 for Idle/Inactive mode UEs; Document for: Discussion.

R1-2408591; 3GPP TSG RAN WG1 #118-bis; Hefei, China, Oct. 14-18, 2024; Agenda item: 9.5.2; Source: Vodafone, Deutsche Telekom; Title: Views on On-demand SIB1 operation for idle/inactive UEs; Document for: Discussion.

R1-2408606; 3GPP TSG RAN WG1 #118bis; Hefei, China, Oct. 14-18, 2024; Source: Sharp; Title: Discussion on on-demand SIB1 transmission for idle UEs; Agenda Item: 9.5.2; Document for: Discussion and Decision.

R1-2408652; 3GPP TSG RAN WG1 #118bis; Hefei, Anhui, China, October 14th-Oct. 18, 2024; Agenda item: 9.5.2; Source: Samsung; Title: On-demand SIB1 for idle/inactive mode UEs; Document for: Discussion and decision.

(56)                References Cited

OTHER PUBLICATIONS

R1-2408677; 3GPP TSG RAN WG1 #118bis; Hefei, China, Oct. 14-18, 2024; Agenda Item: 9.5.2; Source: LG Electronics; Title: On-demand SIB1 for idle/inactive mode UEs; Document for: Discussion and decision.

R1-2408707; 3GPP TSG RAN WG1 #118bis; Hefei, China, Oct. 14-18, 2024; Agenda Item: 9.5.2; Source: MediaTek Inc.; Title: On-demand SIB1 for idle or inactive mode UEs; Document for: Discussion and decision.

R1-2408792; 3GPP TSG RAN WG1 #118bis; Hefei, China, Oct. 14-18, 2024; Source: NTT DOCOMO, Inc.; Title: Discussion on on-demand SIB1 for idle/inactive mode UEs; Agenda Item: 9.5.2; Document for: Discussion and Decision.

R1-2408808; 3GPP TSG-RAN WG1 Meeting #118bis; Hefei, China, Oct. 14-18, 2024; Agenda Item: 9.5.2; Source: CAICT; Title: Discussion on on-demand SIB1 in idle/inactive mode; Document for: Discussion and Decision.

R1-2408818; 3GPP TSG-RAN WG1 Meeting #118-bis; Hefei, China, Oct. 14-Oct. 18, 2024; Agenda Item: 9.5.2; Source: Ericsson; Title: On-demand SIB1 for UEs in idle/inactive mode for NES; Document for: Discussion.

R1-2408856; 3GPP TSG RAN WG1 #118bis; Hefei, China, Oct. 14-18, 2024; Agenda item: 9.5.2; Source: Qualcomm Incorporated; Title: On-demand SIB1 procedure; Document for: Discussion/Decision.

R1-2408882; 3GPP TSG RAN WG1 #118bis; Hefei, China, Oct. 14-18, 2024; Source: Denso Corporation; Title: Discussion on on-demand SIB1 for idle/inactive mode UEs; Document for: Discussion and Decision; Agenda item: 9.5.2—On-demand SIB1 for idle/inactive mode UEs.

R1-2408910; 3GPP TSG RAN WG1 #118bis; Hefei, China, Oct. 14-18, 2024; Agenda Item: 9.5.2; Source: ASUSTek; Title: Triggering of on-demand SIB1; Document for: Discussion and Decision.

R1-2408935; 3GPP TSG RAN WG1 Meeting #118b; Hefei, China, Oct. 14-Oct. 18, 2024; Agenda Item: 9.5.2; Source: CEWIT; Title: Discussion on on-demand SIB1.; Document for: Discussion.

R1-2408951; 3GPP TSG RAN WG1 Meeting #118bis; Hefei, China, Oct. 14-18, 2024; Agenda item: 9.5.2; Title: On-demand SIB1 for NES; Source: Fraunhofer IIS, Fraunhofer HHI; Document for: Discussion.

R2-2407952; 3GPP TSG-RAN WG2 Meeting #127bis; Hefei, China, Oct. 14, 2024-Oct. 18, 2024; Agenda Item: 8.5.3; Source: Xiaomi; Title: Discussion on on-demand SIB1; Document for: Discussion and decision.

R2-2407991; 3GPP TSG-RAN WG2 Meeting #127bis; Hefei, China, Oct. 14-18, 2024; Source: CATT; Title: Consideration on on-demand SIB1 issues; Agenda item: 8.5.3; Document for: Discussion and Decision.

R2-2408005; 3GPP TSG-RAN WG2 Meeting #127bis; Hefei, China, Oct. 14-18, 2024; Agenda item: 8.5.3; Title: Remaining issues of on-demand SIB1 in idle and inactive mode; Source: ZTE Corporation, Sanechips; Document for: Discussion and Decision.

R2-2408086; 3GPP TSG-RAN WG2 Meeting #127bis; Hefei, China, Oct. 14-18, 2024; Agenda Item: 8.5.3; Source: CMCC; Title: Discussion on on-demand SIB1; Document for: Discussion.

R2-2408101; 3GPP TSG-RAN WG2 Meeting #127bis; Hefei, China, Oct. 14-Oct. 18, 2024; Source: vivo; Title: Discussion on on-demand SIB1 for RRC Idle and Inactive UE; Agenda Item: 8.5.3; Document for: Discussion and Decision.

R2-2408173; 3GPP TSG-RAN WG2 Meeting #127-bis; Hefei, China, Oct. 14-18, 2024; Agenda Item:8.5.3; Source: Spreadtrum Communications; Title: Discussion on on-demand SIB1 for NES; Document for: Discussion and Decision.

R2-2408241; 3GPP TSG-RAN WG2 Meeting #127bis; Hefei, China, Oct. 14-18, 2024; Agenda item: 8.5.3; Source: Sharp; Title: Discussion on on-demand SIB1; Document for: Discussion and Decision.

R2-2408274; 3GPP RAN WG2 Meeting #127bis; Hefei, China, Oct. 14-18, 2024; Agenda Item: 8.5.3; Source: Honor; Title: Discussion on on-demand SIB1 for NES; Document for: Discussion and Decision.

R2-2408294; 3GPP TSG-RAN WG2 Meeting #127bis; Hefei, China, Oct. 14-18, 2024; Agenda item: 8.5.3; Source: Samsung; Title: On-demand SIB1; Document for: Discussion and decision.

R2-2408386; 3GPP TSG-RAN WG2 #127-bis; Hefei, China, Oct. 14-18, 2024; Agenda Item: 8.5.3; Source: Ericsson; Title: Discussion on on-demand SIB1 for NES; Document for: Discussion, Decision.

R2-2408410; 3GPP TSG-RAN WG2 #127-bis; Hefei, China, Oct. 14-18, 2024; Source: Fujitsu; Agenda Item: 8.5.3; Title: Discussion on on-demand SIB1 procedure for NES; Document for: Discussion and decision.

R2-2408445; 3GPP TSG-RAN2 Meeting #127bis; Hefei, China, Oct. 14-18, 2024; Source: Huawei, HiSilicon; Title: Discussion on on-demand SIB1 operation for NES; Agenda Item: 8.5.3; Document for: Discussion and decision.

R2-2408454; 3GPP TSG-RAN2 Meeting #127bis; Hefei, China, Oct. 14-18, 2024; Source: Vodafone, Deutsche Telekom; Title: Barring and SIB1-less case 2; Document for: Decision; Agenda Item: 8.5.3.

R2-2408461; 3GPP TSG-RAN WG2 Meeting#127bis; Hefei, China, Oct. 14-18, 2024; Agenda item: 8.5.3; Source: Google; Title: Open issues for the on-demand SIB1 transmission; Document for: Discussion and Decision.

R2-2408561; 3GPP TSG RAN WG2 Meeting #127b; Hefei, China, Oct. 14-18, 2024; Agenda item: 8.5.3; Source: Apple; Title: Discussion on on-demand SIB1; WID/SID: Netw_Energy_NR_enh-Core-Release 19; Document for: Discussion and Decision.

R2-2408600; 3GPP TSG-RAN WG2 #127bis; Hefei, China, Oct. 14-18, 2024; Agenda item: 8.5.3 On-demand SIB1; Title: Discussion on On-demand SIB1 signalling details; Source: NEC; Document for: Discussion and Decision.

R2-2408606; 3GPP TSG-RAN WG2 Meeting #127; Hefei, CN, Oct. 14-18, 2024; Source: KDDI Corporation; Title: Discussion on Random access procedure for On-demand SIB1; Tdoc Type: Discussion; Agenda Item: 8.5.3 On-demand SIB1; Document for: Discussion; Release: Rel-19.

R2-2408641; 3GPP TSG-RAN WG2 Meeting #127bis; Hefei, China, Oct. 14, 2024-Oct. 18, 2024; Agenda item: 8.5.3; Source: Lenovo; Title: Remaining essential issues; Document for: Discussion and Decision.

R2-2408677; 3GPP TSG RAN WG2 Meeting #127bis; Hefei, China, Oct. 14-18, 2024; Agenda item: 8.5.3; Source: III; Title: On-demand SIB1 for Idle/Inactive mode UEs; Document for: Discussion.

R2-2408713; 3GPP TSG-RAN WG2 Meeting #127bis; Hefei, China, Oct. 14-18, 2024; Agenda Item: 8.5.3; Source: Sony; Title: On-demand SIB1 for Idle/Inactive UEs; Document for: Discussion.

R2-2408771; 3GPP TSG-RAN WG2 Meeting #127bis; Hefei, China, Oct. 14-18, 2024; Agenda Item:8 .5.3; Source: LG Electronics Inc.; Title: On-demand transmission of SIB1; Document for: Discussion and Decision.

R2-2408772; 3GPP TSG-RAN WG2 Meeting #127bis; Hefei, China, Oct. 14-18, 2024; Agenda Item: 8.5.3; Source: OPPO; Title: Consideration on on-demand SIB1; Document for: Discussion, Decision.

R2-2408786; 3GPP TSG RAN WG2 Meeting #127bis; Hefei, China, Oct. 14-18, 2024; Agenda item: 8.5.3; Source: Qualcomm Incorporated; Title: Discussion on On-demand SIB1; WID/SID: Netw_Energy_NR_enh-CORE—Release 19; Document for: Discussion.

R2-2408865; 3GPP TSG-RAN WG2 Meeting #R2-127bis; Hefei, China, Oct. 14-18, 2024; Agenda Item: 8.5.3; Source: Rakuten; Title: Detection and access of NES cells with OD-SIB1; Document for: Discussion and decision.

R2-2408866; 3GPP TSG-RAN WG2 Meeting #R2-127bis; Hefei, China, Oct. 14-18, 2024; Agenda Item: 8.5.3; Source: Rakuten; Title: Discussion on on-demand SIB1 for NES; Document for: Discussion and decision.

(56) References Cited

OTHER PUBLICATIONS

R2-2408902; 3GPP TSG-RAN WG2 Meeting #127Bis; Hefei, China, Oct. 14-18, 2024; Agenda Item: 8.5.3; Source: InterDigital; Title: On-demand SIB1 request and reception; Document for: Decision.

R2-2409087; 3GPP TSG-RAN WG2 Meeting #127bis; Hefei, China, Oct. 14-18, 2024; Agenda item: 8.5.2; Source: Nokia, Nokia Shanghai Bell; Title: On-demand SIB1 for Idle/Inactive mode UEs; WID/SID: Netw_Energy_NR_enh; Document for: Discussion and Decision.

R2-2409144; 3GPP TSG RAN WG2 Meeting #127bis; Hefei, China, Oct. 14-18, 2024; Agenda item: 8.5.3; Title: Discussion on On-demand SIB1 for NES; Source: Fraunhofer IIS, Fraunhofer HHI; Document for: Discussion.

R2-2409156; 3GPP TSG-RAN WG2 Meeting #127bis; Hefei, China, Oct. 14-18, 2024; Agenda Item: 8.5.3; Source: CEWIT; Title: On-demand SIB1 for Idle/Inactive UEs; Document for: Discussion.

Extended European Search Report mailed Apr. 13, 2026 in EP Patent Application No. 25211936.7.

R1-2409014; 3GPP TSG RAN WG1 #118bis; Hefei, China, Oct. 14-18, 2024; Source: Moderator (MediaTek); Title: FL summary 3 for on-demand SI81 in idle/inactive mode; Agenda item: 9.5.2; Document for: Discussion and Decision.

R2-2406346; 3GPP TSG-RAN WG2 Meeting #127; Maastricht, Netherlands, Aug. 19-23, 2024; Agenda Item: 8.5.3; Source: Samsung; Title: On-demand SIB1; Document for: Discussion and decision.

* cited by examiner

IP Packets

Figure 6:
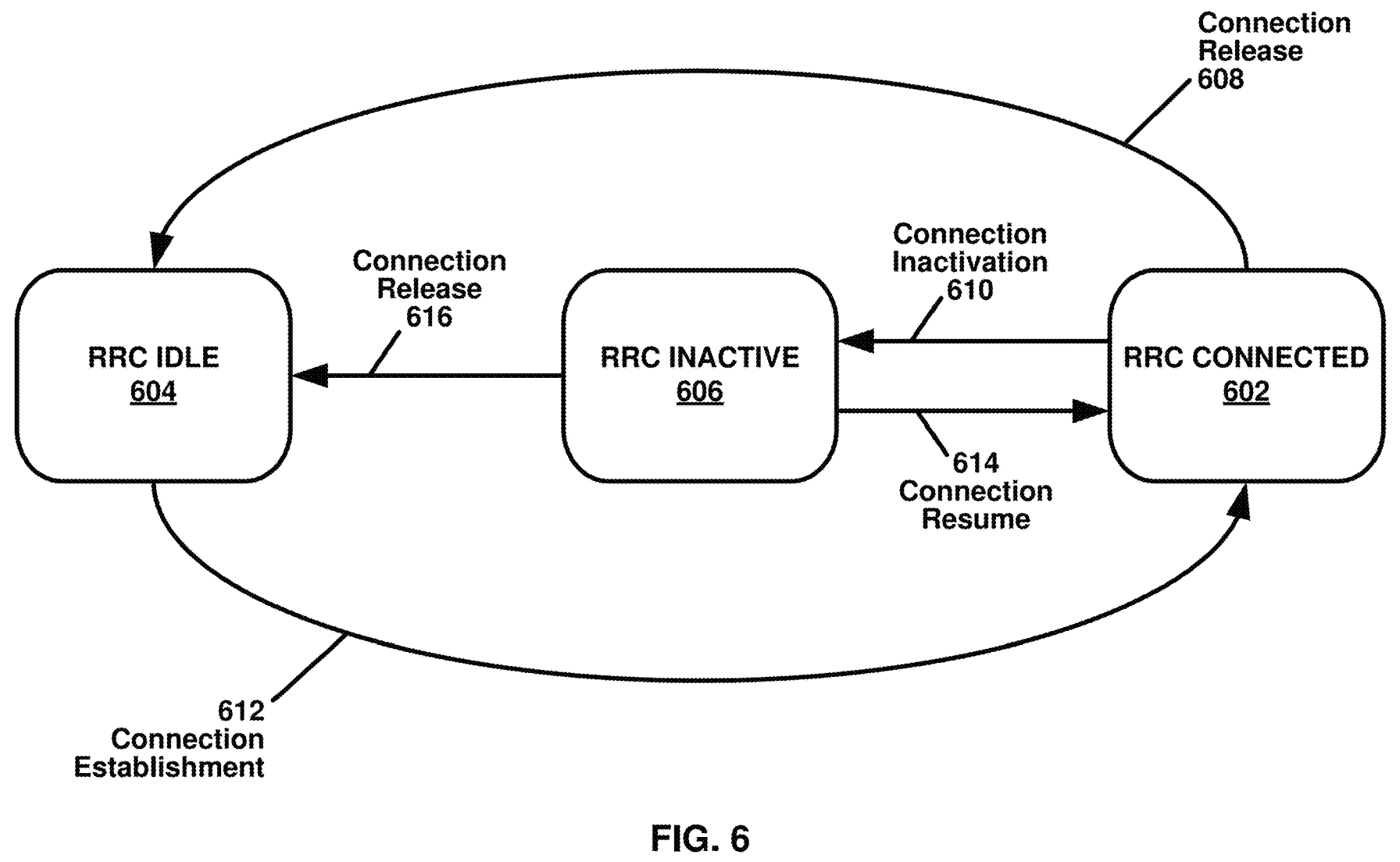

Connection Release 608

RRC CONNECTED 602

Connection Inactivation 610

614 Connection Resume

RRC INACTIVE 606

Connection Release 616

612 Connection Establishment

RRC IDLE 604

Resource Element (RE)
1 Symbol x 1 Subcarrier

Resource Block (RB)
12 Subcarriers

One Slot (14 Symbols)

NR Carrier Bandwidth
(Up to 3300 Subcarriers)

Time

Frequency

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 19

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 20

Oct 1

| DCI format | Usage |
|---|---|
| 0_0 | Scheduling of PUSCH in one cell |
| 0_1 | Scheduling of one or multiple PUSCH in one cell, or indicating CG-DFI for configured grant PUSCH |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 2_7 | Notifying Paging early indication and TRS availability indication for one or more UEs |
| 3_0 | Scheduling of NR sidelink in one cell |
| 3_1 | Scheduling of LTE sidelink in one cell |
| 4_0 | Scheduling of PDSCH with CRC scrambled by MCCH-RNTI/G-RNTI for broadcast |
| 4_1 | Scheduling of PDSCH with CRC scrambled by G-RNTI/G-CS-RNTI for multicast |
| 4_2 | Scheduling of PDSCH with CRC scrambled by G-RNTI/G-CS-RNTI for multicast |

FIG. 23

```
MIB ::=                      SEQUENCE {
    systemFrameNumber              BIT STRING (SIZE (6)),
    subCarrierSpacingCommon          ENUMERATED {scs15or60, scs30or120},
    ssb-SubcarrierOffset         INTEGER (0..15),
    dmrs-TypeA-Position            ENUMERATED {pos2, pos3},
    pdcch-ConfigSIB1             PDCCH-ConfigSIB1,
    cellBarred                 ENUMERATED {barred, notBarred},
    intraFreqReselection           ENUMERATED {allowed, notAllowed},
    spare                   BIT STRING (SIZE (1))}

PDCCH-ConfigSIB1 ::=             SEQUENCE {
    controlResourceSetZero         ControlResourceSetZero,
    searchSpaceZero             SearchSpaceZero}
```

FIG. 24A

| Index | SS/PBCH block and CORESET multiplexing pattern | Number of RBs per coreset | Number of Symbols per coreset | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| ... | ... | ... | ... | ... |

FIG. 24B

| Index | $O$ | Number of search space sets per slot | $M$ | First symbol index |
|---|---|---|---|---|
| 0 | 0 | 1 | 1 | 0 |
| 1 | 0 | 2 | 1/2 | {0, if $i$ is even}, {$N$, if is odd} |
| 2 | 2 | 1 | 1 | 0 |
| 3 | 2 | 2 | 1/2 | {0, if $i$ is even}, {$N$, if $i$ is odd} |
| 4 | 5 | 1 | 1 | 0 |
| 5 | 5 | 2 | 1/2 | {0, if $i$ is even}, $N$, if $i$ is odd |
| 6 | 7 | 1 | 1 | 0 |
| 7 | 7 | 2 | 1/2 | {0, if $i$ is even}, {$N$, if $i$ is odd} |
| ... | ... | ... | ... | ... |

FIG. 24C

```
SIB1 ::=        SEQUENCE {
   cellSelectionInfo            SEQUENCE {
      q-RxLevMin                   Q-RxLevMin,
      q-RxLevMinOffset             INTEGER (1..8) ...}
   cellAccessRelatedInfo        CellAccessRelatedInfo,
   connEstFailureControl        ConnEstFailureControl
   si-SchedulingInfo            SI-SchedulingInfo
   servingCellConfigCommon         ServingCellConfigCommonSIB
   ims-EmergencySupport         ENUMERATED {true}
   eCallOverIMS-Support         ENUMERATED {true}
   ue-TimersAndConstants        UE-TimersAndConstants
   uac-BarringInfo              SEQUENCE { ...}
   useFullResumeID              ENUMERATED {true}
   lateNonCriticalExtension     OCTET STRING
   nonCriticalExtension         SIB1-v16xy-IEs  }

ServingCellConfigCommonSIB ::=       SEQUENCE {
   downlinkConfigCommon            DownlinkConfigCommonSIB,
   uplinkConfigCommon              UplinkConfigCommonSIB
   supplementaryUplink             UplinkConfigCommonSIB
   n-TimingAdvanceOffset           ENUMERATED { n0, n25600, n39936 }
   ssb-PositionsInBurst            SEQUENCE {
      inOneGroup                   BIT STRING (SIZE (8)),
      groupPresence                BIT STRING (SIZE (8)) },
   ssb-PeriodicityServingCell      ENUMERATED {ms5, ms10, ms20, ms40, ms80, ms160},
   tdd-UL-DL-ConfigurationCommon      TDD-UL-DL-ConfigCommon
   ss-PBCH-BlockPower              INTEGER (-60..50),
   ...,}

DownlinkConfigCommonSIB ::=     SEQUENCE {
   frequencyInfoDL              FrequencyInfoDL-SIB,
   initialDownlinkBWP           BWP-DownlinkCommon,
   bcch-Config                  BCCH-Config,
   pcch-Config                  PCCH-Config, ...}

PCCH-Config ::=        SEQUENCE {
   defaultPagingCycle              PagingCycle,
   nAndPagingFrameOffset           CHOICE {
      oneT                         NULL,
      halfT                        INTEGER (0..1), ...},
   ns                           ENUMERATED {four, two, one},
   firstPDCCH-MonitoringOccasionOfPO   CHOICE {
      sCS15KHZoneT      SEQUENCE (SIZE (1..maxPO-perPF)) OF INTEGER (0..139),...}
   ...,
   [[   nrofPDCCH-MonitoringOccasionPerSSB-InPO-r16  INTEGER (2..4) ]]
}
```

FIG. 25

```
BWP-DownlinkCommon ::=          SEQUENCE {
    genericParameters           BWP,
    pdcch-ConfigCommon              SetupRelease { PDCCH-ConfigCommon }
    pdsch-ConfigCommon              SetupRelease { PDSCH-ConfigCommon }
    ...}

PDCCH-ConfigCommon ::=          SEQUENCE {
    controlResourceSetZero          ControlResourceSetZero
    commonControlResourceSet         ControlResourceSet
    searchSpaceZero             SearchSpaceZero
    commonSearchSpaceList           SEQUENCE (SIZE(1..4)) OF SearchSpace
    searchSpaceSIB1             SearchSpaceId
    searchSpaceOtherSystemInformation  SearchSpaceId
    pagingSearchSpace               SearchSpaceId
    ra-SearchSpace              SearchSpaceId
    [[
    firstPDCCH-MonitoringOccasionOfPO   CHOICE {
        sCS15KHZoneT    SEQUENCE (SIZE (1..maxPO-perPF)) OF INTEGER (0..139),
        ...
    }OPTIONAL    -- Cond OtherBWP
    ]]
    ...,}

PDCCH-ServingCellConfig ::=     SEQUENCE {
    slotFormatIndicator             SetupRelease { SlotFormatIndicator }...,
    [[
    availabilityIndicator-r16       SetupRelease {AvailabilityIndicator-r16}
    searchSpaceSwitchTimer-r16      INTEGER (1..80)
    ]]
}

SearchSpaceSwitchConfig-r16 ::=     SEQUENCE {
    cellGroupsForSwitchList-r16     SEQUENCE(SIZE (1..4)) OF CellGroupForSwitch-r16
    searchSpaceSwitchDelay-r16      INTEGER (10..52)
}
CellGroupForSwitch-r16 ::= SEQUENCE(SIZE (1..16)) OF ServCellIndex ControlResourceSet ::=          SEQUENCE {
    controlResourceSetId            ControlResourceSetId,
    frequencyDomainResources        BIT STRING (SIZE (45)),
    duration                INTEGER (1..maxCoReSetDuration),
    cce-REG-MappingType             CHOICE {
        interleaved             SEQUENCE {
            reg-BundleSize          ENUMERATED {n2, n3, n6},
            interleaverSize         ENUMERATED {n2, n3, n6},
            shiftIndex          INTEGER(0..maxNrofPhysicalResourceBlocks-1)},
        nonInterleaved          NULL},
    precoderGranularity             ENUMERATED {sameAsREG-bundle, allContiguousRBs},
    pdcch-DMRS-ScramblingID         INTEGER (0..65535)
    ..., }
```

FIG. 26

```
SearchSpace ::=                        SEQUENCE {
    searchSpaceId                      SearchSpaceId,
    controlResourceSetId               ControlResourceSetId
    monitoringSlotPeriodicityAndOffset CHOICE {
        sl1                            NULL,
        sl2                            INTEGER (0..1),...}
    duration                           INTEGER (2..2559)
    monitoringSymbolsWithinSlot        BIT STRING (SIZE (14))
    nrofCandidates                     SEQUENCE {
        aggregationLevel1              ENUMERATED {n0, n1, n2, ... n8},
        aggregationLevel2              ENUMERATED {n0, n1, n2, ... n8},
    ...}
    searchSpaceType                    CHOICE {
        common                         SEQUENCE {
            dci-Format0-0-AndFormat1-0     SEQUENCE {...}
            dci-Format2-0                  SEQUENCE {
                nrofCandidates-SFI             SEQUENCE {
                    aggregationLevel1              ENUMERATED {n1, n2}
                    aggregationLevel2              ENUMERATED {n1, n2}...},
            ...}
            dci-Format2-1                  SEQUENCE {...}
    ...
        },
        ue-Specific                    SEQUENCE {
            dci-Formats        ENUMERATED {formats0-0-And-1-0, formats0-1-And-1-1},
            ...,}
        }
    }
}

SearchSpaceExt-r16 ::=                 SEQUENCE {
    controlResourceSetId-r16           ControlResourceSetId-r16
    searchSpaceType-r16                SEQUENCE {
        common-r16                     SEQUENCE {
            dci-Format2-4-r16              SEQUENCE {
                nrofCandidates-CI-r16          SEQUENCE {
                    aggregationLevel1-r16          ENUMERATED {n1, n2}...},...}
            dci-Format2-5-r16             SEQUENCE {
                nrofCandidates-IAB-r16         SEQUENCE {
                    aggregationLevel1-r16          ENUMERATED {n1, n2}...},...}
            dci-Format2-6-r16            SEQUENCE {...}
        ...}
    }
    searchSpaceGroupIdList-r16     SEQUENCE (SIZE (1.. 2)) OF INTEGER (0..1)
    freqMonitorLocations-r16          BIT STRING (SIZE (5))
}

SearchSpaceSwitchTrigger-r16 ::=  SEQUENCE {
    servingCellId-r16              ServCellIndex,
    positionInDCI-r16
INTEGER(0..maxSFI-DCI-PayloadSize-1)
}
```

FIG. 27

| SCS | OFDM starting Symbols of the candidate SSBs | fc<=3GHz, Lmax=4 | 3GHz<fc<=6GHz, Lmax=8 | fc>6GHz, Lmax=64 |
|---|---|---|---|---|
| CaseA: 15 KHz | {2,8}+14n | n=0,1 | n=0,1,2,3 | Not Applicable (NA) |
| CaseB: 30 KHz | {4,8,16,20}+28n | n=0 | n=0,1 | NA |
| CaseC: 30 KHz | {2,8}+14n | n=0,1 | n=0,1,2,3 | NA |
| CaseD: 120 KHz | {4,8,16,20}+28n | NA | NA | n=0,1,2,3,5,6,7,8,10,11,12,13,15,16,17,18 |
| CaseE: 240 KHz | {8,12,16,20,32,36,40,44} + 56n | NA | NA | n=0,1,2,3,5,6,7,8 |

FIG. 28

Example parameters of SSB transmission:
- SCS: 15KHz
- Frequency: 3GHz<fc<=6GHz
- Maximum Number of SSBs in SS burst (Lmax=8)
- SSB starting symbol indexes: 2, 8, 16, 22, 30, 36, 44, 50

PSS   PBCH   SSS

FIG. 32

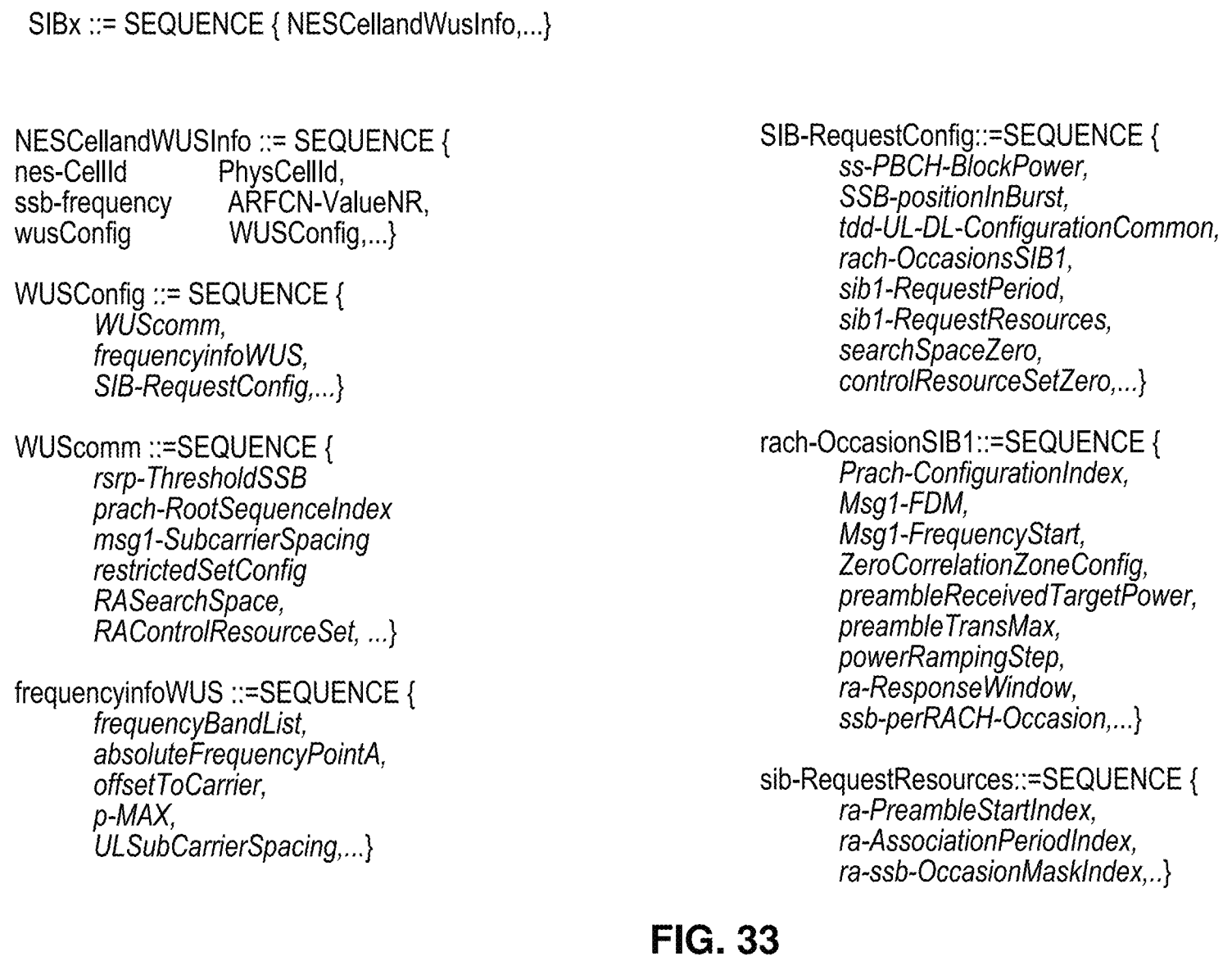

SIBx ::= SEQUENCE { NESCellandWusInfo,...}

NESCellandWUSInfo ::= SEQUENCE {
nes-CellId        PhysCellId,
ssb-frequency     ARFCN-ValueNR,
wusConfig         WUSConfig,...}

WUSConfig ::= SEQUENCE {
      WUScomm,
      frequencyinfoWUS,
      SIB-RequestConfig,...}

WUScomm ::=SEQUENCE {
      rsrp-ThresholdSSB
      prach-RootSequenceIndex
      msg1-SubcarrierSpacing
      restrictedSetConfig
      RASearchSpace,
      RAControlResourceSet, ...} frequencyinfoWUS ::=SEQUENCE {
      frequencyBandList,
      absoluteFrequencyPointA,
      offsetToCarrier,
      p-MAX,
      ULSubCarrierSpacing,...}

SIB-RequestConfig::=SEQUENCE {
      ss-PBCH-BlockPower,
      SSB-positionInBurst,
      tdd-UL-DL-ConfigurationCommon,
      rach-OccasionsSIB1,
      sib1-RequestPeriod,
      sib1-RequestResources,
      searchSpaceZero,
      controlResourceSetZero,...} rach-OccasionSIB1::=SEQUENCE {
      Prach-ConfigurationIndex,
      Msg1-FDM,
      Msg1-FrequencyStart,
      ZeroCorrelationZoneConfig,
      preambleReceivedTargetPower,
      preambleTransMax,
      powerRampingStep,
      ra-ResponseWindow,
      ssb-perRACH-Occasion,...} sib-RequestResources::=SEQUENCE {
      ra-PreambleStartIndex,
      ra-AssociationPeriodIndex,
      ra-ssb-OccasionMaskIndex,...}

FIG. 33

1st Control resource set configured for RAR

2nd Control resource set configured for SIB1

| Index | SS/PBCH block and CORESET multiplexing pattern | Number of RBs per coreset | Number of Symbols per coreset | Offset (RBs) |
|-------|------|------|------|------|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| ... | ... | ... | ... | ... |

FIG. 36A

1st Search space configured for RAR

2nd Search space configured for SIB1

| Index | O | Number of search space sets per slot | M | First symbol index |
|-------|---|------|------|------|
| 0 | 0 | 1 | 1 | 0 |
| 1 | 0 | 2 | 1/2 | {0, if $i$ is even}, {$N$, if is odd} |
| 2 | 2 | 1 | 1 | 0 |
| 3 | 2 | 2 | 1/2 | {0, if $i$ is even}, {$N$, if $i$ is odd} |
| 4 | 5 | 1 | 1 | 0 |
| 5 | 5 | 2 | 1/2 | {0, if $i$ is even}, $N$, if $i$ is odd |
| 6 | 7 | 1 | 1 | 0 |
| 7 | 7 | 2 | 1/2 | {0, if $i$ is even}, {$N$, if $i$ is odd} |
| ... | ... | ... | ... | ... |

FIG. 36B

RECEPTION OF ON-DEMAND SYSTEM INFORMATION BLOCK 1

CROSS-REFERENCE TO RELATED APPLICATIONS

This application claims the benefit of U.S. Provisional Application No. 63/713,456, filed Oct. 29, 2024, which is hereby incorporated by reference in its entirety.

BRIEF DESCRIPTION OF THE DRAWINGS

Examples of several of the various embodiments of the present disclosure are described herein with reference to the drawings.

FIG. 6 is an example diagram showing RRC state transitions of a UE.

FIG. 7 illustrates an example configuration of an NR frame into which OFDM symbols are grouped.

FIG. 18A and FIG. 18B illustrate aspects of example embodiments according to the present disclosure.

FIG. 19 illustrates an aspect of an example embodiment according to the present disclosure.

FIG. 20 illustrates an aspect of an example embodiment according to the present disclosure.

FIG. 23 illustrates an aspect of an example embodiment according to the present disclosure.

FIG. 24A, FIG. 24B, and FIG. 24C illustrate aspects of example embodiments according to the present disclosure.

FIG. 25 illustrates an aspect of an example embodiment according to the present disclosure.

FIG. 26 illustrates an aspect of an example embodiment according to the present disclosure.

FIG. 27 illustrates an aspect of an example embodiment according to the present disclosure.

FIG. 28 illustrates an aspect of an example embodiment according to the present disclosure.

FIG. 32 illustrates an aspect of an example embodiment according to the present disclosure.

FIG. 33 illustrates an aspect of an example embodiment according to the present disclosure.

FIG. 36A and FIG. 36B illustrate aspects of example embodiments according to the present disclosure.

DETAILED DESCRIPTION

Figures 1A, 1B:
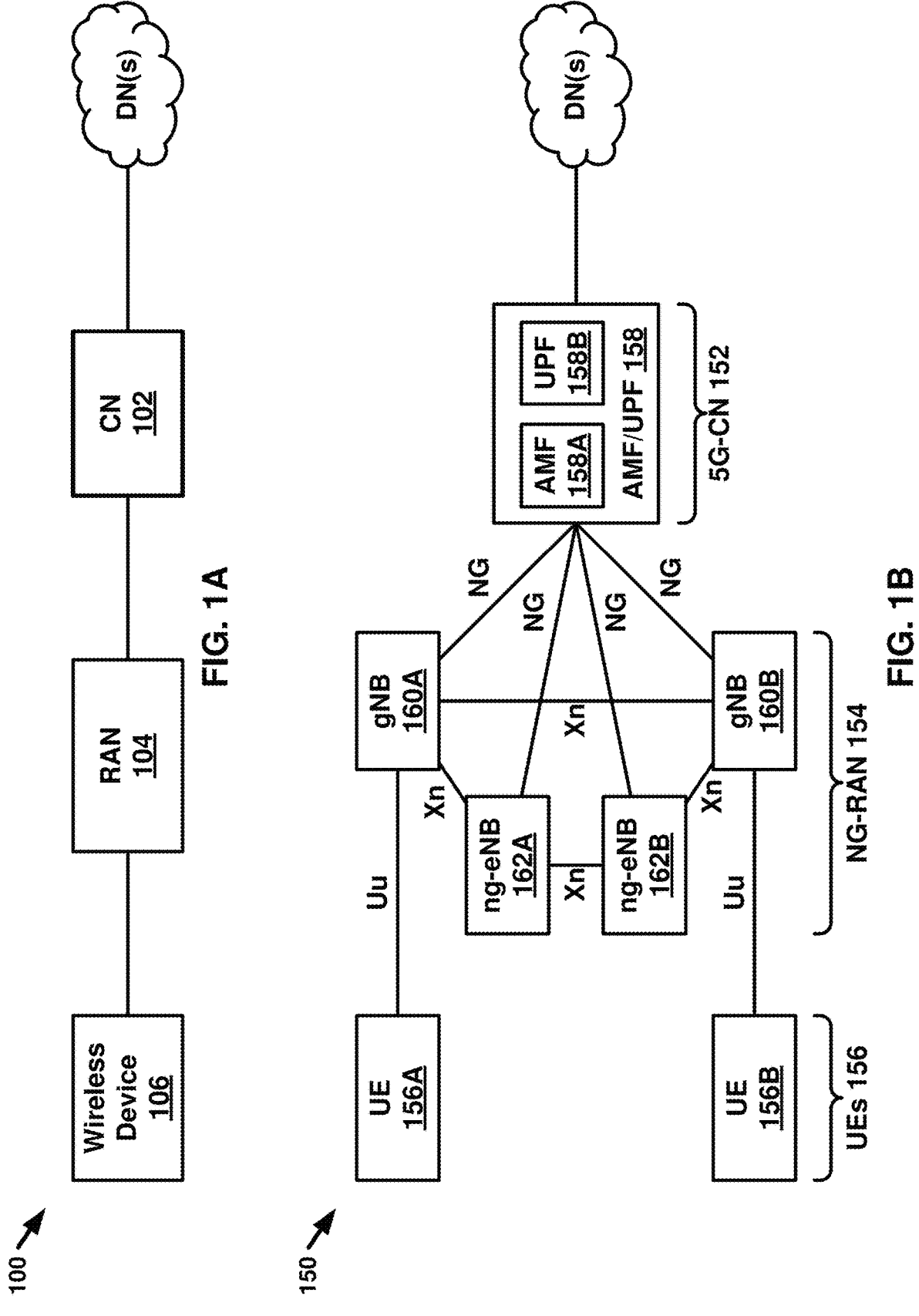
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that affect or implement the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g., hardware with a biological element), or a combination thereof, which may be behaviorally equivalent. For example, modules may be implemented as a software routine written in a computer language configured to be executed by a hardware machine (such as C, C++, Fortran, Java, Basic, MATLAB or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNS (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle roadside unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, Wi-Fi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNS (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNS, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
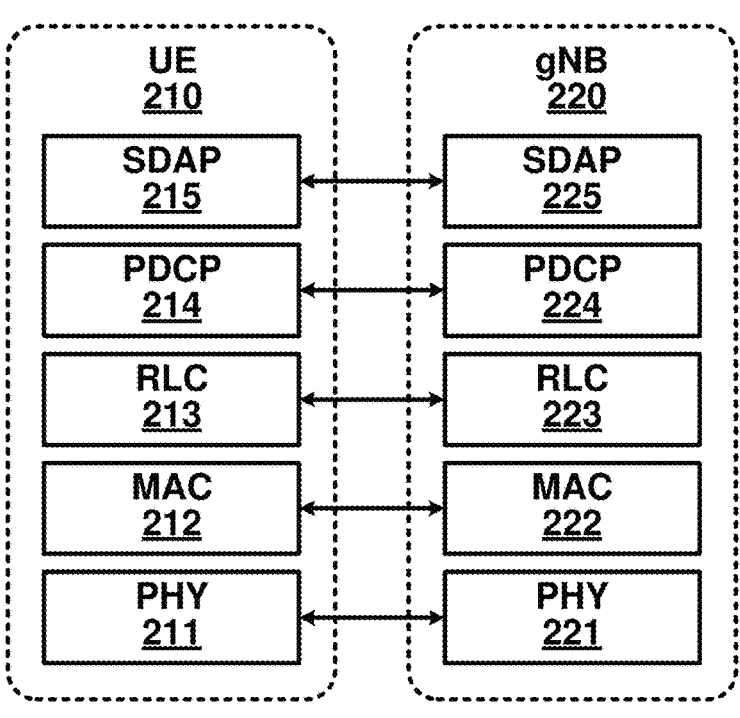
FIG. 2A and FIG. 2B respectively illustrate a New Radio (NR) user plane and control plane protocol stack.
Figure 2B:
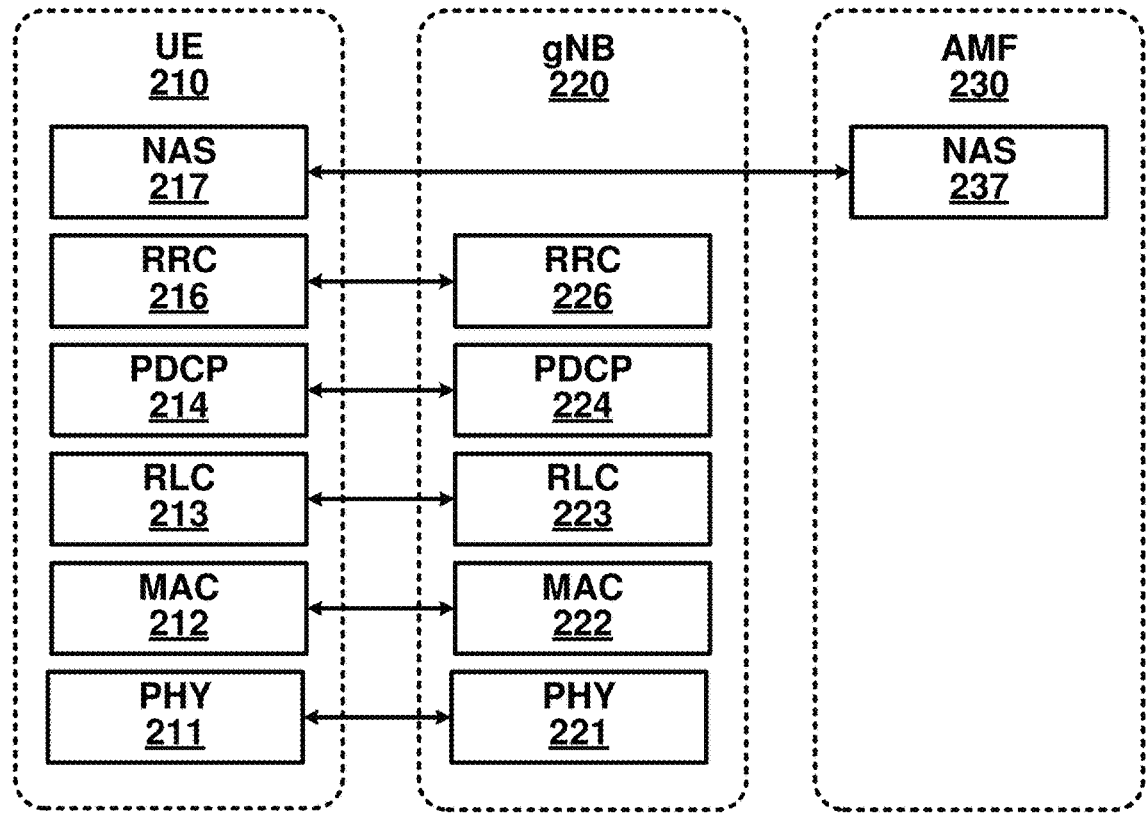

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
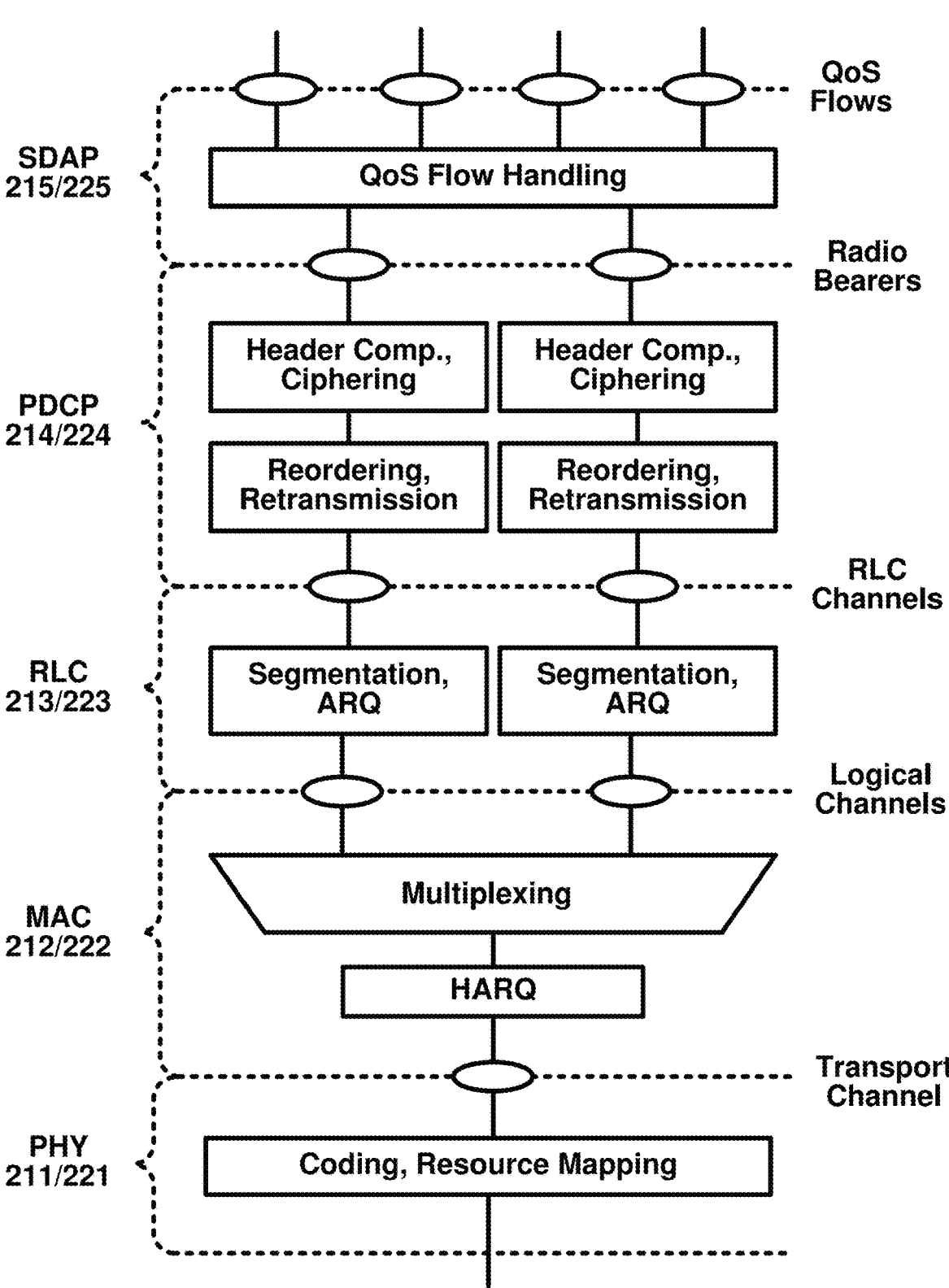
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYS 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
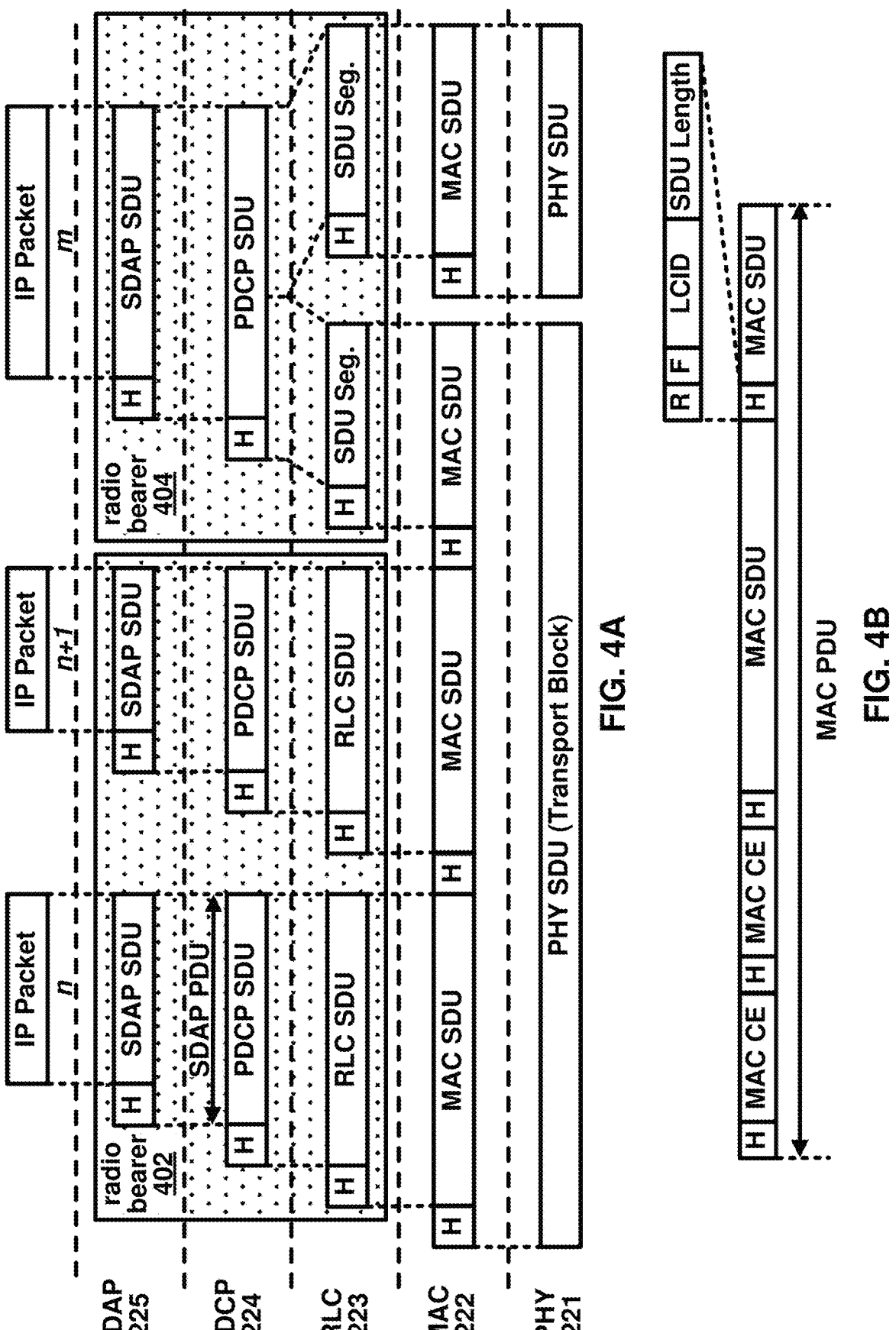
FIG. 4A illustrates an example downlink data flow through the NR user plane protocol stack of FIG. 2A.
FIG. 4B illustrates an example format of a MAC subheader in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG.

4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 212 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
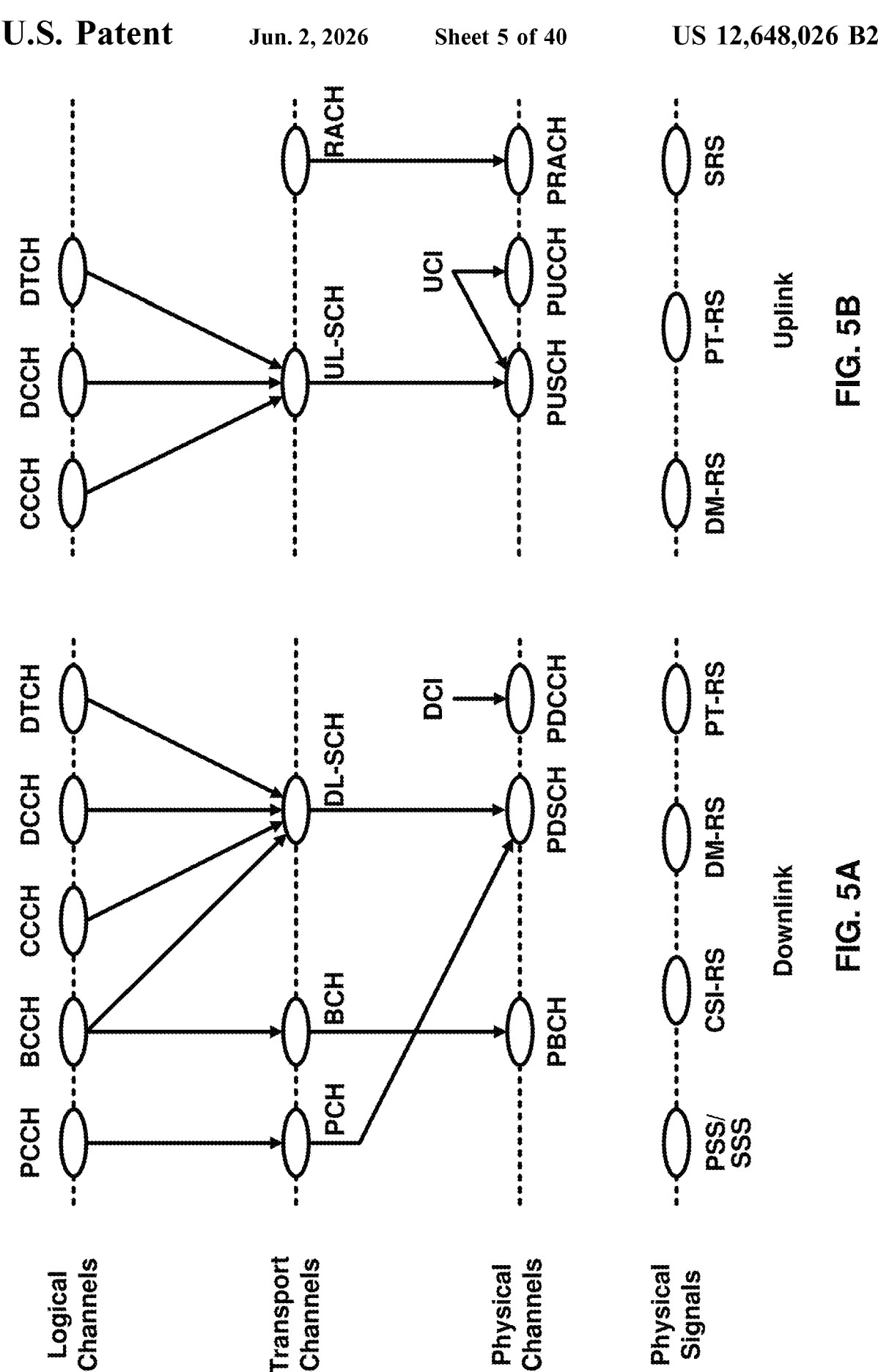
FIG. 5A and FIG. 5B respectively illustrate a mapping between logical channels, transport channels, and physical channels for the downlink and uplink.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR includes, for example:

a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR includes, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR includes, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split into two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
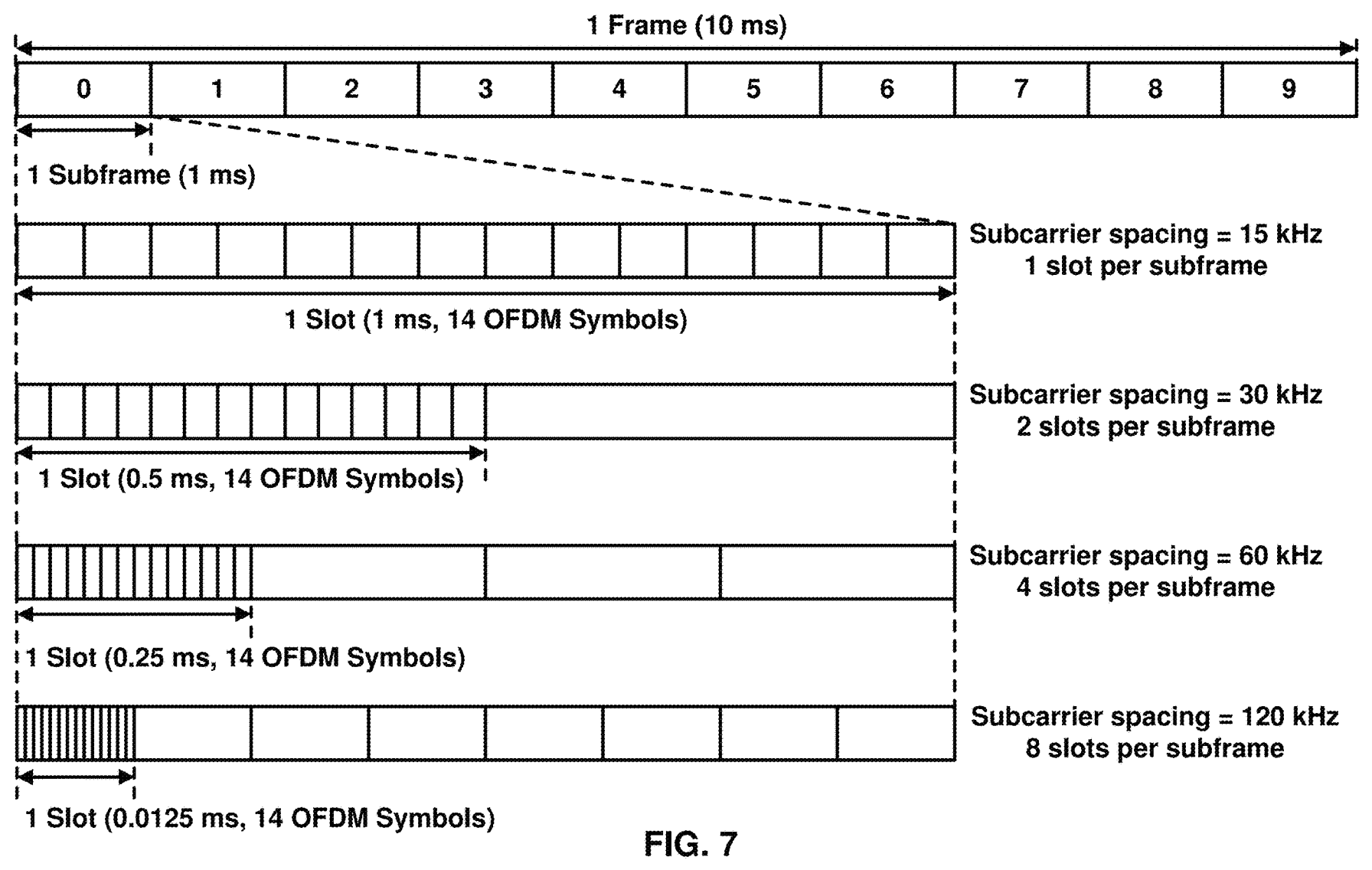

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/cyclic prefix duration combinations: 15 KHz/4.7 µs; 30 KHz/2.3 µs; 60 KHz/1.2 µs; 120 KHz/0.59 µs; and 240 kHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 KHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
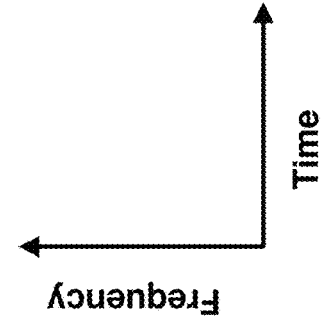
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
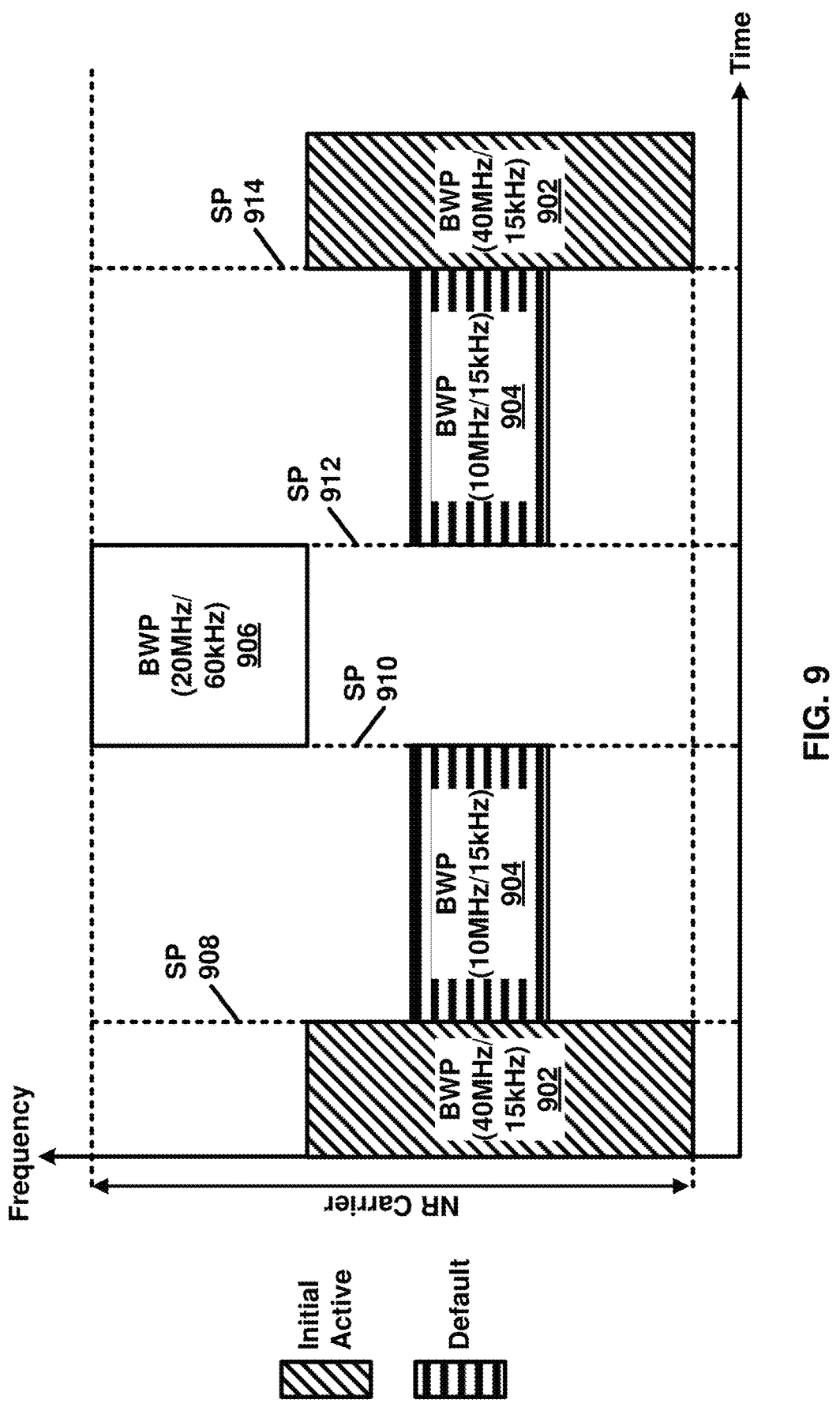
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 KHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response to receiving a DCI indicating BWP 906 as the active BWP. The UE may switch at a switching point 912 from active BWP 906 to BWP 904 in response to an expiry of a BWP inactivity timer and/or in response to receiving a DCI indicating BWP 904 as the active BWP. The UE may switch at a switching point 914 from active BWP 904 to BWP 902 in response to receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
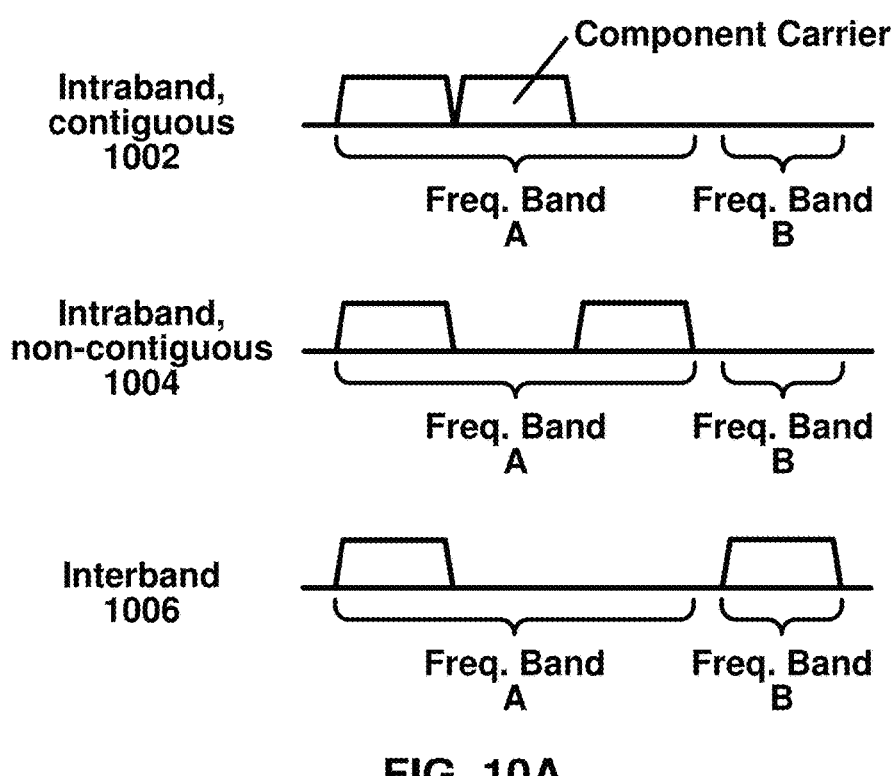
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
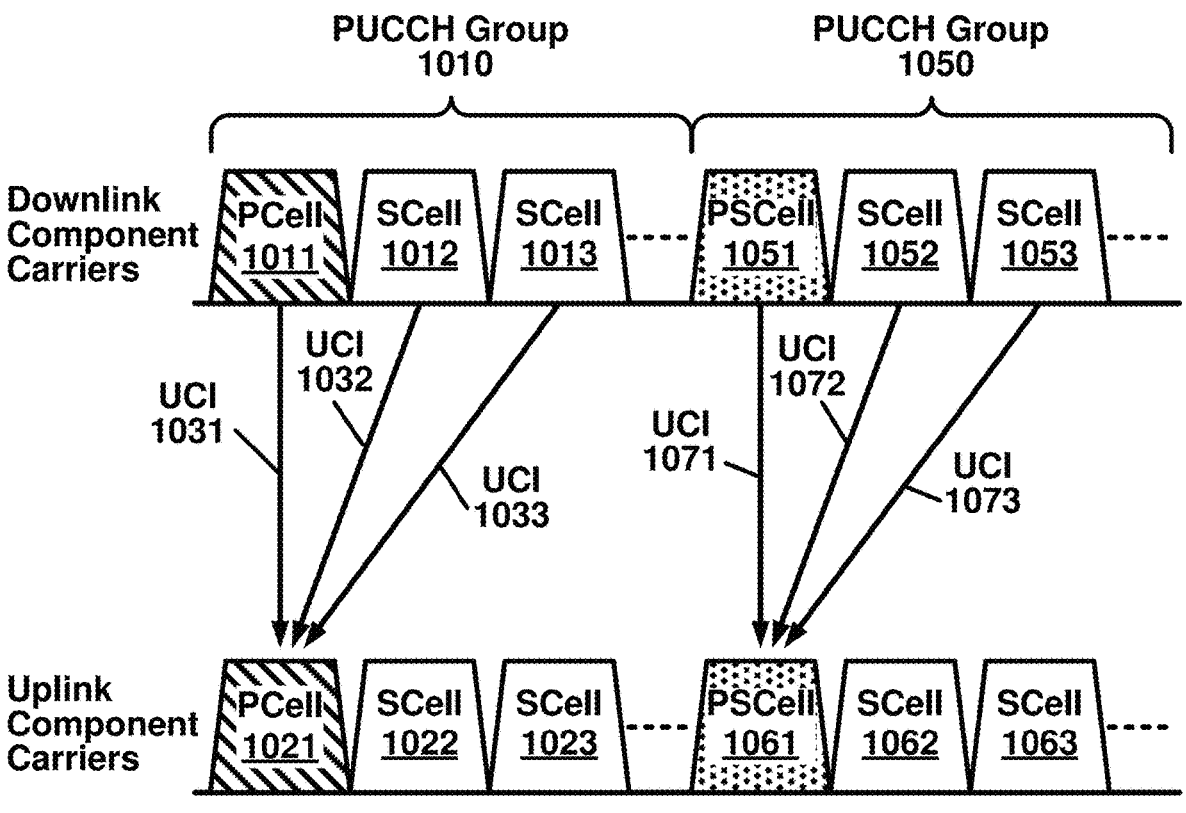
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary SCell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/ physical broadcast channel (PBCH) block that includes the PSS, the SSS, and the PBCH. The base station may periodically transmit a burst of SS/PBCH blocks.

Figure 11A:
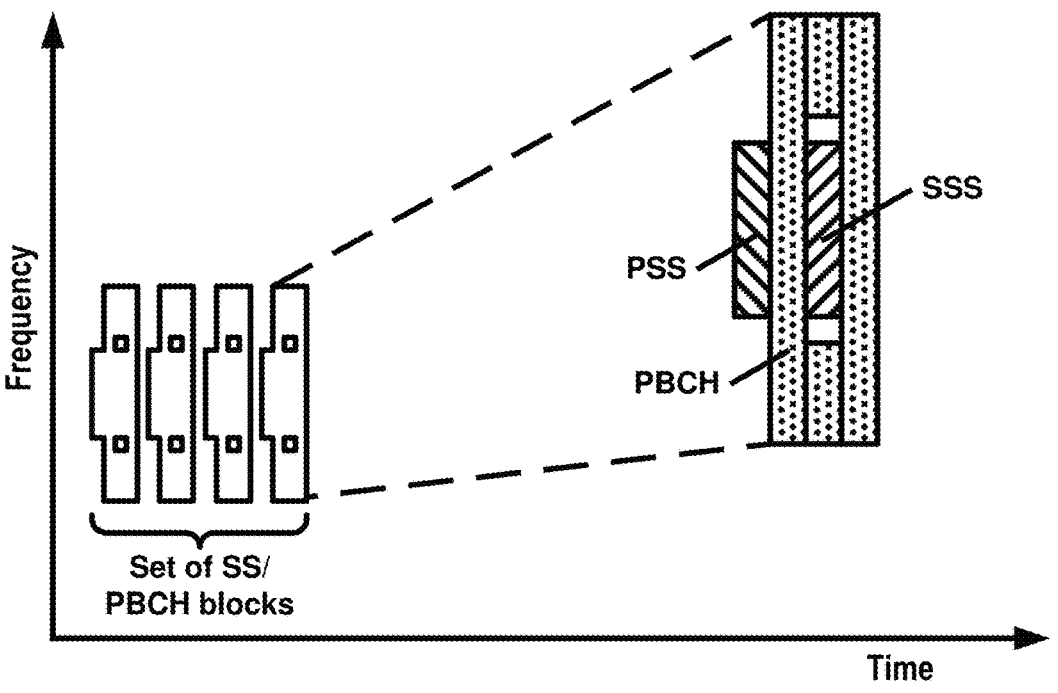
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g., a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g., maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in an SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
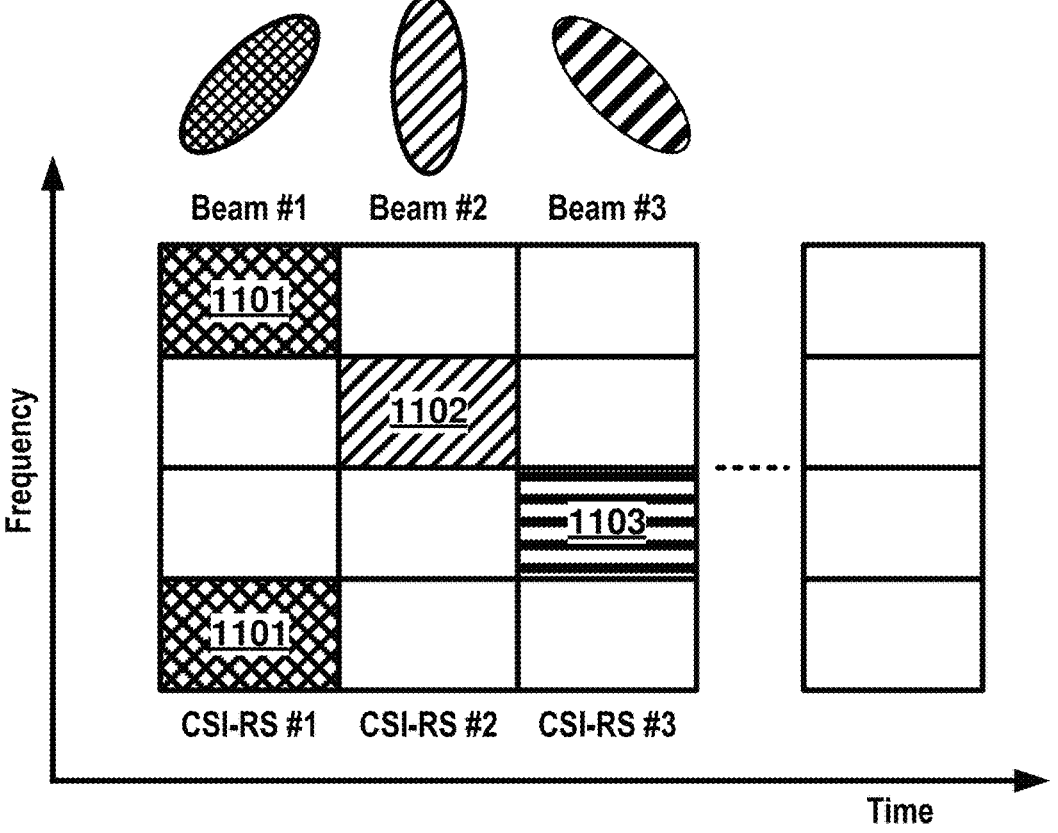
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figures 12A, 12B:
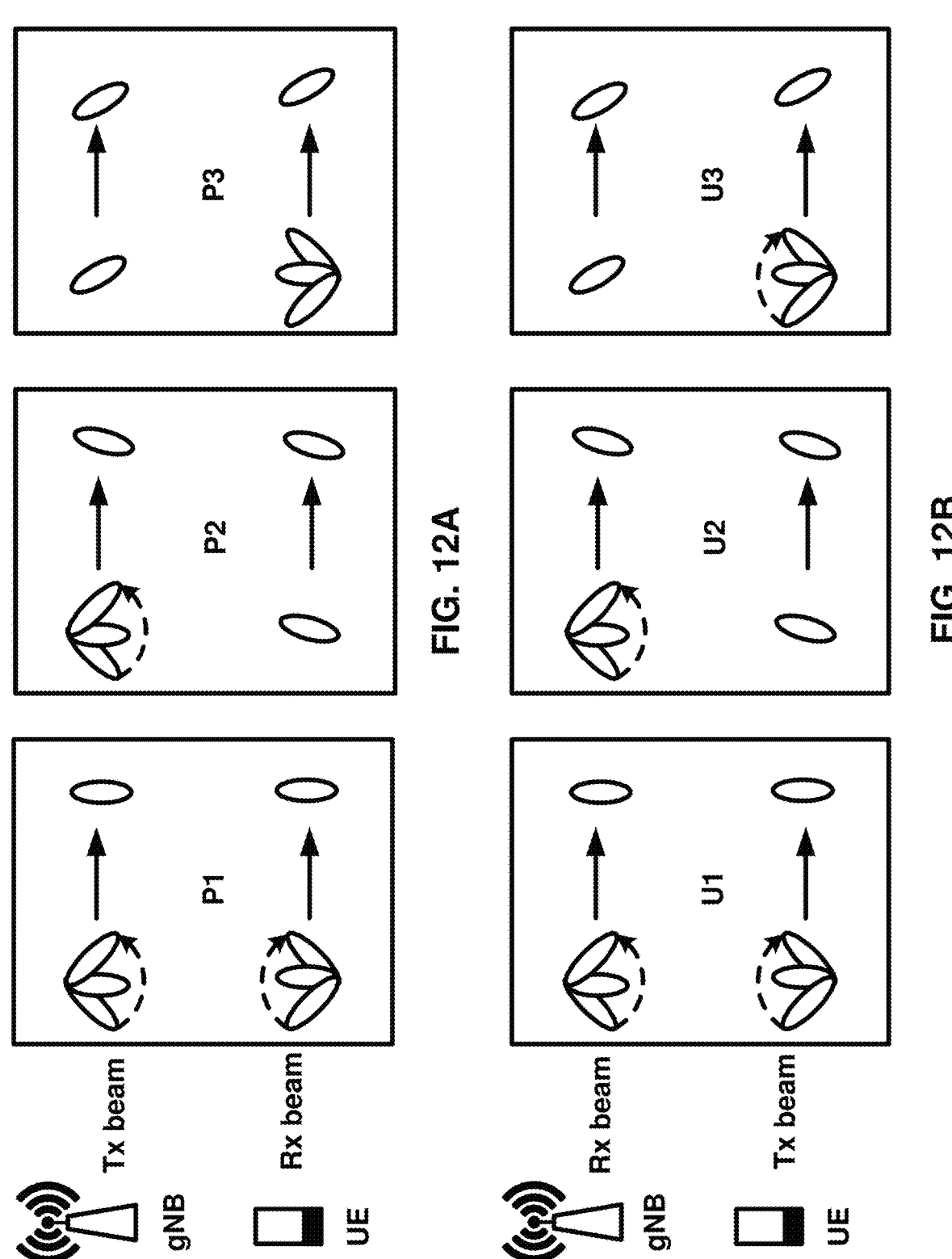
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beam-forming at a UE may comprise an Rx beam sweep for a set of beams (shown, in the bottom rows of P1 and P3, as ovals rotated in a clockwise direction indicated by the dashed arrow). Procedure P2 may be used to enable a UE measure-ment on Tx beams of a TRP (shown, in the top row of P2, as ovals rotated in a counterclockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam man-agement procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beam-forming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counterclockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) proce-dure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figures 13A, 13B, 13C:
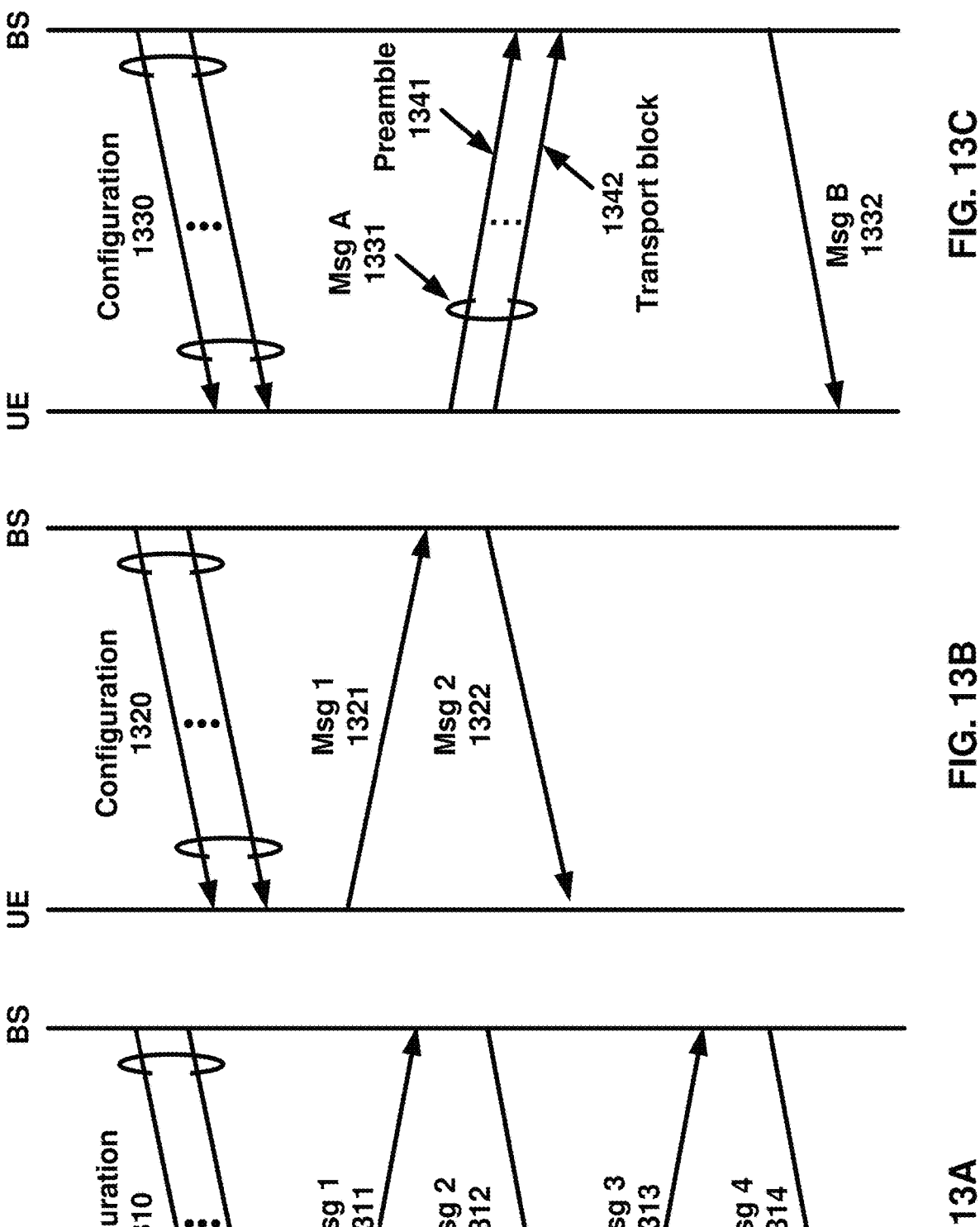
FIG. 13A, FIG. 13B, and FIG. 13C respectively illustrate a four-step contention-based random access procedure, a two-step contention-free random access procedure, and another two-step random access procedure.

FIG. 13A illustrates a four-step contention-based random access procedure. Prior to initiation of the procedure, a base station may transmit a configuration message 1310 to the UE. The procedure illustrated in FIG. 13A comprises trans-mission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_I-NACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmis-sion of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more refer-ence signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-Response Window) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

RA-RNTI=1+s_id+14×t_id+14×80×f_id+14×80× 8×ul_carrier_id, where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figures 14A, 14B:
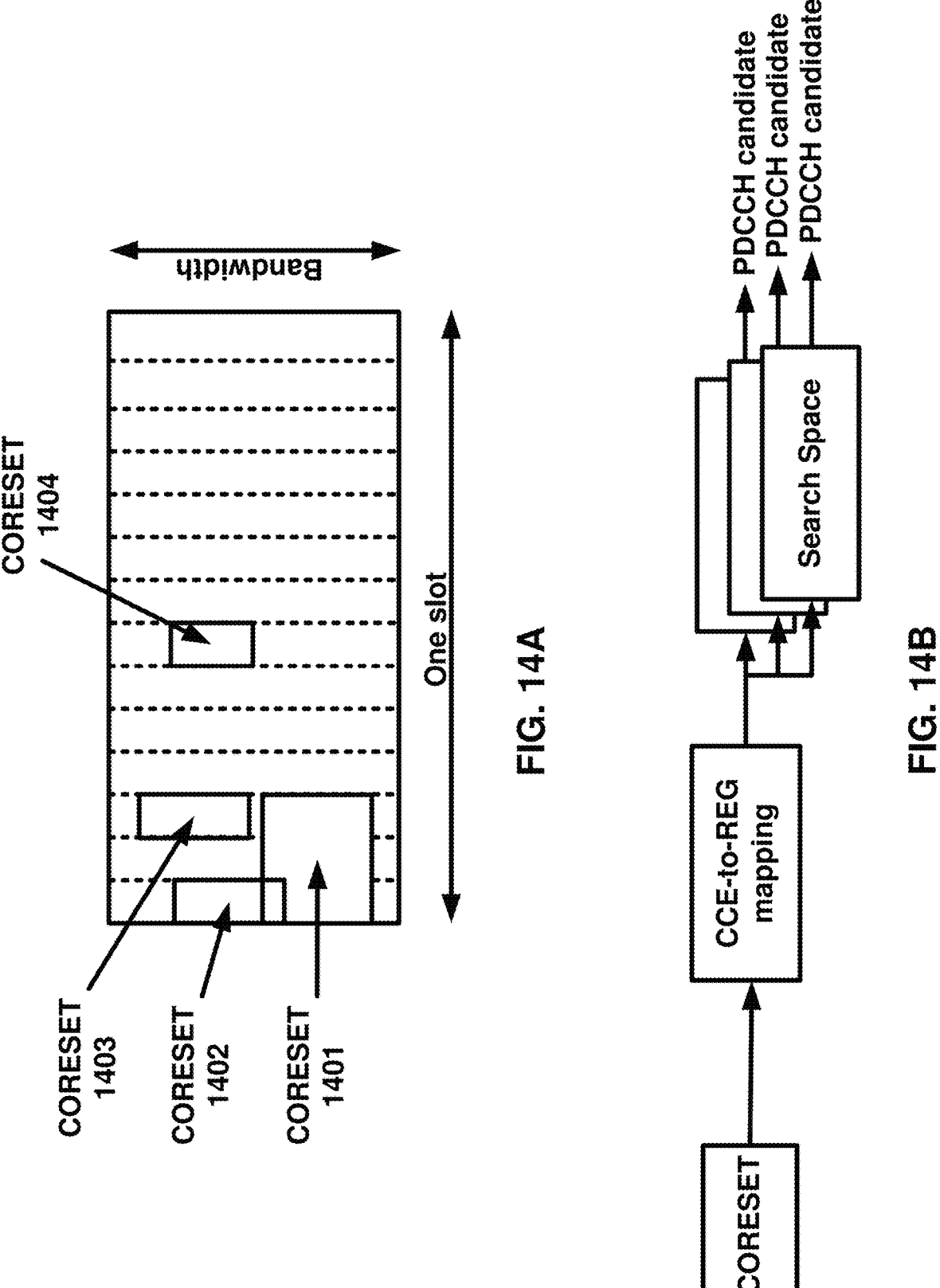
FIG. 14A illustrates an example of CORESET configurations for a bandwidth part.
FIG. 14B illustrates an example of a CCE-to-REG mapping for DCI transmission on a CORESET and PDCCH processing.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g., a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
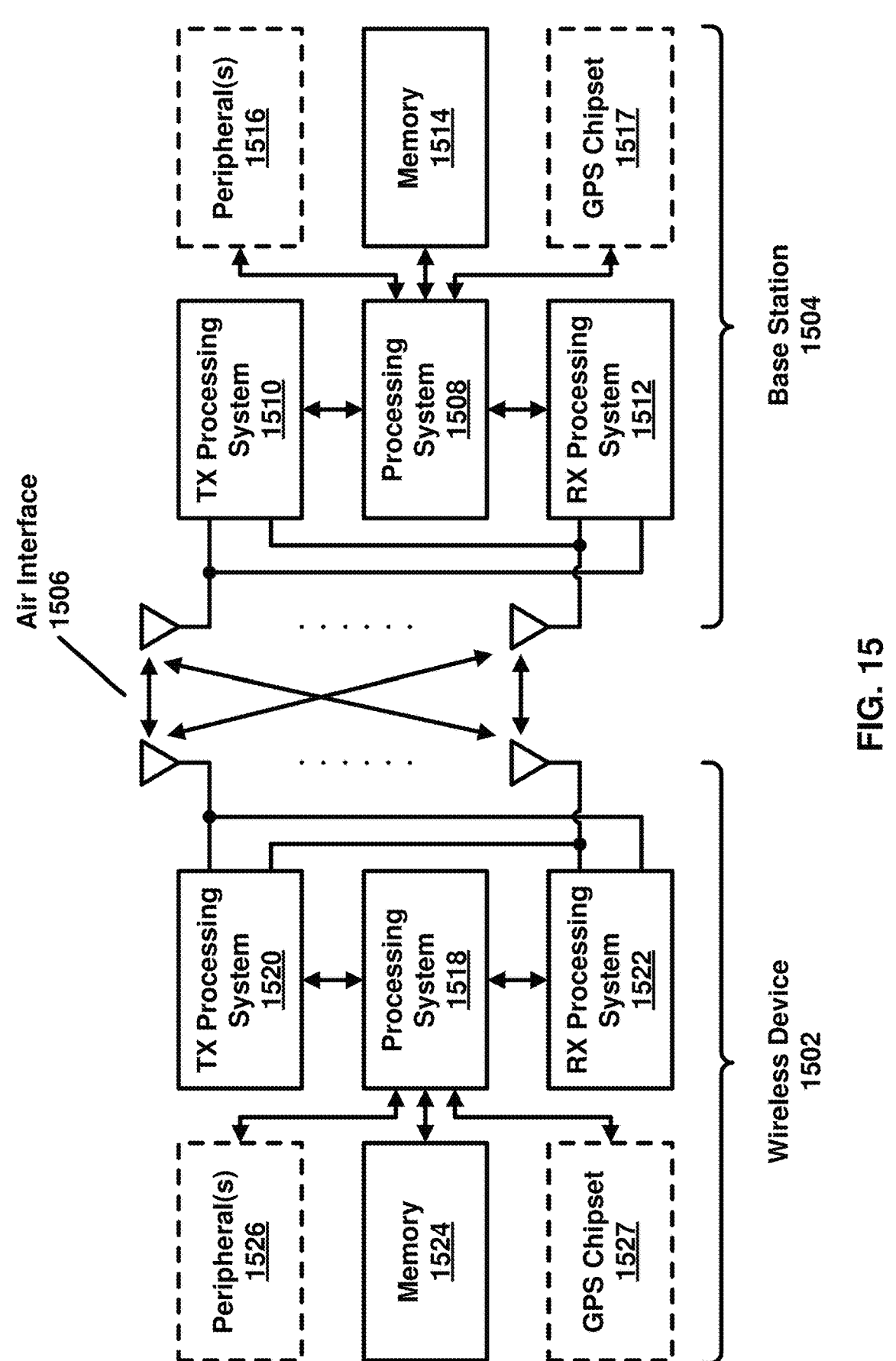
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory

1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figures 16A, 16B, 16C, 16D:
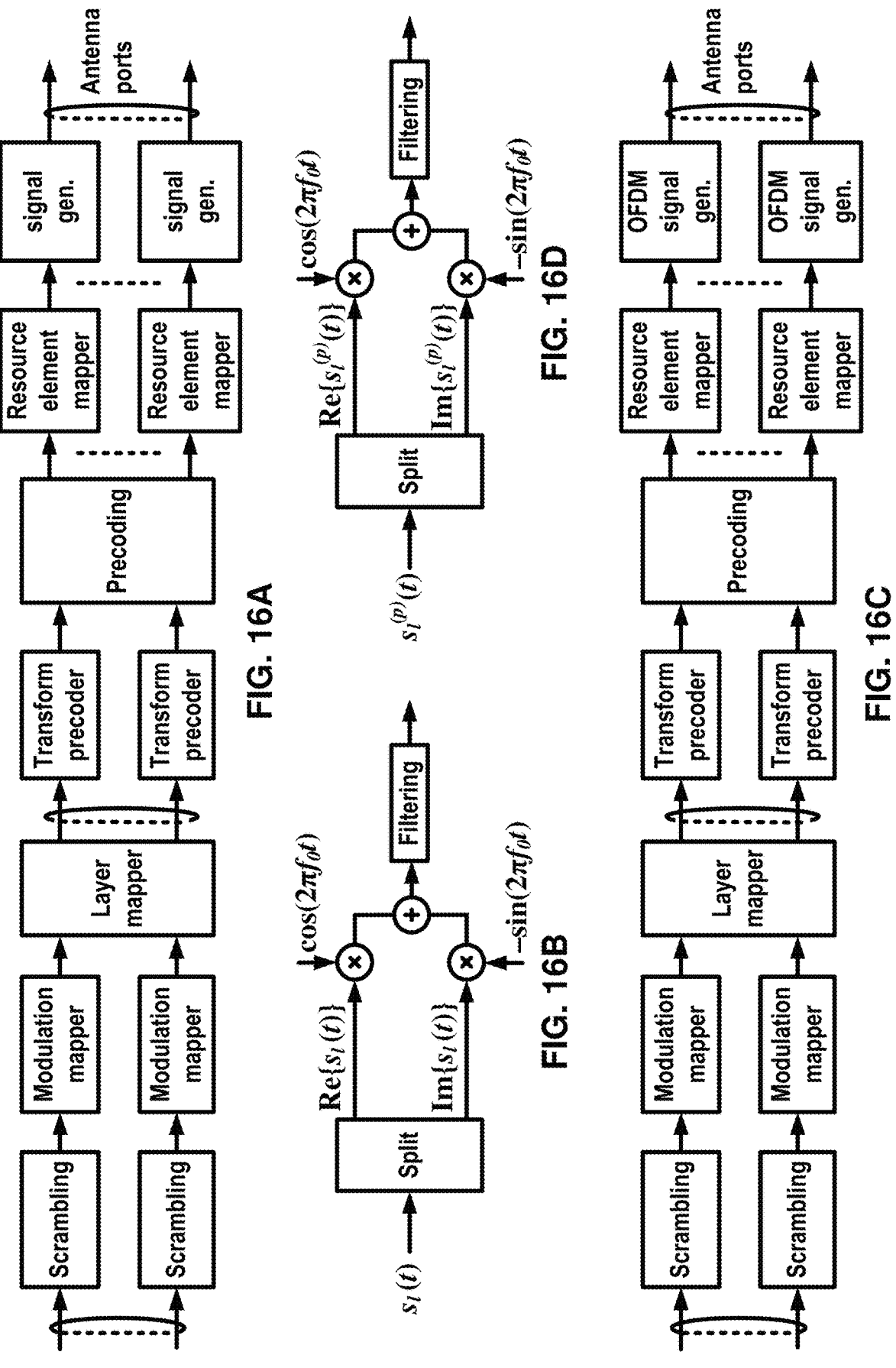
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, a CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g., RRC messages) comprising configuration parameters of a plurality of cells (e.g., primary cell, secondary cell). The wireless device may communicate with at least one base station (e.g., two or more base stations in dual connectivity) via the plurality of cells. The one or more messages (e.g., as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g., the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry (or expiration) of a random access response window timer, the time difference between two time stamps may be used. When a timer is restarted, a process for measurement of time window may be restarted. Other example implementations may be provided to restart a measurement of a time window.

A base station may transmit one or more MAC PDUs to a wireless device. In an example, a MAC PDU may be a bit string that is byte aligned (e.g., aligned to a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., aligned to a multiple of eight bits) in length. In an example, a MAC SDU may be included in a MAC PDU from the first bit onward. A MAC CE may be a bit string that is byte aligned (e.g., aligned to a multiple of eight bits) in length. A MAC subheader may be a bit string that is byte aligned (e.g., aligned to a multiple of eight bits) in length. In an example, a MAC subheader may be placed immediately in front of a corresponding MAC SDU, MAC CE, or padding. A MAC entity may ignore the value of reserved bits in a DL MAC PDU.

In an example, a MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; a MAC subheader and padding, or a combination thereof. The MAC SDU may be of variable size. A MAC subheader may correspond to a MAC SDU, a MAC CE, or padding.

In an example, when a MAC subheader corresponds to a MAC SDU, a variable-sized MAC CE, or padding, the MAC subheader may comprise: an R field with a one-bit length; an F field with a one-bit length; an LCID field with a multi-bit length; an L field with a multi-bit length, or a combination thereof.

Figure 17A:
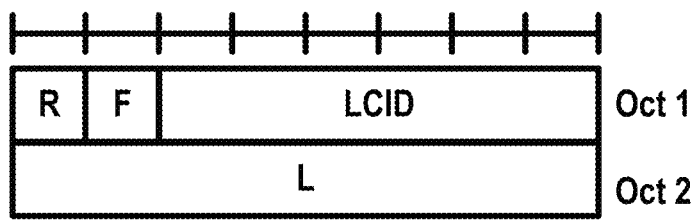
FIG. 17A, FIG. 17B, and FIG. 17C illustrate aspects of example embodiments according to the present disclosure.
Figure 17B:
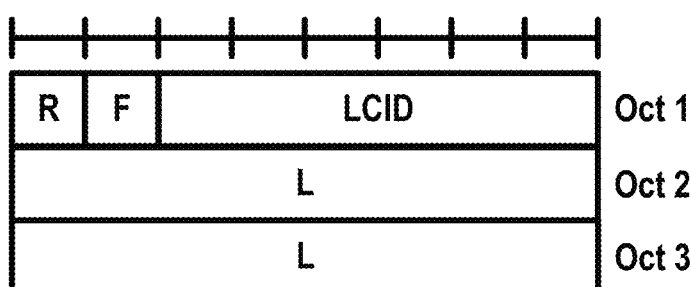
Figure 17C:
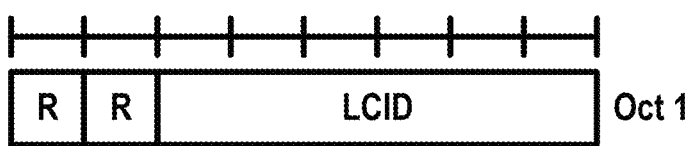

FIG. 17A shows an example of a MAC subheader with an R field, an F field, an LCID field, and an L field. In the example MAC subheader of FIG. 17A, the LCID field may be six bits in length, and the L field may be eight bits in length. FIG. 17B shows example of a MAC subheader with an R field, an F field, an LCID field, and an L field. In the example MAC subheader shown in FIG. 17B, the LCID field may be six bits in length, and the L field may be sixteen bits in length. When a MAC subheader corresponds to a fixed sized MAC CE or padding, the MAC subheader may comprise: an R field with a two-bit length and an LCID field with a multi-bit length. FIG. 17C shows an example of a MAC subheader with an R field and an LCID field. In the example MAC subheader shown in FIG. 17C, the LCID field may be six bits in length, and the R field may be two bits in length.

Figures 18A, 18B:
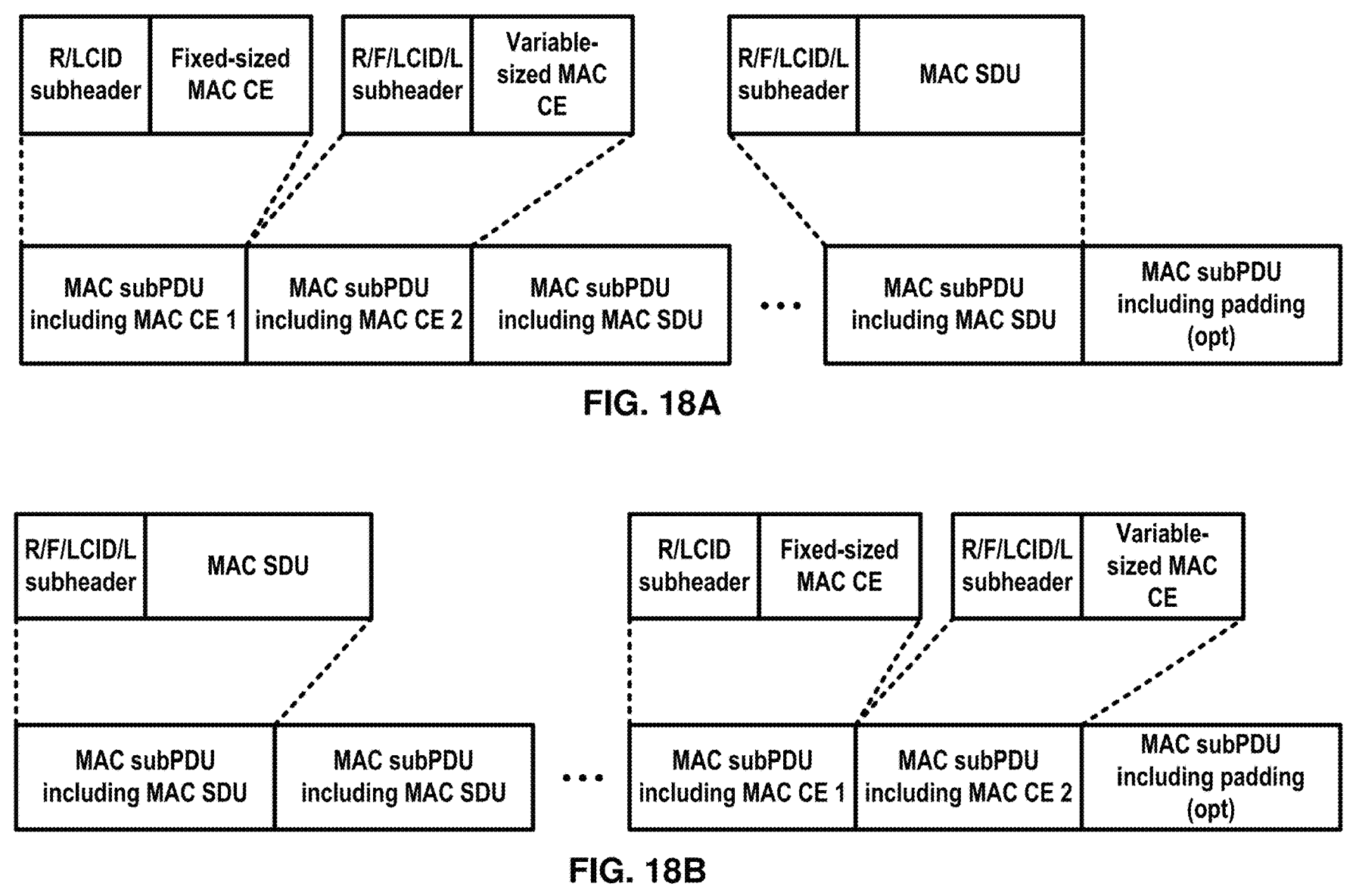

FIG. 18A shows an example of a DL MAC PDU. Multiple MAC CEs, such as MAC CE 1 and 2, may be placed together. A MAC subPDU, comprising a MAC CE, may be placed before: a MAC subPDU comprising a MAC SDU, or a MAC subPDU comprising padding. FIG. 18B shows an example of a UL MAC PDU. Multiple MAC CEs, such as MAC CE 1 and 2, may be placed together. In an embodiment, a MAC subPDU comprising a MAC CE may be placed after all MAC subPDUs comprising a MAC SDU. In addition, the MAC subPDU may be placed before a MAC subPDU comprising padding.

In an example, a MAC entity of a base station may transmit one or more MAC CEs to a MAC entity of a wireless device. FIG. 19 shows an example of multiple LCIDs that may be associated with the one or more MAC CEs. The one or more MAC CEs comprise at least one of: a SP ZP CSI-RS Resource Set Activation/Deactivation MAC CE, a PUCCH spatial relation Activation/Deactivation MAC CE, a SP SRS Activation/Deactivation MAC CE, a SP CSI reporting on PUCCH Activation/Deactivation MAC CE, a TCI State Indication for UE-specific PDCCH MAC CE, a TCI State Indication for UE-specific PDSCH MAC CE, an Aperiodic CSI Trigger State Subselection MAC CE, a SP CSI-RS/CSI-IM Resource Set Activation/Deactivation MAC CE, a wireless device contention resolution identity MAC CE, a timing advance command MAC CE, a DRX command MAC CE, a Long DRX command MAC CE, an SCell activation/deactivation MAC CE (1 Octet), an SCell activation/deactivation MAC CE (4 Octet), and/or a duplication activation/deactivation MAC CE. In an example, a MAC CE, such as a MAC CE transmitted by a MAC entity of a base station to a MAC entity of a wireless device, may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a long DRX command MAC CE.

In an example, the MAC entity of the wireless device may transmit to the MAC entity of the base station one or more MAC CEs. FIG. 20 shows an example of the one or more MAC CEs. The one or more MAC CEs may comprise at least one of: a short buffer status report (BSR) MAC CE, a beam failure recovery (BFR) MAC CE, a truncated BFR MAC CE, a truncated enhanced BFR MAC CE, a long BSR MAC CE, a C-RNTI MAC CE, a configured grant confirmation MAC CE, a single entry PHR MAC CE, a multiple entry PHR MAC CE, a short truncated BSR, and/or a long truncated BSR etc. In an example, a MAC CE may have an LCID in the MAC subheader corresponding to the MAC CE. Different MAC CE may have different LCID in the MAC subheader corresponding to the MAC CE. For example, an LCID given by 43 in a MAC subheader may indicate that a MAC CE associated with the MAC subheader is a truncated enhanced BFR MAC CE.

In carrier aggregation (CA), two or more component carriers (CCs) may be aggregated. A wireless device may simultaneously receive or transmit on one or more CCs, depending on capabilities of the wireless device, using the technique of CA. In an embodiment, a wireless device may support CA for contiguous CCs and/or for non-contiguous CCs. CCs may be organized into cells. For example, CCs may be organized into one primary cell (PCell) and one or more secondary cells (SCells). When configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. In an example, the serving cell may denote a PCell. In an example, a base station may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a base station may activate or deactivate at least one of the one or more SCells. Upon configuration of an SCell, the SCell may be deactivated unless an SCell state associated with the SCell is set to "activated" or "dormant".

A wireless device may activate/deactivate an SCell in response to receiving an SCell Activation/Deactivation MAC CE. In an example, a base station may transmit, to a wireless device, one or more messages comprising an SCell timer (e.g., sCellDeactivation Timer). In an example, a wireless device may deactivate an SCell in response to an expiry of the SCell timer.

When a wireless device receives an SCell Activation/Deactivation MAC CE activating an SCell, the wireless device may activate the SCell. In response to the activating the SCell, the wireless device may perform operations comprising SRS transmissions on the SCell; CQI/PMI/RI/CRI reporting for the SCell; PDCCH monitoring on the SCell; PDCCH monitoring for the SCell; and/or PUCCH transmissions on the SCell. In response to the activating of the SCell, the wireless device may start or restart a first SCell timer (e.g., sCellDeactivationTimer) associated with the SCell. The wireless device may start or restart the first SCell timer in the slot when the SCell Activation/Deactivation MAC CE activating the SCell has been received. In an example, in response to the activating the SCell, the wireless device may (re-)initialize one or more suspended configured uplink grants of a configured grant Type 1 associated with the SCell according to a stored configuration. In an example, in response to activating the SCell, the wireless device may trigger PHR.

When a wireless device receives SCell Activation/Deactivation MAC CE deactivating an activated SCell, the wireless device may deactivate the activated SCell. In an example, when a first SCell timer (e.g., sCellDeactivation Timer) associated with an activated SCell expires, the wireless device may deactivate the activated SCell. In response to the deactivating the activated SCell, the wireless device may stop the first SCell timer associated with the activated SCell. In an example, in response to the deactivating the activated SCell, the wireless device may clear one or more configured downlink assignments and/or one or more configured uplink grants of a configured uplink grant Type 2 associated with the activated SCell. In an example, in response to the deactivating the activated SCell, the wireless device may: suspend one or more configured uplink grants of a configured uplink grant Type 1 associated with the activated SCell; and/or flush HARQ buffers associated with the activated SCell.

When an SCell is deactivated, a wireless device may not perform operations comprising: transmitting SRS on the SCell; reporting CQI/PMI/RI/CRI for the SCell; transmitting on UL-SCH on the SCell; transmitting on RACH on the SCell; monitoring at least one first PDCCH on the SCell; monitoring at least one second PDCCH for the SCell; and/or transmitting a PUCCH on the SCell. When at least one first PDCCH on an activated SCell indicates an uplink grant or a downlink assignment, a wireless device may restart a first SCell timer (e.g., sCellDeactivation Timer) associated with the activated SCell. In an example, when at least one second PDCCH on a serving cell (e.g., a PCell or an SCell configured with PUCCH, i.e., PUCCH SCell) scheduling the activated SCell indicates an uplink grant or a downlink assignment for the activated SCell, a wireless device may restart the first SCell timer (e.g., sCellDeactivation Timer) associated with the activated SCell. In an example, when an SCell is deactivated, if there is an ongoing random access procedure on the SCell, a wireless device may abort the ongoing random access procedure on the SCell.

Figure 21A:
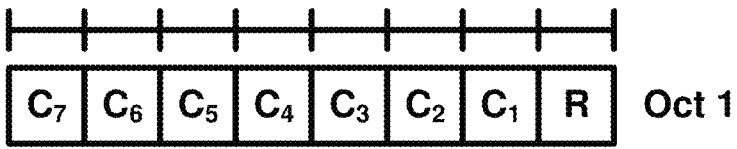
FIG. 21A and FIG. 21B illustrate aspects of example embodiments according to the present disclosure.

FIG. 21A shows an example of an SCell Activation/Deactivation MAC CE of one octet. A first MAC PDU subheader with a first LCID (e.g., '111010' as shown in FIG. 19) may identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first number of C-fields (e.g., seven) and a second number of R-fields (e.g., one).

Figure 21B:
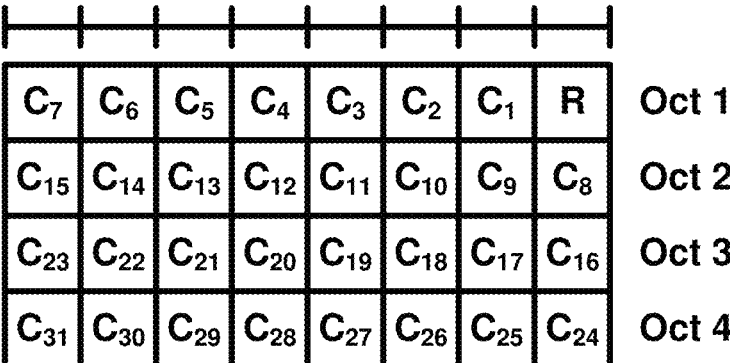

FIG. 21B shows an example of an SCell Activation/Deactivation MAC CE of four octets. A second MAC PDU subheader with a second LCID (e.g., '111001' as shown in FIG. 19) may identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third number of C-fields (e.g., 31) and a fourth number of R-fields (e.g., 1).

In FIG. 21A and/or FIG. 21B, a $C_i$ field may indicate an activation/deactivation status of an SCell with an SCell index i if an SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In FIG. 21A and FIG. 21B, an R field may indicate a reserved bit. The R field may be set to zero.

A base station may configure a wireless device with uplink (UL) bandwidth parts (BWPs) and downlink (DL) BWPs to enable bandwidth adaptation (BA) on a PCell. If carrier aggregation is configured, the base station may further configure the wireless device with at least DL BWP(s) (i.e., there may be no UL BWPs in the UL) to enable BA on an SCell. For the PCell, an initial active BWP may be a first BWP used for initial access. For the SCell, a first active BWP may be a second BWP configured for the wireless device to operate on the SCell upon the SCell being activated. In paired spectrum (e.g., FDD), a base station and/or a wireless device may independently switch a DL BWP and an UL BWP. In unpaired spectrum (e.g., TDD), a base station and/or a wireless device may simultaneously switch a DL BWP and an UL BWP.

In an example, a base station and/or a wireless device may switch a BWP between configured BWPs by means of a DCI or a BWP inactivity timer. When the BWP inactivity timer is configured for a serving cell, the base station and/or the wireless device may switch an active BWP to a default BWP in response to an expiry of the BWP inactivity timer associated with the serving cell. The default BWP may be configured by the network. In an example, for FDD systems, when configured with BA, one UL BWP for each uplink carrier and one DL BWP may be active at a time in an active serving cell. In an example, for TDD systems, one DL/UL BWP pair may be active at a time in an active serving cell.

Operating on the one UL BWP and the one DL BWP (or the one DL/UL pair) may improve wireless device battery consumption. BWPs other than the one active UL BWP and the one active DL BWP that the wireless device may work on may be deactivated. On deactivated BWPs, the wireless device may: not monitor PDCCH; and/or not transmit on PUCCH, PRACH, and UL-SCH.

In an example, a serving cell may be configured with at most a first number (e.g., four) of BWPs. In an example, for an activated serving cell, there may be one active BWP at any point in time. In an example, a BWP switching for a serving cell may be used to activate an inactive BWP and deactivate an active BWP at a time. In an example, the BWP switching may be controlled by a PDCCH indicating a downlink assignment or an uplink grant. In an example, the BWP switching may be controlled by a BWP inactivity timer (e.g., bwp-InactivityTimer). In an example, the BWP switching may be controlled by a MAC entity in response to initiating a Random Access procedure. Upon addition of an SpCell or activation of an SCell, one BWP may be initially active without receiving a PDCCH indicating a downlink assignment or an uplink grant. The active BWP for a serving cell may be indicated by RRC and/or PDCCH. In an example, for unpaired spectrum, a DL BWP may be paired with a UL BWP, and BWP switching may be common for both UL and DL.

Figure 22:
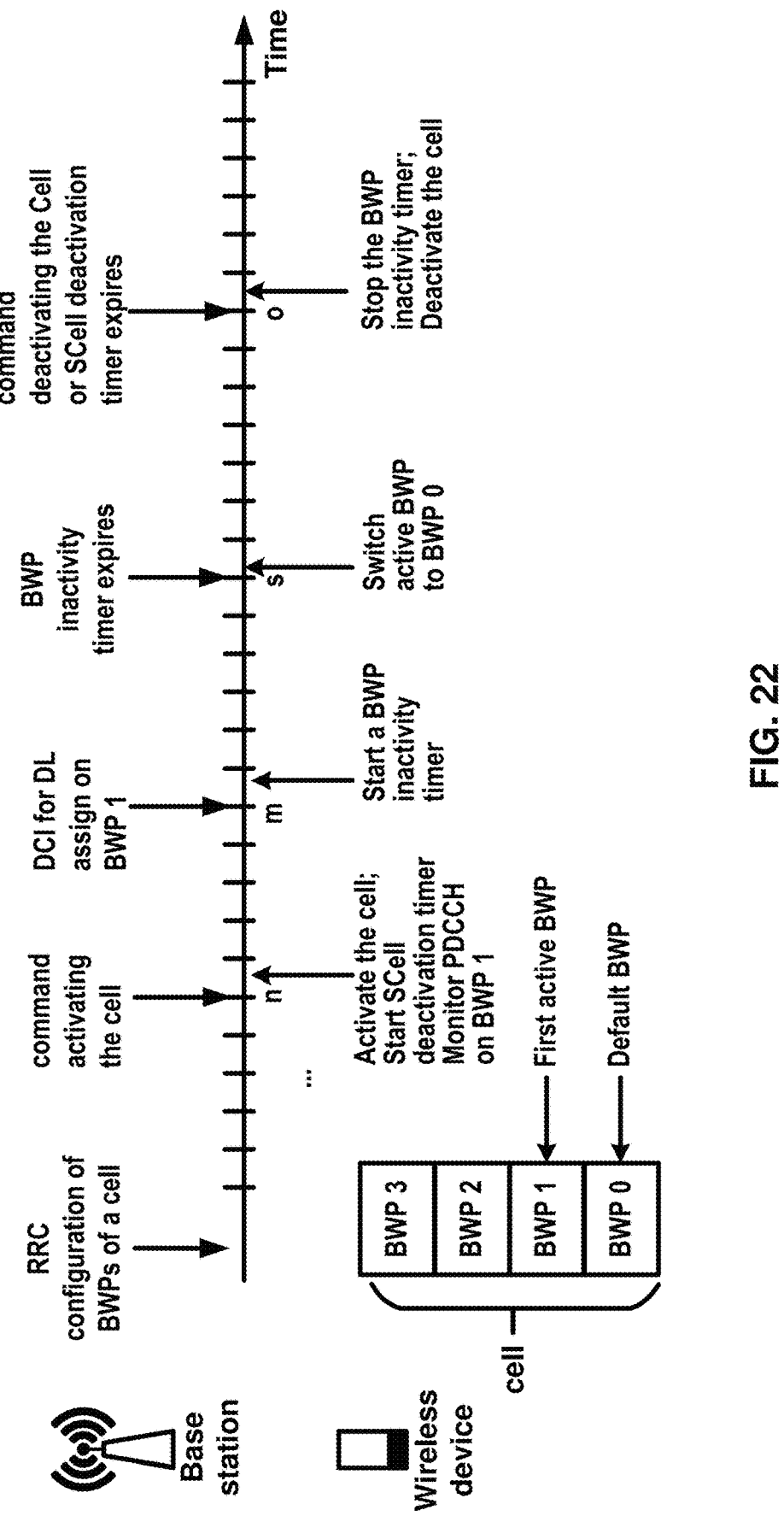
FIG. 22 illustrates an aspect of an example embodiment according to the present disclosure.

FIG. 22 shows an example of BWP switching on a cell (e.g., PCell or SCell). In an example, a wireless device may receive, from a base station, at least one RRC message comprising parameters of a cell and one or more BWPs associated with the cell. The RRC message may comprise: RRC connection reconfiguration message (e.g., RRCReconfiguration); RRC connection reestablishment message (e.g., RRCReestablishment); and/or RRC connection setup message (e.g., RRCSetup). Among the one or more BWPs, at least one BWP may be configured as the first active BWP (e.g., BWP 1), one BWP as the default BWP (e.g., BWP 0). The wireless device may receive a command (e.g., RRC message, MAC CE or DCI) to activate the cell at an nth slot. In case the cell is a PCell, the wireless device may not receive the command activating the cell, for example, the wireless device may activate the PCell once the wireless device receives RRC message comprising configuration parameters of the PCell. The wireless device may start monitoring a PDCCH on BWP 1 in response to activating the cell.

In an example, the wireless device may start (or restart) a BWP inactivity timer (e.g., bwp-InactivityTimer) at an $m^{th}$ slot in response to receiving a DCI indicating DL assignment on BWP 1. The wireless device may switch back to the default BWP (e.g., BWP 0) as an active BWP when the BWP inactivity timer expires, at $s^{th}$ slot. The wireless device may deactivate the cell and/or stop the BWP inactivity timer when the sCellDeactivation Timer expires (e.g., if the cell is a SCell). In response to the cell being a PCell, the wireless device may not deactivate the cell and may not apply the sCellDeactivation Timer on the PCell.

In an example, a MAC entity may apply normal operations on an active BWP for an activated serving cell configured with a BWP comprising: transmitting on UL-SCH; transmitting on RACH; monitoring a PDCCH; transmitting PUCCH; receiving DL-SCH; and/or (re-)initializing any suspended configured uplink grants of configured grant Type 1 according to a stored configuration, if any.

In an example, on an inactive BWP for each activated serving cell configured with a BWP, a MAC entity may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, if a MAC entity receives a PDCCH for a BWP switching of a serving cell while a Random Access procedure associated with this serving cell is not ongoing, a wireless device may perform the BWP switching to a BWP indicated by the PDCCH. In an example, if a bandwidth part indicator field is configured in DCI format 1_1, the bandwidth part indicator field value may indicate the active DL BWP, from the configured DL BWP set, for DL receptions. In an example, if a bandwidth part indicator field is configured in DCI format 0_1, the bandwidth part indicator field value may indicate the active UL BWP, from the configured UL BWP set, for UL transmissions.

In an example, for a primary cell, a wireless device may be provided by a higher layer parameter Default-DL-BWP a default DL BWP among the configured DL BWPs. If a wireless device is not provided with a default DL BWP by the higher layer parameter Default-DL-BWP, the default DL BWP is the initial active DL BWP. In an example, a wireless device may be provided by higher layer parameter bwp-InactivityTimer, a timer value for the primary cell. If configured, the wireless device may increment the timer, if running, every interval of 1 millisecond for frequency range 1 or every 0.5 milliseconds for frequency range 2 if the wireless device may not detect a DCI format 1_1 for paired spectrum operation or if the wireless device may not detect a DCI format 1_1 or DCI format 0_1 for unpaired spectrum operation during the interval.

In an example, if a wireless device is configured for a secondary cell with higher layer parameter Default-DL-BWP indicating a default DL BWP among the configured DL BWPs and the wireless device is configured with higher layer parameter bwp-Inactivity Timer indicating a timer value, the wireless device procedures on the secondary cell may be same as on the primary cell using the timer value for the secondary cell and the default DL BWP for the secondary cell.

In an example, if a wireless device is configured by higher layer parameter Active-BWP-DL-SCell a first active DL BWP and by higher layer parameter Active-BWP-UL-SCell a first active UL BWP on a secondary cell or carrier, the wireless device may use the indicated DL BWP and the indicated UL BWP on the secondary cell as the respective first active DL BWP and first active UL BWP on the secondary cell or carrier.

In an example, a set of PDCCH candidates for a wireless device to monitor is defined in terms of PDCCH search space sets. A search space set comprises a CSS set or a USS set. A wireless device monitors PDCCH candidates in one or more of the following search spaces sets: a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG, a Type0A-PDCCH CSS set configured by searchSpaceOtherSystemInformation in PDCCH-Config-Common for a DCI format with CRC scrambled by a SI-RNTI on the primary cell of the MCG, a Type1-PDCCH CSS set configured by ra-SearchSpace in PDCCH-Config-Common for a DCI format with CRC scrambled by a RA-RNTI, a MsgB-RNTI, or a TC-RNTI on the primary cell, a Type2-PDCCH CSS set configured by paging-SearchSpace in PDCCH-ConfigCommon for a DCI format with CRC scrambled by a P-RNTI on the primary cell of the MCG, a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, TPC-SRS-RNTI, CI-RNTI, or PS-RNTI and, only for the primary cell, C-RNTI, MCS-C-RNTI, or CS-RNTI(s), and a USS set configured by SearchSpace in PDCCH-Config with search Space Type=ue-Specific for DCI formats with CRC scrambled by C-RNTI, MCS-C-RNTI, SP-CSI-RNTI, CS-RNTI(s), SL-RNTI, SL-CS-RNTI, or SL-L-CS-RNTI.

In an example, a wireless device determines a PDCCH monitoring occasion on an active DL BWP based on one or more PDCCH configuration parameters (e.g., based on example embodiment of FIG. 27 which will be described later) comprising: a PDCCH monitoring periodicity, a PDCCH monitoring offset, and a PDCCH monitoring pattern within a slot. For a search space set (SS s), the wireless device determines that a PDCCH monitoring occasion(s) exists in a slot with number $$n_{s,f}^{\mu}$$

in a frame with number $n_f$ if $$(n_f \cdot N_{slot}^{frame,\mu} + n_{s,f}^{\mu} - o_s)\bmod k_s = 0 . N_{slot}^{frame,\mu}$$

is a number of slots in a frame when numerology $\mu$ is configured. $o_s$ is a slot offset indicated in the PDCCH configuration parameters (e.g., based on example embodiment of FIG. 27). $k_s$ is a PDCCH monitoring periodicity indicated in the PDCCH configuration parameters (e.g., based on example embodiment of FIG. 27). The wireless device monitors PDCCH candidates for the search space set for $T_s$ consecutive slots, starting from slot $$n_{s,f}^{\mu},$$

and does not monitor PDCCH candidates for search space set s for the next $k_s - T_s$ consecutive slots. In an example, a USS at CCE aggregation level $L \in \{1, 2, 4, 8, 16\}$ is defined by a set of PDCCH candidates for CCE aggregation level L.

In an example, a wireless device decides, for a search space set s associated with CORESET p, CCE indexes for aggregation level L corresponding to PDCCH candidate $m_{s,n_{CI}}$ of the search space set in slot $$n_{s,f}^{\mu}$$

for an active DL BWP of a serving cell corresponding to carrier indicator field value $n_{CI}$ as $$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p} / L \rfloor \right\} + i,$$

where, $$Y_{p,n_{s,f}^\mu} = 0 \text{ for any } CSS; Y_{p,n_{s,f}^\mu} = \left(A_p \cdot Y_{p,n_{s,f}^\mu - 1}\right) \text{mod}$$

D for a USS, $Y_{p,-1}=N_{RNTI}\neq0$, $A_p=39827$ for p mod 3=0, $A_p=39829$ for p mod 3=1, $A_p=39839$ for p mod 3=2, and D=65537; i=0, . . . , L−1; $N_{CCE,p}$ is the number of CCEs, numbered from 0 to $N_{CCE,p}-1$, in CORESET p; $n_{CI}$ is the carrier indicator field value if the wireless device is configured with a carrier indicator field by Cross CarrierSchedulingConfig for the serving cell on which PDCCH is monitored; otherwise, including for any CSS, $$n_{CI} = 0; m_{s,n_{CI}} = 0, \dots , M_{s,n_{CI}}^{(L)} - 1,$$

where $$M_{s,n_{CI}}^{(L)}$$

is the number of PDCCH candidates the wireless device is configured to monitor for aggregation level L of a search space set s for a serving cell corresponding to $n_{CI}$; for any CSS, $$M_{s,max}^{(L)} = M_{s,0}^{(L)};$$

for a USS, $$M_{s,max}^{(L)}$$

is the maximum of $$M_{s,n_{CI}}^{(L)}$$

over all configured $n_{CI}$ values for a CCE aggregation level L of search space set s; and the RNTI value used for $n_{RNTI}$ is the C-RNTI.

In an example, a wireless device may monitor a set of PDCCH candidates according to configuration parameters of a search space set comprising a plurality of search spaces (SSs). The wireless device may monitor a set of PDCCH candidates in one or more CORESETs for detecting one or more DCIs. A CORESET may be configured based on the example embodiment of FIG. 26 which will be described later. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common SSs, and/or number of PDCCH candidates in the UE-specific SSs) and possible (or configured) DCI formats. The decoding may be referred to as blind decoding. The possible DCI formats may be based on example embodiments of FIG. 23.

FIG. 23 shows examples of DCI formats which may be used by a base station transmitting control information to a wireless device or used by the wireless device for PDCCH monitoring. Different DCI formats may comprise different DCI fields and/or have different DCI payload sizes. Different DCI formats may have different signaling purposes. In an example, DCI format 0_0 may be used to schedule PUSCH in one cell. DCI format 0_1 may be used to schedule one or multiple PUSCH in one cell or indicate CG-DFI (configured grant-Downlink Feedback Information) for configured grant PUSCH, etc. The DCI format(s) which the wireless device may monitor in a SS may be configured.

FIG. 24A shows an example of configuration parameters of a master information block (MIB) of a cell (e.g., PCell). In an example, a wireless device, based on receiving primary synchronization signal (PSS) and/or secondary synchronization signal (SSS), may receive a MIB via a PBCH. The configuration parameters of a MIB may comprise six bits (systemFrameNumber) of system frame number (SFN), subcarrier spacing indication (subCarrierSpacing Common), a frequency domain offset (ssb-SubcarrierOffset) between SSB and overall resource block grid in number of subcarriers, an indication (cellBarred) indicating whether the cell is bared, a DMRS position indication (dmrs-TypeA-Position) indicating position of DMRS, parameters of CORESET and SS of a PDCCH (pdcch-ConfigSIB1) comprising a common CORESET, a common search space and necessary PDCCH parameters, etc.

In an example, a pdcch-ConfigSIB1 may comprise a first parameter (e.g., controlResourceSetZero) indicating a common ControlResourceSet (CORESET) with ID #0 (e.g., CORESET #0) of an initial BWP of the cell. controlResourceSetZero may be an integer between 0 and 15. Each integer between 0 and 15 may identify a configuration of CORESET #0.

FIG. 24B shows an example of a configuration of CORESET #0. As shown in FIG. 24B, based on a value of the integer of controlResource SetZero, a wireless device may determine a SSB and CORESET #0 multiplexing pattern, a number of RBs for CORESET #0, a number of symbols for CORESET #0, an RB offset for CORESET #0.

In an example, a pdcch-ConfigSIB1 may comprise a second parameter (e.g., searchSpaceZero) indicating a common search space with ID #0 (e.g., SS #0) of the initial BWP of the cell. searchSpaceZero may be an integer between 0 and 15. Each integer between 0 and 15 may identify a configuration of SS #0.

FIG. 24C shows an example of a configuration of SS #0. As shown in FIG. 24C, based on the value of the integer of searchSpaceZero, a wireless device may determine one or more parameters (e.g., O, M) for slot determination of PDCCH monitoring, a first symbol index for PDCCH monitoring and/or a number of search spaces per slot.

In an example, based on receiving a MIB, a wireless device may monitor PDCCH via SS #0 of CORESET #0 for receiving a DCI scheduling a system information block 1 (SIB1). A SIB1 message may be implemented based on the example embodiment of FIG. 25. The wireless device may receive the DCI with CRC scrambled with a system information radio network temporary identifier (SI-RNTI) dedicated for receiving the SIB1.

FIG. 25 shows an example of RRC configuration parameters of system information block (SIB). A SIB (e.g., SIB1) may be transmitted to all wireless devices in a broadcast way. The SIB may contain information relevant when evaluating if a wireless device is allowed to access a cell, information of paging configuration and/or scheduling configuration of other system information. A SIB may contain radio resource configuration information that is common for all wireless devices and barring information applied to a unified access control. In an example, a base station may transmit to a wireless device (or a plurality of wireless devices) one or more SIB information. As shown in FIG. 25, parameters of the one or more SIB information may comprise: one or more parameters (e.g., cellSelectioninfo) for cell selection related to a serving cell, one or more configuration parameters of a serving cell (e.g., in ServingCellConfigCommonSIB IE), and one or more other parameters. The Serving CellConfigCommonSIB IE may comprise at least one of: common downlink parameters (e.g., in DownlinkConfig CommonSIB IE) of the serving cell, common uplink parameters (e.g., in UplinkConfigCommonSIB IE) of the serving cell, and other parameters.

In an example, a DownlinkConfigCommonSIB IE may comprise parameters of an initial downlink BWP (initialDownlinkBWP IE) of the serving cell (e.g., SpCell). The parameters of the initial downlink BWP may be comprised in a BWP-DownlinkCommon IE (as shown in FIG. 26). The BWP-DownlinkCommon IE may be used to configure common parameters of a downlink BWP of the serving cell. The base station may configure the locationAndBandwidth so that the initial downlink BWP contains the entire CORESET #0 of this serving cell in the frequency domain. The wireless device may apply the location AndBandwidth upon reception of this field (e.g., to determine the frequency position of signals described in relation to this locationAndBandwidth) but it keeps CORESET #0 until after reception of RRC-Setup/RRCResume/RRCReestablishment.

In an example, the DownlinkConfigCommonSIB IE may comprise parameters of a paging channel configuration. The parameters may comprise a paging cycle value (T, by defaultPagingCycle IE), a parameter (nAndPagingFrameOffset IE) indicating total number N) of paging frames (PFs) and paging frame offset (PF_offset) in a paging DRX cycle, a number (Ns) for total paging occasions (POs) per PF, a first PDCCH monitoring occasion indication parameter (firstPDCCH-MonitoringOccasionofPO IE) indicating a first PDCCH monitoring occasion for paging of each PO of a PF. The wireless device, based on parameters of a PCCH configuration, may monitor PDCCH for receiving paging message.

In an example, the parameter first-PDCCH-Monitoring Occasion OfPO may be signaled in SIB1 for paging in initial DL BWP. For paging in a DL BWP other than the initial DL BWP, the parameter first-PDCCH-MonitoringOccasionOfPO may be signaled in the corresponding BWP configuration.

FIG. 26 shows an example of RRC configuration parameters (e.g., BWP-DownlinkCommon IE) in a downlink BWP of a serving cell. A base station may transmit to a wireless device (or a plurality of wireless devices) one or more configuration parameters of a downlink BWP (e.g., initial downlink BWP) of a serving cell. As shown in FIG. 26, the one or more configuration parameters of the downlink BWP may comprise: one or more generic BWP parameters of the downlink BWP, one or more cell specific parameters for PDCCH of the downlink BWP (e.g., in pdcch-ConfigCommon IE), one or more cell specific parameters for the PDSCH of this BWP (e.g., in pdsch-ConfigCommon IE), and one or mor other parameters. A pdcch-ConfigCommon IE may comprise parameters of COESET #0 (e.g., controlResourceSetZero) which may be used in any common or UE-specific search spaces. A value of the controlResourceSetZero may be interpreted like the corresponding bits in MIB pdcch-ConfigSIB1. A pdcch-ConfigCommon IE may comprise parameters (e.g., in common ControlResourceSet) of an additional common control resource set which may be configured and used for any common or UE-specific search space. If the network configures this field, it uses a ControlResourceSetId other than 0 for this ControlResourceSet. The network configures the commonControlResourceSet in SIB1 so that it is contained in the bandwidth of CORESET #0. A pdcch-ConfigCommon IE may comprise parameters (e.g., in commonSearchSpaceList) of a list of additional common search spaces. Parameters of a search space may be implemented based on an example of FIG. 27 which will be described later. A pdcch-ConfigCommon IE may indicate, from a list of search spaces, a search space for paging (e.g., pagingSearchSpace), a search space for random access procedure (e.g., ra-SearchSpace), a search space for SIB1 message (e.g., searchSpaceSIB1), a common search space #0 (e.g., searchSpaceZero), and one or more other search spaces.

As shown in FIG. 26, a control resource set (CORESET) may be associated with a CORESET index (e.g., ControlResourceSetId). A CORESET may be implemented based on example embodiments described above with respect to FIG. 14A and/or FIG. 14B. The CORESET index with a value of 0 may identify a common CORESET configured in MIB and in ServingCellConfigCommon (controlResourceSetZero) and may not be used in the ControlResourceSet IE. The CORESET index with other values may identify CORESETs configured by dedicated signaling or in SIB1. The controlResourceSetId is unique among the BWPs of a serving cell. A CORESET may be associated with coresetPoolIndex indicating an index of a CORESET pool for the CORESET. A CORESET may be associated with a time duration parameter (e.g., duration) indicating contiguous time duration of the CORESET in number of symbols. In an example, as shown in FIG. 26, configuration parameters of a CORESET may comprise at least one of: frequency resource indication (e.g., frequencyDomainResources), a CCE-REG mapping type indicator (e.g., cce-REG-MappingType), a plurality of TCI states, an indicator indicating whether a TCI is present in a DCI, and the like.

FIG. 27 shows an example of configuration of a search space (e.g., SearchSpace IE). In an example, one or more search space configuration parameters of a search space may comprise at least one of: a search space ID (searchSpaceId), a control resource set ID (controlResourceSetId), a monitoring slot periodicity and offset parameter (monitoringSlotPeriodicityAndOffset), a search space time duration value (duration), a monitoring symbol indication (monitoringSymbols Within Slot), a number of candidates for an aggregation level (nrofCandidates), and/or a SS type indicating a common SS type or a UE-specific SS type (searchSpace Type). The monitoring slot periodicity and offset parameter may indicate slots (e.g., in a radio frame) and slot offset (e.g., relative to a starting of a radio frame) for PDCCH monitoring. The monitoring symbol indication may indicate on which symbol(s) of a slot a wireless device may monitor PDCCH on the SS. The control resource set ID may identify a control resource set on which a SS may be located.

In an example, a wireless device, in RRC_IDLE or RRC_INACTIVE state, may periodically monitor paging occasions (POs) for receiving paging message for the wireless device. Before monitoring the POs, the wireless device, in RRC_IDLE or RRC_INACTIVE state, may wake up at a time before each PO for preparation and/or turn all components in preparation of data reception (warm up). The gap between the waking up and the PO may be long enough to accommodate all the processing requirements. The wireless device may perform, after the warming up, timing acquisition from SSB and coarse synchronization, frequency and time tracking, time and frequency offset compensation, and/or calibration of local oscillator. After that, the wireless device may monitor a PDCCH for a paging DCI in one or more PDCCH monitoring occasions based on configuration parameters of the PCCH configuration configured in SIB1. The configuration parameters of the PCCH configuration may be implemented based on example embodiments described above with respect to FIG. 25.

In an example, a base station may transmit one or more SSBs periodically to a wireless device, or a plurality of wireless devices. The wireless device (in RRC_IDLE state, RRC_INACTIVE state, or RRC_CONNECTED state) may use the one or more SSBs for time and frequency synchronization with a cell of the base station. An SSB, comprising a primary synchronization signal (PSS), a secondary synchronization signal (SSS), a physical broadcast channel (PBCH), and a PBCH DM-RS, may be transmitted based on example embodiments described above with respect to FIG. 11A. An SSB may occupy a number (e.g., 4) of OFDM symbols as shown in FIG. 11A. The base station may transmit one or more SSBs in a SSB burst, e.g., to enable beam-sweeping for PSS/SSS and PBCH. An SSB burst comprises a set of SSBs, each SSB potentially transmitted on a different beam. SSBs in the SSB burst may be transmitted in time-division multiplexing fashion. In an example, an SSB burst may always be confined to a 5 ms window and is either located in first-half or in the second half of a 10 ms radio frame. In this specification, an SSB burst may be equivalently referred to as a transmission window (e.g., 5 ms) in which the set of SSBs are transmitted.

In an example, the base station may indicate a transmission periodicity of SSB via RRC message (e.g., ssb-PeriodicityServing Cell in Serving CellConfigCommonSIB of SIB1 message, or ServingCellConfigCommon of a serving cell). A candidate value of the transmission periodicity may be in a range of {5 ms, 10 ms, 20 ms, 40 ms, 80 ms, 160 ms}. The maximum number of candidate SSBs ($L_{max}$) within an SSB burst depends upon a carrier frequency/band of the cell. In an example, $L_{max}$=4 if $f_c$<=3 GHZ, wherein $f_c$ is the carrier frequency of the cell. $L_{max}$=8 if 3 GHZ<$f_c$<=6 GHZ. $L_{max}$=64 if $f_c$>=6 GHz, etc.

In an example, a starting OFDM symbol index of a candidate SSB (occupying 4 OFDM symbols) within a SSB burst (5 ms) may depend on a subcarrier spacing (SCS) and a carrier frequency band of the cell.

FIG. 28 shows an example of starting OFDM symbol index determination.

As shown in FIG. 28, starting OFDM symbol indexes of SSBs in a SSB burst, for a cell configured with 15 kHz and carrier frequency fc<3 GHZ ($L_{max}$=4), are 2, 8, 16, and 22. OFDM symbols in a half-frame are indexed with the first symbol of the first slot being indexed as 0. Starting OFDM symbol indexes of SSBs in a SSB burst, for a cell configured with 15 kHz and carrier frequency 3 GHz<fc<6 GHZ ($L_{max}$=8), are 2, 8, 16, 22, 30, 36, 44 and 50, etc. In an example, when the base station is not transmitting the SSBs with beam forming, the base station may transmit only one SSB by using the first SSB starting position.

Figure 29:
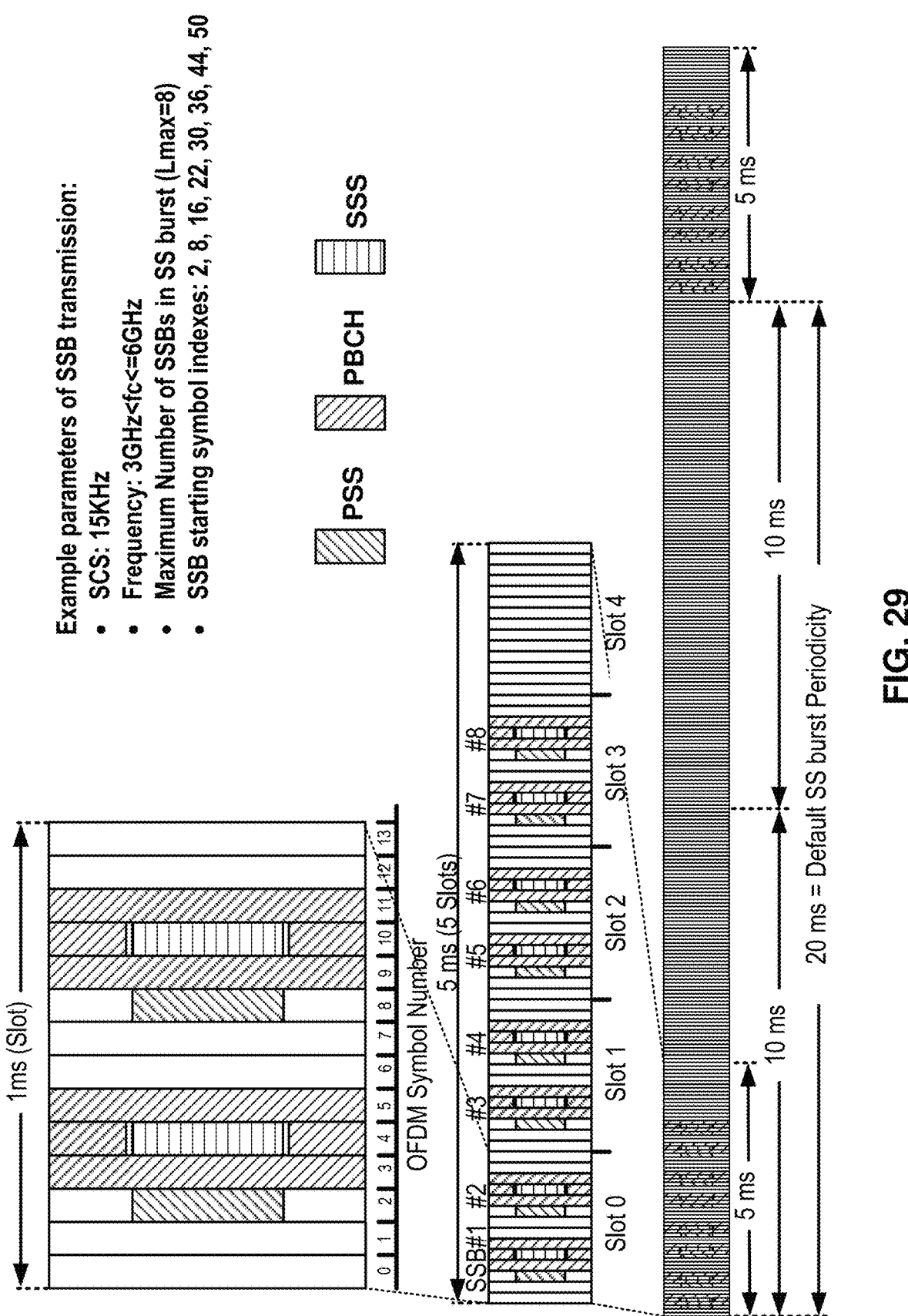
FIG. 29 illustrates an aspect of an example embodiment according to the present disclosure.

FIG. 29 shows an example of SSB transmission of a cell by a base station. In the example of FIG. 29, an SCS of the cell is 15 kHz, and the cell is configured with 3 GHZ<fc<=6 GHZ. Based on example embodiment of FIG. 29, maximum number of candidate SSBs in a SSB burst is 8 (Lmax=8). As shown in FIG. 29, SSB #1 starts at symbol #2 of 70 symbols in 5 ms, SSB #2 starts at symbol #8, SSB #3 starts at symbol #16, SSB #4 starts at symbol #22, SSB #5 starts at symbol #30, SSB #6 starts at symbol #36, SSB #7 starts at symbol #44, and SSB #8 starts at symbol 50. The SSB burst is transmitted in the first half (not the second half as shown in FIG. 29) of a radio frame with 10 ms.

In an example, the SSB bust (also for each SSB of the SSB burst) may be transmitted in a periodicity. In the example of FIG. 29, a default periodicity of a SSB burst is 20 ms, e.g., before a wireless device receives a SIB1 message for initial access of the cell. The base station, with 20 ms transmission periodicity of SSB (or SSB burst), may transmit the SSB burst in the first 5 ms of each 20 ms. The base station does not transmit the SSB burst in the rest 15 ms of the each 20 ms.

In an example, a base station may transmit RRC messages (e.g., SIB1 and/or ServingCellConfigCommon IE) indicating cell specific configuration parameters of SSB transmission of a serving cell (e.g., a PCell or a SCell). The cell specific configuration parameters may comprise a value for a transmission periodicity (ssb-PeriodicityServingCell) of a SSB burst, locations of a number of SSBs (e.g., active SSBs), of a plurality of candidate SSBs, comprised in the SSB burst. The plurality of candidate SSBs may be implemented based on example embodiments described above with respect to FIG. 29. The cell specific configuration parameters may comprise position indication of a SSB in a SSB burst (e.g., ssb-PositionsinBurst). The position indication may comprise a first bitmap (e.g., groupPresence) and a second bitmap (e.g., inOneGroup) indicating locations of a number of SSBs comprised in a SSB burst.

In an example, SIB1 contains information relevant when evaluating if a wireless device is allowed to access a cell and defines the scheduling of other system information (e.g., SIB2/3/4/ . . . ). It also contains radio resource configuration information that is common for all wireless devices and barring information applied to unified access control. SIB1 includes information regarding the availability and scheduling (e.g. mapping of SIBs to SI message, periodicity, SI-window size) of other SIBs with an indication whether one or more SIBs are only provided on-demand and, in that case, the configuration needed by the wireless device to perform the SI request. SIB1 is a cell-specific SIB.

In an example, SIBs other than SIB1 and posSIBs are carried in SystemInformation (SI) messages, which are transmitted on the DL-SCH. Only SIBs or posSIBs having the same periodicity may be mapped to the same SI message. SIBs and posSIBs are mapped to different SI messages, i.e. an SI message contains either only SIBs or only posSIBs. Each SI message is transmitted within periodically occurring time domain windows (referred to as SI-windows with same length for all SI messages). Each SI message is associated with an SI-window and the SI-windows of different SI messages do not overlap. That is, within one SI-window only the corresponding SI message is transmitted. An SI message may be repeated with the same content a number of times within the SI-window. Any SIB or posSIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systeminformationAreaID.

In an example, a base station may transmit a Master Information Block (MIB) on PBCH, to indicate configuration parameters (e.g., PDCCH-ConfigSIB1 as shown in FIG. 24A) for a wireless device monitoring PDCCH for receiving a SIB1 message. The PDCCH-ConfigSIB1 IE may indicate a resource configuration index (ControlResourceSetZero indicating SSB and CORESET multiplex pattern, number of RBs for the CORESET, number of symbols of the CORESET and frequency offset of the CORESET relative to a reference point of the cell, as shown in FIG. 24B) for CORESET #0 (corresponding to the CORESET for Type0-PDCCH CSS set) for the SIB1 message. The PDCCH-ConfigSIB1 IE may indicate a resource configuration index (SearchSpaceZero indicating, a time offset, number of search space sets in a slot, first symbol index, etc., as shown in FIG. 24C) for search space #0 for the SIB1 message. The base station may transmit a MIB message with a transmission periodicity of 80 millisecond (ms). The same MIB message may be repeated (according to SSB periodicity) within the 80 ms. Contents of a MIB message are same over 80 ms period. The same MIB is transmitted over all SSBs within a SS burst. In an example, PBCH may indicate that there is no associated SIB1, in which case a wireless device may be pointed to another frequency from where to search for an SSB that is associated with a SIB1 as well as a frequency range where the wireless device may assume no SSB associated with SIB1 is present. The indicated frequency range may be confined within a contiguous spectrum allocation of the same operator in which SSB is detected.

In an example, as a first option, a base station may transmit SSB and CORESET #0 multiplexed in time domain, wherein the symbols used for SSB transmissions and the symbols used for CORESET #0 are not overlapping in time domain, in which case, the transmission of SSB and CORESET #0 may be referred to as SSB and CORESET #0 multiplexing pattern 1. Different from the SSB and CORESET #0 multiplexing pattern 1, as a second option, the base station may transmit the SSB and CORESET #0 in different symbols (or time domain multiplexed) while the PDSCH (containing SIB1 message) scheduled by a DCI via CORESET #0 are frequency domain multiplexed with the SSB, in which case, the transmission of SSB and CORESET #0 may be referred to as SSB and CORESET #0 multiplexing pattern 2. As a third option, the base station may transmit SSB and CORESET #0 and the PDSCH multiplexed in frequency domain, wherein the symbols used for SSB transmissions and the symbols used for CORESET #0/PDSCH are overlapping in time domain, in which case, the transmission of SSB and CORESET #0 may be referred to as SSB and CORESET #0 multiplexing pattern 3.

In an example, if during cell search a wireless device determines from MIB that a CORESET for Type0-PDCCH CSS set is present, the wireless device determines a number of consecutive resource blocks and a number of consecutive symbols for the CORESET of the Type0-PDCCH CSS set from controlResourceSetZero in pdcch-ConfigSIB1, (e.g., as described in Tables 13-0 through 13-10 of 3GPP TS 38.213, one example table of which is shown in FIG. 24B), for operation without shared spectrum channel access in FR1, FR2-1 and FR2-NTN, or as described in Tables 13-1A and 13-4A of 3GPP TS 38.213 for operation with shared spectrum channel access in FR1, or as described in Table 13-10A of 3GPP TS 38.213 for FR2-2, and determines PDCCH monitoring occasions from searchSpaceZero in pdcch-ConfigSIB1, included in MIB, (as described in Tables 13-11 through 13-15A of 3GPP TS 38.213, one example table of which is shown in FIG. 24C). $SFN_c$ and $n_c$ are the SFN and slot index within a frame of the CORESET based on SCS of the CORESET and $SFN_{SSB,i}$ and $n_{SSB,i}$ are the SFN and slot index based on SCS of the CORESET, respectively, where the SS/PBCH block with index i overlaps in time with system frame $SFN_{SSB,i}$ and slot $n_{SSB,i}$. The symbols of the CORESET associated with pdcch-ConfigSIB1 in MIB or with searchSpaceSIB1 in PDCCH-ConfigCommon have normal cyclic prefix.

In an example, in Table 13-0 of TS 38.213 or FIG. 24B, configurations with index 0 to 9 are applicable when an associated SS/PBCH block is located according to Table 5.4.3.3-2 in 3GPP TS 38.101-1, configurations with index 10 to 11 are applicable when an associated SS/PBCH block is located according to NOTE 12 of Table 5.4.3.3-1 in 3GPP TS 38.101-1, and non-interleaved CCE-to-REG mapping applies for configurations with index 6 to 9.

In an example, the base station may transmit a DCI (or a group common DCI), scheduling the SIB1 message, via a PDCCH with SI-RNTI according to configuration parameters of search space #0 (searchSpaceZero) and control resource set #0 (controlResourceSetZero) indicated by the MIB messages. The base station may transmit a SIB1 message with a periodicity of 160 ms. The base station may transmit the same SIB1 message with variable transmission repetition periodicity within 160 ms. The default transmission repetition periodicity of SIB1 is 20 ms. The base station may determine an actual transmission repetition periodicity based on network implementation. In an example, for SSB and CORESET multiplexing pattern 1, SIB1 repetition transmission period is 20 ms. For SSB and CORESET multiplexing pattern 2/3, SIB1 transmission repetition period is the same as the SSB period. SIB1 may comprise information regarding the availability and scheduling (e.g., mapping of SIBs to SI message, periodicity, SI-window size) of other SIBs, an indication whether one or more SIBs are only provided on-demand and in which case, configuration parameters needed by a wireless device to perform an SI request.

In an example, a base station may transmit SSBs/SIB1 over each serving cell (e.g., a PCell or an SCell) of multiple serving cells configured for a wireless device. The base station may transmit SSBs/SIB1 over some serving cells of the multiple serving cells and may not transmit SSBs/SIB1 over other serving cells of the multiple serving cells. A serving cell without SSBs/SIB1 may be referred to as an SSB/SIB1-less serving cell. A serving cell with SSBs/SIB1 always transmitted by the base station may be referred to as an always-on-SSBs/SIB1 serving cell.

In an example, the MIB message may comprise a ssb-SubcarrierOffset (as shown in FIG. 24A) indicating a frequency domain offset (corresponding to $k_{SSB}$) between SSB and the overall resource block grid in number of subcarriers. The ssb-SubcarrierOffset field may indicate that the cell does not provide SIB1 and that there is hence no CORESET #0 configured in MIB. The wireless device may determine, from MIB, upon detection of a SSB, that a CORESET for Type0-PDCCH CSS set (corresponding to CORESET #0), is present if $k_{SSB}<=23$ for FR1 or if $k_{SSB}<=11$ for FR2. The wireless device may determine, from MIB, that CORESET #0 is not present if $k_{SSB}>23$ for FR1 or if $k_{SSB}>11$ for FR2. In this case, the field pdcch-ConfigSIB1 of the MIB message may indicate the frequency positions where the wireless device may (not) find a SSB with CORESET #0 and search space #0 for SIB1. If the field ssb-SubcarrierOffset indicates that SIB1 is absent, the field pdcch-ConfigSIB1 of the MIB message may indicate the frequency positions where the wireless device may find SSB with SIB1 or the frequency range where the network does not provide SSB with SIB1, e.g., according to 3GPP standard specification TS 38.213, clause 13.

In an example, a wireless device, for operation without shared spectrum channel access and for the SSB and CORESET multiplexing pattern 1, may monitor PDCCH in the Type0-PDCCH CSS set (corresponding to search space #0) over two slots. For a SSB with index i, the wireless device may determine an index of slot $n_0$ as $$n_0 = (O \cdot 2^\mu + \lfloor i \cdot M \rfloor) \bmod N_{slot}^{frame,\mu}$$

that is in a frame with system frame number (SFN) $SFN_C$ satisfying $$SFN_c \bmod 2 = 0 \text{ if } \left\lfloor (O \cdot 2^\mu + \lfloor i \cdot M \rfloor) / N_{slot}^{frame,\mu} \right\rfloor \bmod 2 = 0$$

or in a frame with SFN satisfying $SFN_c \bmod 2 = 1$ if $$\left\lfloor (O \cdot 2^\mu + \lfloor i \cdot M \rfloor) / N_{slot}^{frame,\mu} \right\rfloor \bmod 2 = 1$$

where $\mu \in \{0,1,2,3,5,6\}$ based on the SCS for PDCCH receptions in the CORESET. In an example, M, O, and the index of the first symbol of the CORESET may be indicated by SearchSpaceZero, e.g., as shown in FIG. 24C. For $\mu \in \{0, 1, 2, 3\}$ and for a SSB index i, the two slots including the associated Type0-PDCCH monitoring occasions are slots $n_0$ and $n_0+1$. For $\mu=5$ and for a SSB index i, the two slots including the associated Type0-PDCCH monitoring occasions are slots $n_0$ and $n_0+4$. For $\mu=6$ and for a SSB index i, the two slots including the associated Type0-PDCCH monitoring occasions are slots $n_0$ and $n_0+8$, etc.

In an example, a wireless device, for operation without shared spectrum channel access and for the SSB and CORESET multiplexing pattern 2 and/or 3, may monitor PDCCH in the Type0-PDCCH CSS set over one slot with Type0-PDCCH CSS set periodicity equal to the periodicity of SSB. For a SSB with index i, the UE determines, based on SearchSpaceZero, the slot index $n_c$ and $SFN_c$ based on parameters provided by Tables 13-13 through 13-15A of 3GPP TS 38.213 clause 13.

In an example, a wireless device, for the SSB and CORESET multiplexing patterns 2 and 3, if the active DL BWP is the initial DL BWP, may be expected to be able to perform radio link monitoring (RLM) and measurements for radio resource management (RRM) using a SSB that provides a CORESET for Type0-PDCCH CSS set.

In an example, if a wireless device detects a first SSB and determines that a CORESET for Type0-PDCCH CSS set is not present, and for $24 \leq k_{SSB} \leq 29$ for FR1 or for $12 \leq k_{SSB} \leq 13$ for FR2, the wireless device may determine the nearest (in the corresponding frequency direction) global synchronization channel number (GSCN) of a second SSB having a CORESET for an associated Type0-PDCCH CSS set as $$N_{GSCN}^{Reference} + N_{GSCN}^{Offset} \cdot N_{GSCN}^{Reference}$$

is the GSCN of the first SSB and $$N_{GSCN}^{Offset}$$

is a GSCN offset (e.g., provided by Table 13-16 for FR1 and Table 13-17 for FR2 in TS 38.213, clause 13). If the wireless device detects the second SSB and the second SSB does not provide a CORESET for Type0-PDCCH CSS set, the wireless device may ignore the information related to GSCN of SSB locations for performing cell search.

In an example, if a wireless device detects a SSB and determines that a CORESET for Type0-PDCCH CSS set is not present, and for $k_{SSB}=31$ for FR1 or for $k_{SSB}=15$ for FR2, the wireless device determines that there is no SSB having an associated Type0-PDCCH CSS set within a GSCN range $$\left[ N_{GSCN}^{Reference} - N_{GSCN}^{Start}, N_{GSCN}^{Reference} + N_{GSCN}^{End} \right]. \ N_{GSCN}^{Start} \text{ and } N_{GSCN}^{End}$$

are respectively determined by controlResourceSetZero and searchSpaceZero in pdcch-ConfigSIB1. If the GSCN range is $$\left[ N_{GSCN}^{Reference}, N_{GSCN}^{Reference} \right],$$

the wireless device determines that there is no information for a second SSB with a CORESET for an associated Type0-PDCCH CSS set on the detected SSB.

In an example, if a wireless device does not detect any SSB providing a CORESET for Type0-PDCCH CSS set, within a time period determined by the wireless device, the wireless device may ignore the information related to GSCN of SSBs in performing cell search.

For a serving cell without transmission of SSBs, the wireless device may acquire time and frequency synchronization with the serving cell based on receptions of SSBs on the PCell, or on the PSCell, of the cell group for the serving cell.

In an example, the base station may transmit a SIB1 message of a cell via RRC Reconfiguration message (e.g., comprising dedicatedSIB1-Delivery IE), different from the broadcasted SIB1 message scheduled by DCI with SI-RNTI in search space #0 and CORESET #0.

In addition to always-on SSBs/SIB1 and SSBs/SIB1-less, a base station may transmit SSBs/SIB1 over a cell based on indication from a wireless device, or from another base station, and/or triggered by the base station itself (e.g., by transmitting a SCell activation/deactivation MAC CE). When there is no indication from the wireless device or from another base station or there is no trigger from the base station, the base station may stop/skip transmitting the SSBs/SIB1. The SSBs/SIB1 transmitted/stopped upon a request may be referred to as on-demand SSBs/SIB1.

In an example, a wireless device may acquire essential system information (e.g., MIB or SIB1) as described above, e.g., when performing camping a cell in RRC_IDLE state or performing handover to a neighbor cell in RRC_CONNECTED state. The wireless device, if ssb-SubcarrierOffset indicates SIB1 is transmitted in the cell and if SIB1 acquisition is required for the wireless device, may acquire the SIB1, which is scheduled by a DCI with SI-RNTI via PDCCH occasions according to search space #0 and CORESET #0 of the cell. The wireless device may not be able to acquire the SIB1 message. When the wireless device is unable to acquire the SIB1 message, the wireless device may consider the cell is barred and perform a cell re-selection to another cell in the same frequency.

Figure 30:
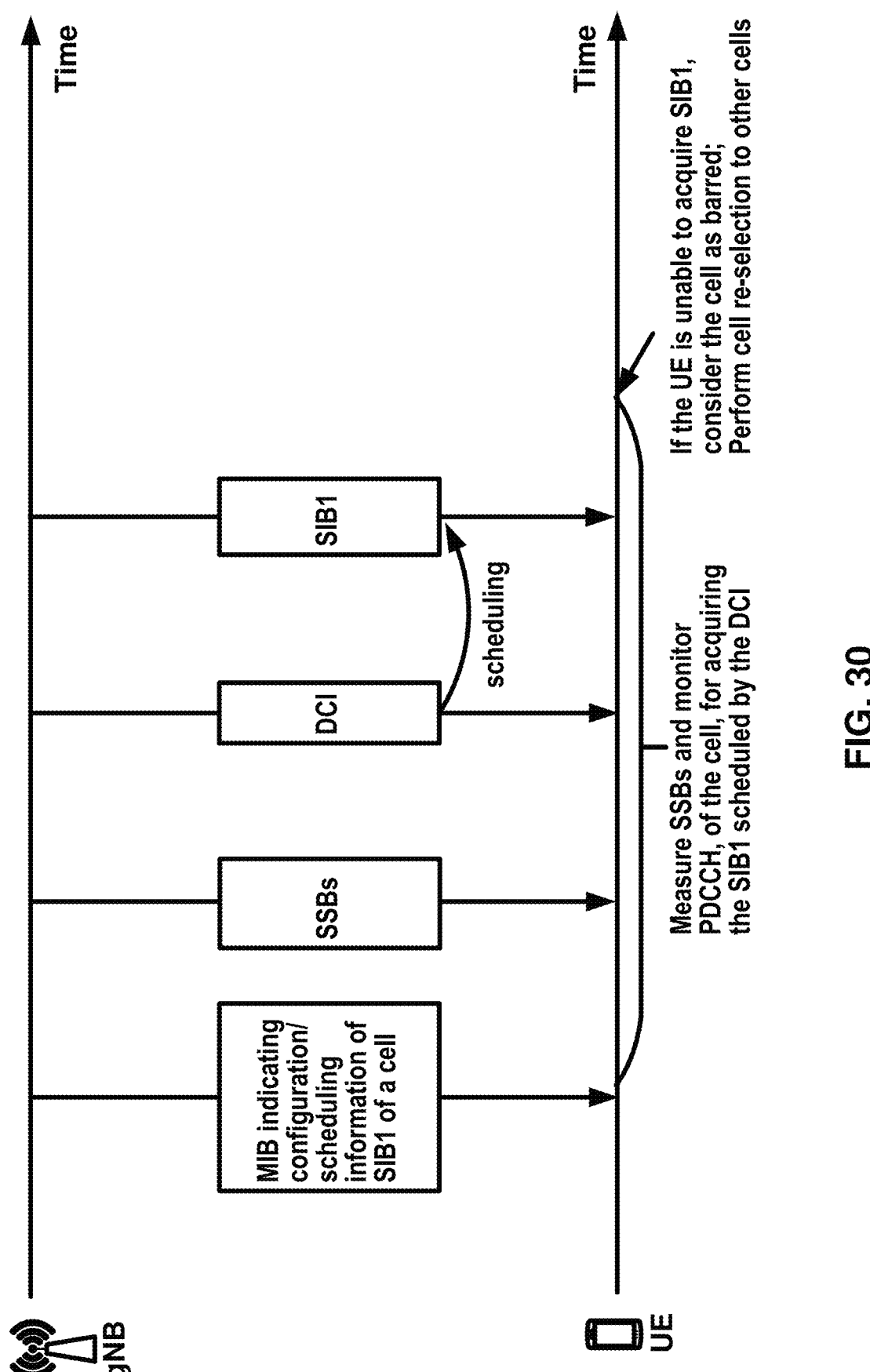
FIG. 30 illustrates an aspect of an example embodiment according to the present disclosure.

FIG. 30 shows an example of essential system information missing procedure. In an example, a wireless device receives, and/or a base station transmits, a MIB message comprising configuration and/or scheduling information of a SIB message of a cell. The configuration and/or the scheduling information may be implemented based on examples above and/or FIG. 24A, FIG. 24B and/or FIG. 24C. The wireless device, based on the MIB message, may detect/receive SSBs of the cell. A SSB may be implemented based on examples of FIG. 28 and/or FIG. 29.

In an example, as shown in FIG. 30, the wireless device may measure the SSBs and select the cell. The wireless device, based on selecting the cell, may monitor PDCCH via search space #0 of CORESET #0 of the cell based on the MIB message. In response to receiving a DCI scheduling SIB1 message based on monitoring the PDCCH via search space #0 of CORESET #0 of the cell, the wireless device may obtain the cell common configuration parameters (e.g., based on example of FIG. 25) of the cell and acquire other system information (e.g., SIB2, SIB3, etc.,) based on the cell common configuration parameters of the cell. The wireless device may camp on the cell. The wireless device may perform an initial access procedure (e.g., based on examples of FIG. 13A, FIG. 13B and/or FIG. 13C) via the cell, based on the cell common configuration parameters of the cell.

In an example, the wireless device may not receive/decode the DCI scheduling the SIB1 message according to the configuration of search space #0 and CORESET #0 of the cell based on the MIB message. In an example, the wireless device may not receive/decode the DCI due to bad channel quality of the PDCCH carrying the DCI. The wireless device may not decode the SIB1 message carried in a PDSCH transmission scheduled by the DCI with CRC scrambled by SI-RNTI. In an example, the wireless device may not decode the SIB1 message due to bad channel quality of the PDSCH carrying the SIB1 message. In response to the MIB being acquired and the SIB1 not being acquired (e.g., due to not decoding the DCI and/or the PDSCH carrying the SIB1 message), the wireless device may determine/consider the cell as barred (even if the cell is not indicated as barred in the MIB message). The wireless device, if it is a RedCap wireless device, may perform barring (as shown below) as if intraFreqReselectionRedCap of a SIB1 message is set to allowed. The wireless device, if it is not a RedCap wireless device, may perform cell re-selection to other cells on the same frequency as the barred cell.

In an example, when cell status "barred" is indicated or to be treated as if the cell status is "barred" for the cell, a wireless device may not be permitted to select/reselect this cell, not even for emergency calls and may select another cell according to the following rule:

If the cell is to be treated as if the cell status is "barred" due to being unable to acquire the MIB:

the wireless device may exclude the barred cell as a candidate for cell selection/reselection for up to 300 seconds.

the wireless device may select another cell on the same frequency if the selection criteria are fulfilled.

else:

If the wireless device is a RedCap wireless device, the wireless device may acquire SIB1 and, in the remainder of this procedure, consider 'intraFreqReselection in MIB' to be 'intraFreqReselectionRedCap in SIB1', if available.

If the cell is to be treated as if the cell status is "barred" due to being unable to acquire the SIB1:

the wireless device may exclude the barred cell as a candidate for cell selection/reselection for up to 300 seconds.

the wireless device may select another cell on the same frequency if the selection criteria are fulfilled.

If the cell status "barred" is indicated in MIB but the wireless device is unable to acquire the SIB1; or If the cell is to be treated as if the cell status is "barred" due to not supporting RedCap wireless devices:

the wireless device may exclude the barred cell as a candidate for cell selection/reselection for 300 seconds.

the wireless device may select another cell on the same frequency if re-selection criteria are fulfilled.

If the wireless device is not a RedCap wireless device, or if the wireless device is a RedCap wireless device and intraFreqReselectionRedCap in SIB1 is available:

If the field intraFreqReselection in MIB message is set to "allowed":

the wireless device may select another cell on the same frequency if re-selection criteria are fulfilled;

If the cell is to be treated as if the cell status is "barred" due to being unable to acquire the SIB1:

the wireless device may exclude the barred cell as a candidate for cell selection/reselection for up to 300 seconds;

else:

the wireless device may exclude the barred cell as a candidate for cell selection/reselection for 300 seconds.

If the field intraFreqReselection in MIB message is set to "not allowed":

If the cell is to be treated as if the cell status is "barred" due to being unable to acquire the SIB1:

the wireless device may exclude the barred cell as a candidate for cell selection/reselection for up to 300 seconds;

If the cell operates in licensed spectrum:

the wireless device may not re-select to another cell on the same frequency as the barred cell and exclude such cell(s) as candidate(s) for cell selection/reselection for 300 seconds;

else:

the wireless device may select to another cell on the same frequency if the reselection criteria are fulfilled.

else:

If the cell operates in licensed spectrum, or if this cell belongs to a PLMN which is indicated as being equivalent to the registered PLMN or the selected PLMN of the wireless device, or if this cell belongs to the registered SNPN or the selected SNPN of the wireless device:

the wireless device shall not re-select to another cell on the same frequency as the barred cell and exclude such cell(s) as candidate(s) for cell selection/reselection for 300 seconds;

else:

the wireless device may select to another cell on the same frequency if the reselection criteria are fulfilled.

the wireless device shall exclude the barred cell as a candidate for cell selection/reselection for 300 seconds.

In an example, a wireless device may use a valid stored version of the SI except MIB, SIB1, SIB6, SIB7 or SIB8 e.g., after cell re-selection, upon return from out of coverage or after the reception of SI change indication. The value Tag and expiration Time for posSIB is optionally provided in assistanceData SIB-Element.

In an example, allowing the wireless device to select other cell in response to not acquiring SIB1 message from a selected cell for camping may reduce power consumption of the wireless device for finding a suitable cell for camping. Otherwise, the wireless device may keep trying to decode the SIB1 message in vain when the channel quality of the PDCCH/PDSCH is not good enough on the selected cell.

Figure 31:
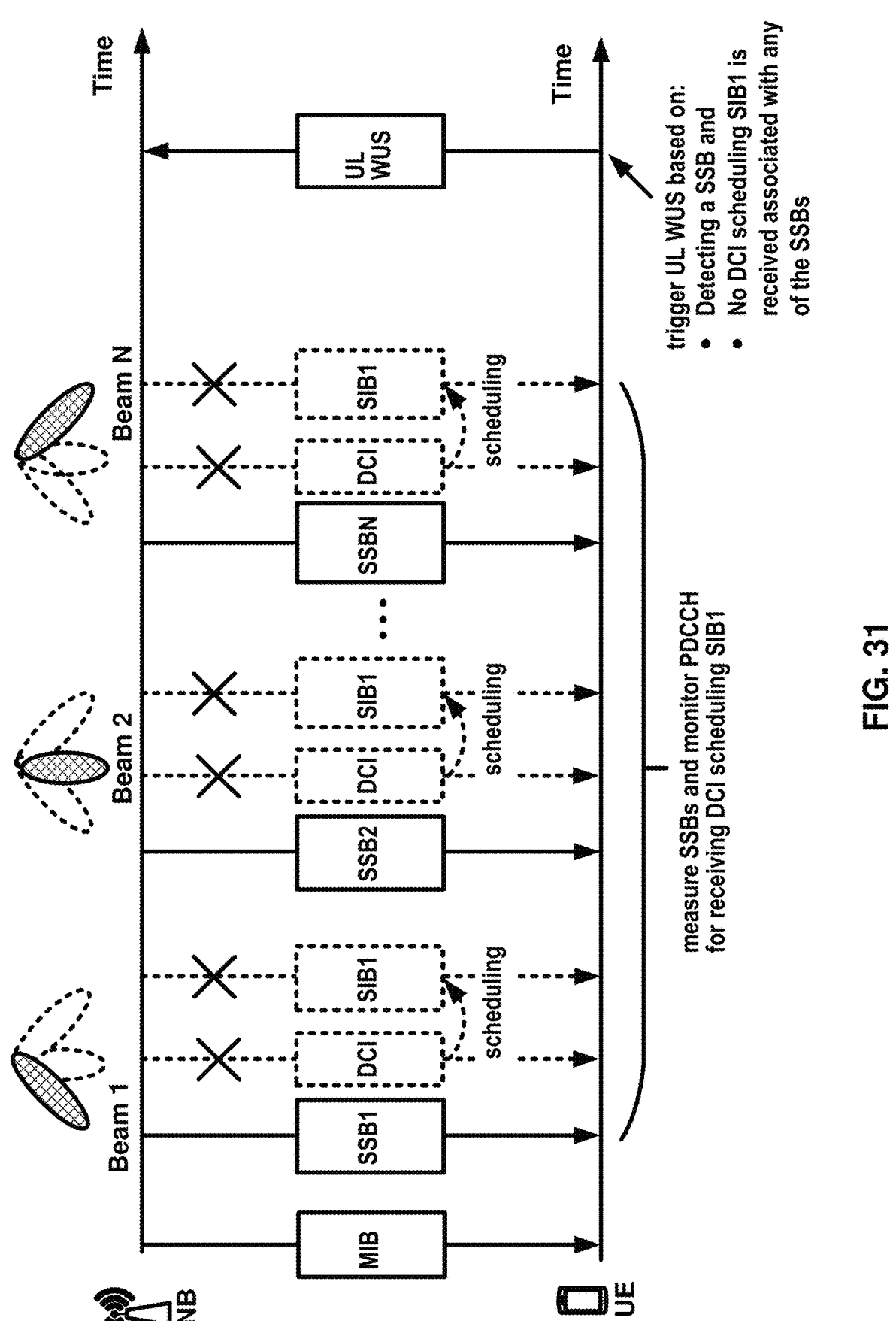
FIG. 31 illustrates an aspect of an example embodiment according to the present disclosure.

FIG. 31 shows an example of on-demand SIB1 transmission based on an uplink (UL) wake-up signal (WUS). A wireless device (e.g., in an RRC_IDLE state) may receive a MIB message from a cell. The MIB message may be implemented based on examples of FIG. 24A, FIG. 24B and/or FIG. 24C. The MIB message may indicate whether SSB and/or SIB1 message are transmitted via the cell, based on examples of FIG. 24A, FIG. 24B and/or FIG. 24C and/or descriptions as above.

In the example of FIG. 31, the SIB1 message may be on-demand transmitted or may not be always transmitted via the cell, for network energy saving. The SSBs (e.g., SSB1, SSB2, . . . , SSBN) may be periodically transmitted via the cell based on example of FIG. 29. Different SSBs may be transmitted with different beams, e.g., SSB1 with Beam 1, SSB2 with Beam 2, . . . , SSBN with Beam N. The (time domain and/or frequency domain) multiplexing between a SSB and a type0 CSS for a DCI scheduling the SIB1 message (and the PDSCH carrying the SIB1 message) may be implemented based on examples above.

In the example of FIG. 31, the wireless device may measure the SSBs (e.g., by detecting the PCI of the cell) and monitor PDCCH (via the type0 CSS of the CORESET #0 of the cell) for receiving the DCI (with CRC bits being scrambled by SI-RNTI) scheduling the SIB1 message. One or more PDCCH monitoring occasions of the PDCCH may be determined based on a corresponding SSB and the multiplexing pattern of the SSB and the type0 CSS as described above. Different SSBs may be associated with different PDCCH monitoring occasions. The wireless device may use the same receiving beam (or spatial domain filter) to receive a SSB and monitor one or more PDCCH monitoring occasions, corresponding to the SSB, of the type0 CSS. The DCIs, scheduling SIB1 message, transmitted via different PDCCH occasions corresponding to different SSBs may have the same contents. The SIB1 messages received according to the DCIs may have the same content, e.g., when the SIB1 message has not been changed.

In the example of FIG. 31, the wireless device may receive one or more SSBs of the SSBs in a period of the transmission of the SSBs, while the wireless device may not detect the DCI scheduling the SIB1 message or may not decode the SIB1 message in a transmission period of the SIB1 message. The periodicity of the SSBs and the periodicity of the SIB1 message/type0 CSS may be implemented based on examples above. In response to receiving at least one SSB and not receiving the SIB1 message, the wireless device may trigger the WUS transmission.

In an example, A (UL) WUS may be a signal sequence like (or same as) a preamble for a RACH procedure, or similar to a sounding reference signal (SRS), or a new signal sequence specifically configured or preconfigured for requesting the SIB1 message.

After the wireless device receives a RAR corresponding to the UL WUS requesting the SIB1 message, the wireless device may monitor PDCCH occasions (in a period) of the type0 CSS for receiving the DCI scheduling the SIB1 message. The base station, after transmitting the RAR, may start the transmission of the SIB1 message. Different from existing on-demand system information (SI) (e.g., comprising SIB2, SIB3 . . . , etc.) which are transmitted by the base station in dedicated RRC message upon receiving a pre-amble configured for the on-demand SI request, the base station, upon receiving the WUS and/or after transmitting the RAR, may start to broadcast the on-demand SIB1 message by transmitting a DCI format 1_0, scheduling the on-demand SIB1 message, with SI-RNTI in PDCCH occasions associated with a type0 CSS of CORESET #0 of the cell.

In existing technologies, the on-demand SI (e.g., SIB2/3/4 . . . , not including SIB1) transmission may be configured (e.g., by si-SchedulingInfo) with contention-free RACH resources in SIB1 message.

In this specification, the SIB1 message triggered by a (UL) WUS may be referred to an on-demand SIB1 message, which is different from always-on SIB1 message in a legacy system (where the legacy system does not implement network energy saving operation). The base station, by not always transmitting the SIB1 message and/or by triggering the transmission of the SIB1 message upon receiving a WUS, may reduce power consumption of the transmission of the common message/signaling, e.g., when there is no active wireless device in the cell.

Figure 32:
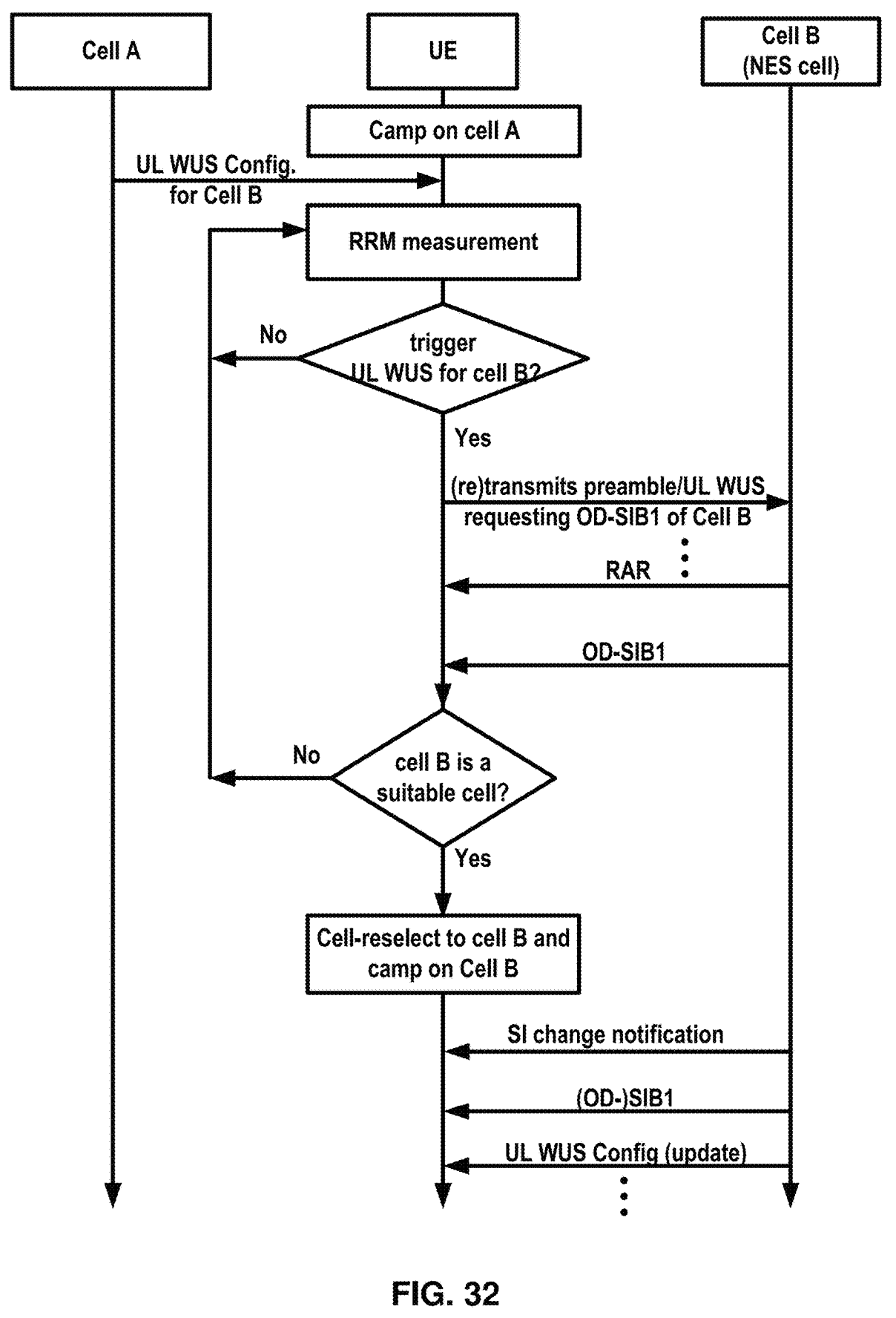

FIG. 32 shows an example of a flowchart of on-demand SIB1 request. In an example, a wireless device, e.g., in RRC_IDLE state or RRC_INACTIVE state, may select a first cell (e.g., Cell A in the example of FIG. 32) to camp on. The first cell may be a normal cell, a non-NES cell. The first cell may be a suitable cell selected by the wireless device to camp on.

In this specification, a NES cell may be a cell on which SIB1 message may be not always broadcasted and may be triggered upon receiving by a base station from a wireless device an UL WUS configured for requesting the SIB1 message. The NES cell may be barred for a legacy wireless device who does not support UL WUS transmission requesting SIB1 message. SSBs may be always transmitted on the NES cell.

In this specification, a non-NES cell may be a cell on which SIB1 message may be always broadcasted. The non-NES cell may be accessible (or selected/camped on) by a legacy wireless device who does not support UL WUS transmission requesting SIB1 message. The non-NES cell may be accessible (or selected/camped on) by a wireless device who supports UL WUS transmission requesting SIB1 message.

In an example, when the wireless device camps on the first cell, the wireless device may perform one or more tasks comprising at least one of: monitoring the paging channel of the cell according to information broadcast in SIB1, monitoring Short Messages transmitted with P-RNTI over DCI, monitoring relevant System Information, performing necessary measurements for the cell reselection evaluation procedure, executing the cell reselection evaluation process on one or more occasions/triggers. The one or more occasions/triggers may comprise: 1) UE internal triggers, so as to meet performance according to RRM requirement, 2) when information on the BCCH used for the cell reselection evaluation procedure has been modified, 3) when the network slice(s) and/or NSAG information received from NAS changes, etc.

In the example of FIG. 32, the wireless device, while camping on the first cell, may receive UL WUS configuration for a second cell (e.g., Cell B which is a NES cell). The UL WUS configuration comprises configuration parameters of downlink/uplink resources of the UL WUS used for requesting SIB1 of the second cell. In an example, the UL WUS configuration may be transmitted, via the first cell, in a SIB message. The SIB message may be different from the existing SIB messages (e.g., SIB1/2/3/4/5/ . . . /25) of the first cell. The SIB message may be a new SIB message (e.g., SIB3bis, SIB4bis, SIB26). The new SIB message may be implemented based on examples of FIG. 33 which will be described later in this specification.

In the example of FIG. 32, the wireless device, while camping on the first cell, may perform radio resource management (RRM) measurement for cell re-selection. The wireless device, when performing the RRM measurement, may determine that the second cell (or SSB(s) of the second cell) has a higher cell quality (e.g., cell/beam level RSRP/RSRQ/SINR, etc.) than the first cell (or SSB(s) of the first cell).

In an example, the wireless device, before performing cell re-selection to the second cell, may trigger a transmission of the UL WUS according to the configuration parameters of the UL WUS configuration, based on one or more conditions. The one or more conditions may comprise at least one of: when the wireless device determines that the second cell has a higher cell quality than the first cell, when the UL WUS configuration indicates configuration parameters of SIB1 request (or on-demand SIB1 request) associated with the UL WUS, and/or when the wireless device determines that the SIB1 of the second cell is not broadcast, etc.

In an example, the transmission of the UL WUS may be implemented based on a random access (RA) procedure. RA procedure may be implemented based on examples of FIG. 13A, FIG. 13B and/or FIG. 13C. The wireless device may initiate/trigger an RA procedure for the transmission of the UL WUS according to the configuration parameters of the UL WUS configuration.

In an example, if the wireless device receives the SIB1 from the second cell before the wireless device triggers the UL WUS, the wireless device may skip the UL WUS transmission or may skip the RA procedure for requesting the SIB1 of the second cell.

In an example, if the wireless device does not trigger the transmission of the UL WUS (e.g., due to the second cell not having higher cell quality than the first cell), the wireless device may continue the RRM measurement for evaluating other neighboring cells.

In the example of FIG. 32, upon triggering the UL WUS, the wireless device may transmit a RACH preamble configured in the UL WUS configuration, via a RACH resource (or RACH occasion) of the second cell, to the second cell. The wireless device, in response to transmitting the RACH preamble, may monitor a search space of the second cell for receiving a RAR corresponding to the RACH preamble. The search space may be configured in the UL WUS configuration.

In the example of FIG. 32, the wireless device may retransmit the RACH preamble upon no RAR being received within a RA response window (configured in the UL WUS configuration). The wireless device may perform the RACH preamble retransmission based on examples of FIG. 13A, FIG. 13B and/or FIG. 13C.

In the example of FIG. 32, upon receiving the RAR, the wireless device may monitor a search space for receiving the requested (by the UL WUS) SIB1 message (on-demand IB1 in FIG. 32) of the second cell. The search space for receiving the requested SIB1 message may be configured in the UL WUS configuration.

In the example of FIG. 32, upon receiving the on-demand SIB1 of the second cell, the wireless device may determine whether the second cell is a suitable cell based on the contents of the on-demand SIB1.

In an example, the wireless device may determine a cell is suitable if the follow conditions are fulfilled:

The cell is part of either the selected PLMN or the registered PLMN or PLMN of the Equivalent PLMN list, and for that PLMN either:

The PLMN-ID of that PLMN is broadcast by the cell with no associated CAG-IDs and CAG-only indication in the wireless device for that PLMN is absent or false;

Allowed CAG list in the UE for that PLMN includes a CAG-ID broadcast by the cell for that PLMN;

The cell selection criteria are fulfilled.

In the example of FIG. 32, the wireless device, based on determining that the second cell is a suitable cell, may reselect the second cell and camp on the second cell. The wireless device may perform one or more tasks upon camping on the second cell according to the descriptions above in this specification.

In the example of FIG. 32, the wireless device, when/after camping on the second cell, may receive SI change notification from the second cell. The wireless device, upon receiving the SI change notification, may receive updated system information (e.g., SIB1/2/3/ . . . , etc.), and/or the updated UL WUS configuration of the second cell and/or other NES cells. In another example, the wireless device may perform UL WUS transmission requesting an updated SIB1 (or on-demand SIB1) of the second cell.

In the example of FIG. 32, the UL WUS configuration of NES cell(s) may be received in a new SIBx (e.g., SIB3bis, SIB4bis, SIB26, etc.,) from a non-NES cell (Cell A) or a NES cell (Cell B).

FIG. 33 shows an example of UL WUS configuration in a SIB message, e.g., based on examples of FIG. 32.

In the example of FIG. 33, a wireless device may receive from a base station, in a non-NES cell (Cell A of FIG. 32) or a NES cell (Cell B of FIG. 32), a new SIB (SIB3bis, SIB4bis, SIB26, SIBx, etc.,) message (different from existing SIB messages) indicating UL WUS configuration for requesting SIB1 message of a NES cell.

In the example of FIG. 33, the new SIB may comprise an RRC IE (e.g., NESCellandWusInfo) indicating the UL WUS configuration for requesting SIB1 message of a NES cell.

In the example of FIG. 33, a NESCellandWusInfo IE may comprise a cell ID (e.g., nes-CellId which is a value of PhysCellId) identifying the NES cell, a frequency location indication (e.g., ssb-frequency which is a value of ARFCN-ValueNR) of SSBs of the NES cell, a WUS configuration IE (e.g., a WUSConfig IE), etc.

In the example of FIG. 33, a WUSConfig IE may comprise a WUS common configuration (e.g., WUScomm), a frequency information configuration (e.g., frequencyinfoWUS), a SIB1 request configuration (e.g., SIB-Request-Config), and etc.

In the example of FIG. 33, a WUScomm IE may comprise one or more parameters of RACH configuration of the UL WUS. The one or more parameters may comprise at least one of: a threshold for SSB selection (e.g., rsrp-Threshold-SSB) corresponding to a RACH occasion for the UL WUS transmission, a PRACH root sequence index of the preamble (e.g., prach-RootSequenceIndex), a preamble subcarrier spacing indication (e.g., msg1-SubcarrierSpacing), a restricted set configuration (e.g., restrictedConfig), a search space indication (e.g., RASearchSpace) for RAR reception and/or a control resource set indication (e.g., RAControRe-sourceSet) for RAR reception, etc.

In the example of FIG. 33, a frequencyinfoWUS IE may comprise a frequency band list indication (e.g., frequency- BandList), a point A indication (e.g., absoluteFrequency-PointA), an offset to carrier indication (e.g., offset ToCarrier), a p-MAX indication (e.g., p-MAX), an uplink subcarrier spacing indication (e.g., ULSubCarrierSpacing) of the NES cell, etc.

In the example of FIG. 33, a SIB-RequestConfig IE may comprise a SSB transmission power indication (e.g., ss-PBCH-BlockPower), a SSB block indication (e.g., SSB-positionInBurst), a TDD configuration indication (e.g., tdd-UL-DL-Configuration Common), a RACH occasion configuration (e.g., rach-OccasionsSIB1), an SIB1 request period indication (e.g., sib1-RequestPeriod) of the NES cell, a SIB1 request resource configuration (e.g., sib1-Request-Resources), a search space zero indication (e.g., searchSpaceZero), a control resource set zero indication (e.g., controlResourceSetZero), etc.

In the example of FIG. 33, a rach-OccasionsSIB1 IE may comprise a PRACH configuration index indication (e.g., Prach-ConfigurationIndex), a Msg1 FDM indication (e.g., Msg1-FDM), a zero correlation zone configuration indication (e.g., ZeroCorrelationZoneConfig), a preamble received target power indication (e.g., preambleReceivedTarget-Power), a preamble transmission maximum number indication (e.g., preamble TransMax), a power ramping step indication (e.g., powerRampingStep), a RA response window length indication (e.g., ra-ResponseWindow), a SSB to RACH occasion mapping indication (e.g., ssb-perRACH-Occasion), etc.

In the example of FIG. 33, a sib1-RequestResources IE may comprise a preamble starting index indication (e.g., ra-PreambleStartIndex), a RA association period index (e.g., ra-AssociationPeriodindex), a RA to SSB occasion mask index (e.g., ra-ssb-OccasionMaskIndex), etc.
//Issues.

In existing technologies (as shown in FIG. 32 and/or FIG. 33), to support on-demand SIB1 request for a NES cell, (UL) WUS configuration may be configured on the NES cell. The WUS configuration may indicate search space(s) for receiving RAR corresponding to the WUS/preamble and/or for receiving the requested SIB1 of the NES cell. Existing technologies may cause misalignment between the base station and the wireless device regarding how to monitor PDCCH for receiving the RAR and/or the requested SIB1 and/or how to receive the RAR/SIB1 from the NES cell.

Figure 34:
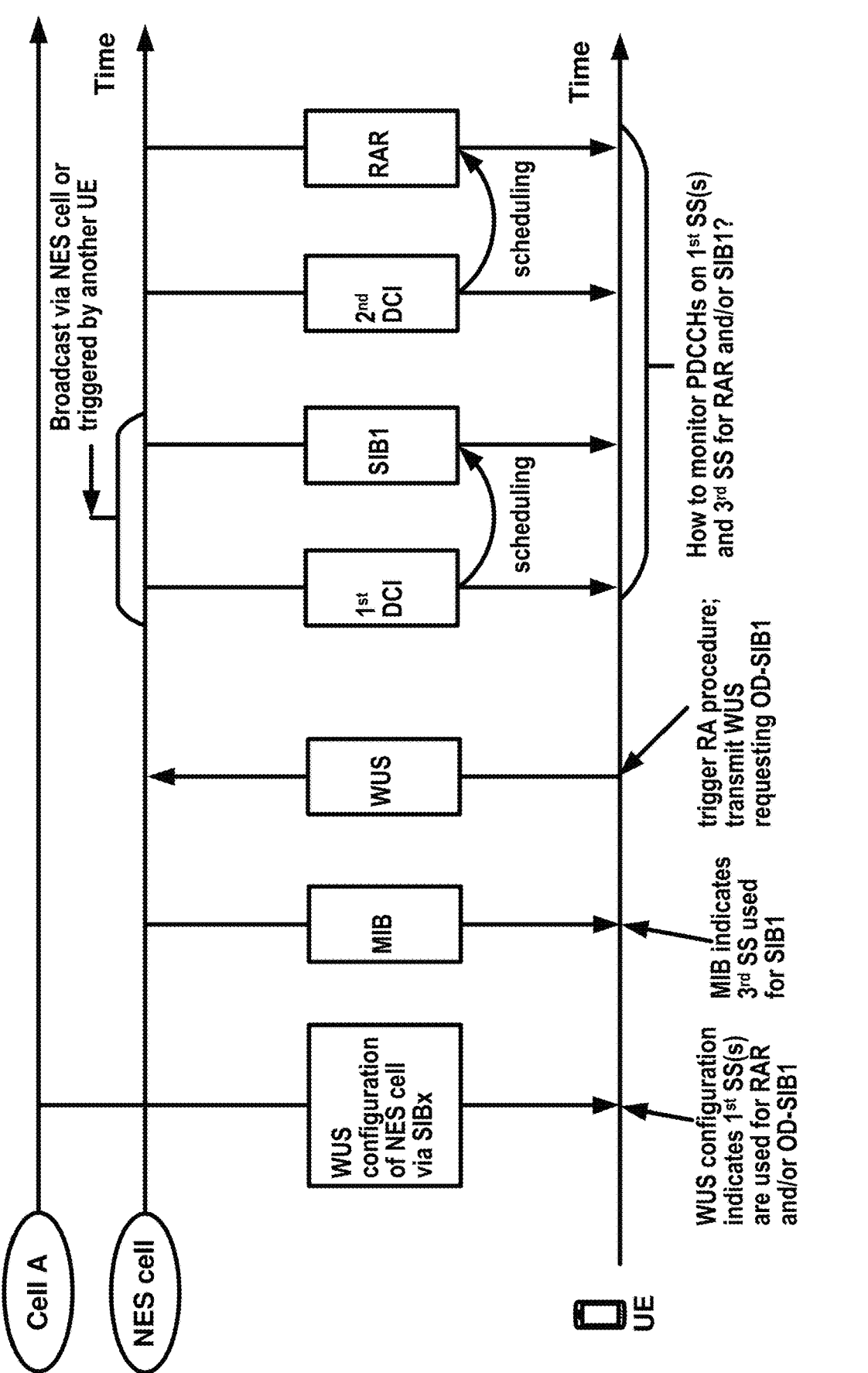
FIG. 34 illustrates an aspect of an example embodiment according to the present disclosure.

FIG. 34 shows example issues of PDCCH monitoring for on-demand SIB1 of a cell. In the example of FIG. 34, a wireless device (e.g., UE) may receive from a first cell (e.g., Cell A) WUS configuration of a NES cell for requesting (on-demand) SIB1 of the NES cell. The WUS configuration may be received via a SIB message (e.g., based on examples of FIG. 32 and/or FIG. 33) of Cell A or Cell B.

In the example of FIG. 34, the WUS configuration may indicate that first search space(s) (SS(s) are used for receiving RAR and/or on-demand SIB1 of the NES cell.

In an example, the first SS(s) may comprise a first SS for receiving the RAR and a second SS for receiving the on-demand SIB1.

In an example, the first SS may be a type1-PDCCH common search space (CSS) as same as the CSS used for RAR reception in legacy system. The second SS may be a type0-PDCCH CSS.

In an example, the first SS may be a type0-PDCCH CSS different from the Type1-PDCCH CSS used for RAR reception in legacy system. The second SS may be a type0-PDCCH CSS.

In the example of FIG. 34, the wireless device receives MIB from the NES cell. The MIB may indicate a third SS (e.g., $3^{rd}$ SS) used for receiving SIB1 of the NES cell. The $3^{rd}$ SS may be indicated as search space zero (searchSpaceZero) by PDCCH-ConfigSIB1 based on examples of FIG. 24A. The base station may transmit the broadcast SIB1 scheduled by a DCI via the third SS of the NES cell based on existing technologies.

In the example of FIG. 34, the wireless device may trigger an RA procedure for transmission(s) of the WUS requesting on-demand SIB1 of the NES cell, e.g., based on examples of FIG. 32.

In the example of FIG. 34, based on existing technologies, the wireless device may monitor the $1^{st}$ SS(s) for receiving the RAR and/or the on-demand SIB1 of the NES cell, while the wireless device may monitor the $3^{rd}$ SS for receiving the (broadcast) SIB1 of the NES cell.

In an example, the wireless device, after transmitting the WUS/preamble for requesting the on-demand SIB1 of the NES cell, may receive the (broadcast) SIB1 of the NES cell, wherein the (broadcast) SIB1 may be broadcast by the base station on the NES cell, or may be triggered by another wireless device. The wireless device may receive the (broadcast) SIB1 before the wireless device receives the RAR corresponding to the WUS/preamble. The wireless device, based on existing technologies, may have difficulties in determining how to deal with the broadcast SIB1 message before receiving the RAR, and/or in determining whether to continue PDCCH monitoring for the RAR after receiving the (broadcast) SIB1 message. In an example, based on existing technologies, the wireless device monitors PDCCH for on-demand SIB1 after receiving the RAR. Based on existing technologies, if the wireless device continues PDCCH monitoring for the RAR after receiving the (broadcast) SIB1 message, the wireless device may waste power for the PDCCH blind decoding associated with the PDCCH monitoring for the RAR. There is a need to specify the wireless device behavior regarding PDCCH monitoring if the SIB1 is received before the RAR.

In existing technologies, the SS, used for receiving the RAR corresponding to the WUS/preamble, is configured in WUS configuration as shown in FIG. 32 and/or FIG. 33. The SS may be configured with radio resources (e.g., one or more resource elements (REs) of the NES cell. It may be possible that the one or more REs of the SS overlaps with resources of other downlink signals (e.g., SSBs, search space zero, other search spaces, PDSCHs, etc.) and/or uplink signals of the NES cell. The wireless device, by implementing existing technologies, may have difficulties in determining how to monitor PDCCH for the RAR in the overlapped REs. The wireless device may miss-detect a DCI (e.g., with CRC scrambled by RA-RNTI) scheduling the RAR based on existing technologies. Missing the DCI scheduling the RAR corresponding to the WUS/preamble requesting on-demand SIB1 of the NES cell may cause more serious problems (e.g., increasing camping latency or cell re-selection latency) than missing the DCI scheduling RAR in legacy RA procedure. There is a need to specify how to configure the SS, for receiving RAR corresponding to WUS/preamble requesting on-demand SIB1 of a NES cell, for improving camping latency or cell re-selection latency, etc.

In existing Rel. 19 NES technologies, WUS configuration of a cell (configured in a new SIB message as shown in FIG. 33) may indicate search space zero (and/or control resource set zero) for receiving on-demand SIB1 of the cell. In existing pre-Rel. 19 technologies, the base station may also transmit a MIB via the cell, indicating the search space zero (and/or control resource set zero) for receiving broadcast SIB1 of the cell. It is unclear in the existing technologies whether the search space zero (and/or control resource set zero) indicated in the WUS configuration and in the MIB is same or not. Based on existing technologies, if search space for receiving RAR corresponding to WUS/preamble requesting on-demand SIB1 of the cell is not configured/ present in the WUS configuration, the wireless device may use search space zero (and/or control resource set zero) for receiving the RAR. However, if search space zero is configured in both WUS configuration and MIB and the two search space zero are different, the wireless device, based on existing technologies, may have difficulties in determining which search space zero (indicated by WUS configuration or indicated by MIB) is used for PDCCH monitoring for the RAR. Existing technologies may increase the latency of SIB1 acquisition and/or camping/cell reselection latency. There is a need to specify how to monitor search space zero for receiving RAR corresponding to WUS/preamble requesting on-demand SIB1, for improving SIB1 acquisition latency, camping latency and/or cell re-selection latency, etc.

In existing Rel.19 NES technologies, WUS configuration of a cell (configured in a new SIB message as shown in FIG. 33) may or may not indicate search space zero (and/or control resource set zero) for receiving on-demand SIB1 of the cell. In existing pre-Rel. 19 technologies, the base station may transmit a MIB via the cell, indicating the search space zero (and/or control resource set zero) for receiving broadcast SIB1 of the cell. It is unclear in the existing technologies whether the search space zero (and/or control resource set zero) indicated in the WUS configuration and in the MIB is same or not. Based on existing technologies, the wireless device may have difficulties in determining which search space zero (and/or control resource set zero) is used for SIB1 reception, if one or both WUS configuration and MIB comprise indications of the search space zero (and/or control resource set zero). There is a need to specify how to monitor search space zero for receiving SIB1, for improving SIB1 acquisition latency, camping latency and/or cell re-selection latency, etc.

//Embodiment Summary

One or more example embodiments comprise receiving, by a wireless device via a first cell, an SIB message (e.g., SIB3bis/SIB4bis/SIB26) comprising configuration parameters of uplink wake-up signal (UL WUS) configuration of a second cell. The configuration parameters indicate a first search space (SS) of the second cell for receiving a RAR corresponding to an UL WUS requesting an SIB1 of the second cell. The wireless device receives, via the second cell, an MIB message indicating a second SS for receiving the SIB1 of the second cell. The wireless device triggers an RA procedure for requesting the SIB1 of the second cell. The wireless device transmits, based on initiating the RA procedure and via the second cell, the UL WUS requesting the SIB1 of the second cell. The wireless device monitors, via the second cell, the first SS for receiving the RAR corresponding to the transmission of the UL WUS. The wireless device cancels/stop/abort the ongoing RA procedure, based on receiving the SIB1 via the second SS before receiving the RAR.

One or more example embodiments comprise receiving, by a wireless device, one or more messages (e.g., SIB3bis/SIB4bis/SIB26 and/or MIB) comprising first parameters indicating a first SS of a cell for receiving a response (RAR) corresponding to an UL WUS requesting an SIB1 of the cell. The one or more messages comprise second parameters indicating a second SS of the cell for receiving the SIB1 of the cell. The wireless device transmits, based on initiating an RA procedure for requesting the SIB1 of the cell and via the cell, the UL WUS requesting the SIB1 of the cell. The wireless device monitors, via the cell, the first SS for receiving the response corresponding to the transmission of the UL WUS. The wireless device cancels/stop/abort the ongoing RA procedure, based on receiving the SIB1 via the second SS before receiving the response.

One or more example embodiments comprise transmitting, by a wireless device and based on initiating an RA procedure for requesting an SIB1 of a cell and via the cell, an UL WUS requesting the SIB1 of the cell. The wireless device monitors, via the cell, a first SS for receiving a response (RAR) corresponding to the transmission of the UL WUS. The wireless device cancels/stop/abort the ongoing RA procedure, based on receiving the SIB1 via a second SS of the cell before receiving the response. The second SS may be same as or different from the first SS.

One or more example embodiments comprise transmitting, by a wireless device and based on initiating an RA procedure for requesting an SIB1 of a cell and via the cell, an UL WUS requesting the SIB1 of the cell. The wireless device monitors, via the cell, a first SS for receiving a response corresponding to the transmission of the UL WUS. The wireless device monitors the first SS based on the first SS not overlapping in any resource element (RE) with an SSB (and/or search space zero) and/or uplink symbols of the cell. The wireless device receives the response scheduled by a DCI via the first SS. The wireless device receives the SIB1 of the cell.

One or more example embodiments comprise receiving, by a wireless device, an SIB message (e.g., SIB3bis/SIB4bis/SIB26) comprising configuration parameters of UL WUS configuration of a cell. The configuration parameters comprise first parameters of a search space zero for receiving an SIB1 of the cell. The wireless device receives, via the cell, a MIB message comprising second parameters of the search space zero of the cell. The wireless device, based on initiating an RA procedure for requesting an SIB1 of the cell and via the cell, the UL WUS requesting the SIB1 of the cell. The wireless device determines that a RAR dedicated search space and/or control resource set of the cell is not configured in the UL WUS configuration. The wireless device determines time/frequency resources of the search space zero and/or the control resource set zero based on one of the first parameters and the second parameters. The wireless device monitors, via the cell, the determined time/frequency resources of the search space zero and/or the control resource set zero for receiving the RAR corresponding to the transmission of the UL WUS.

In an example embodiment, the base station may ensure that the first parameters indicated by the UL WUS configuration are same as the second parameters indicated by the MIB, wherein the first parameters and the second parameters point to the same time/frequency resources for the search space zero (and/or the control resource set zero) of the cell. In this case, the wireless device monitors, via the cell, the time/frequency resources of the search space zero and/or the control resource set zero for receiving the RAR corresponding to the transmission of the UL WUS and/or for receiving the SIB1 of the cell.

In an example embodiment, the wireless device may determine the time/frequency resources (of the search space zero and/or the control resource set zero) based on the first parameters indicated by the UL WUS configuration, not based on the second parameters indicated by the MIB, e.g., when the first search space zero indicated by the UL WUS configuration is different from the second search space zero indicated by the MIB. In other words, the wireless device determines that the UL WUS configuration has higher priority than the MIB in terms of the configuration of the search space zero and/or the control resource set zero. The wireless device monitors, via the cell, the time/frequency resources (indicated by the first parameters) of the search space zero for receiving the RAR corresponding to the transmission of the UL WUS and/or for receiving the SIB1 of the cell.

In an example embodiment, the wireless device may determine the time/frequency resources (of the search space zero/control resource set zero) based on the second parameters indicated by the MIB, not based on the first parameters indicated by the UL WUS configuration, e.g., when the first search space zero indicated by the UL WUS configuration is different from the second search space zero indicated by the MIB. In this case, the wireless device determines that the MIB has higher priority than the UL WUS configuration in terms of the configuration of the search space zero and/or the control resource set zero. The wireless device monitors, via the cell, the time/frequency resources (indicated by the second parameters) of the search space zero and/or the control resource set zero for receiving the RAR corresponding to the transmission of the UL WUS and/or for receiving the SIB1 of the cell.

In an example embodiment, the wireless device may determine the time/frequency resources are determined based on the first parameters indicated by the UL WUS configuration, not based on the second parameters indicated by the MIB, e.g., when the first search space zero indicated by the UL WUS configuration is different from the second search space zero indicated by the MIB. In this case, the wireless device determines that the first parameters indicated by the UL WUS configuration are used for the configuration of the search space zero and/or the control resource set zero when the UL WUS transmission is triggered for the on-demand SIB1 request. In other words, the wireless device monitors the time/frequency resources, of the search space zero and/or the control resource set zero, indicated by the first parameters, for receiving the RAR and/or the requested on-demand SIB1. After the requested on-demand SIB1 is received by the wireless device, the wireless device may use the second parameters indicated by the MIB to determine the time/frequency resources of the search space zero and/or the control resource set zero of the cell for receiving the (periodic/broadcast) SIB1 of the cell.

One or more example embodiments comprise receiving, by a wireless device, an SIB message (e.g., SIB3bis/SIB4bis/SIB26) comprising configuration parameters of UL WUS configuration of a cell. The configuration parameters indicate a first search space (and/or a first control resource set) for receiving an RAR (corresponding to the UL WUS transmission) of the cell. The wireless device receives, via the cell, a MIB message indicating a second search space (and/or a second control resource set) of the cell. The wireless device, based on initiating an RA procedure for requesting an SIB1 of the cell and via the cell, the UL WUS requesting the SIB1 of the cell. The wireless device monitors, via the cell, the first search space for receiving the RAR corresponding to the transmission of the UL WUS. The wireless device monitors, via the cell, the second search space, for receiving the SIB1 of the cell, based on the configuration parameters of the UL WUS configuration not indicating the second search space and the MIB message indicating the second search space.

One or more example embodiments comprise receiving, by a wireless device, an SIB message (e.g., SIB3bis/SIB4bis/SIB26) comprising configuration parameters of UL WUS configuration of a cell. The wireless device, based on initiating an RA procedure for requesting an SIB1 of the cell and via the cell, an UL WUS requesting the SIB1 of the cell. The wireless device monitors, via the cell, a first search space for receiving an RAR corresponding to the transmission of the UL WUS. The wireless device monitors, via the cell, a second search space, for receiving the SIB1 of the cell. If the SIB message comprises parameters of the second search space, the wireless device determines the second search space based on the SIB message. If the SIB message does not comprise parameters of the second search space, the wireless device determines the second search space based on a MIB message of the cell.

One or more example embodiments comprise monitoring, by a wireless device, a search space of a cell, for receiving an SIB1 of the cell. The wireless device determines the search space based on an UL WUS configuration of a SIB message of the cell in response to parameters of the search space being present in the UL WUS configuration. Otherwise, if the parameters of the search space are absent in the UL WUS configuration of a SIB message of the cell, the wireless device determines the search space based on a MIB message of the cell.

By implementing the one or more example embodiments, the wireless device may reduce power consumption for cell (re-)selection, camping on a NES cell, SIB1 acquisition on the NES cell.

Figure 35:
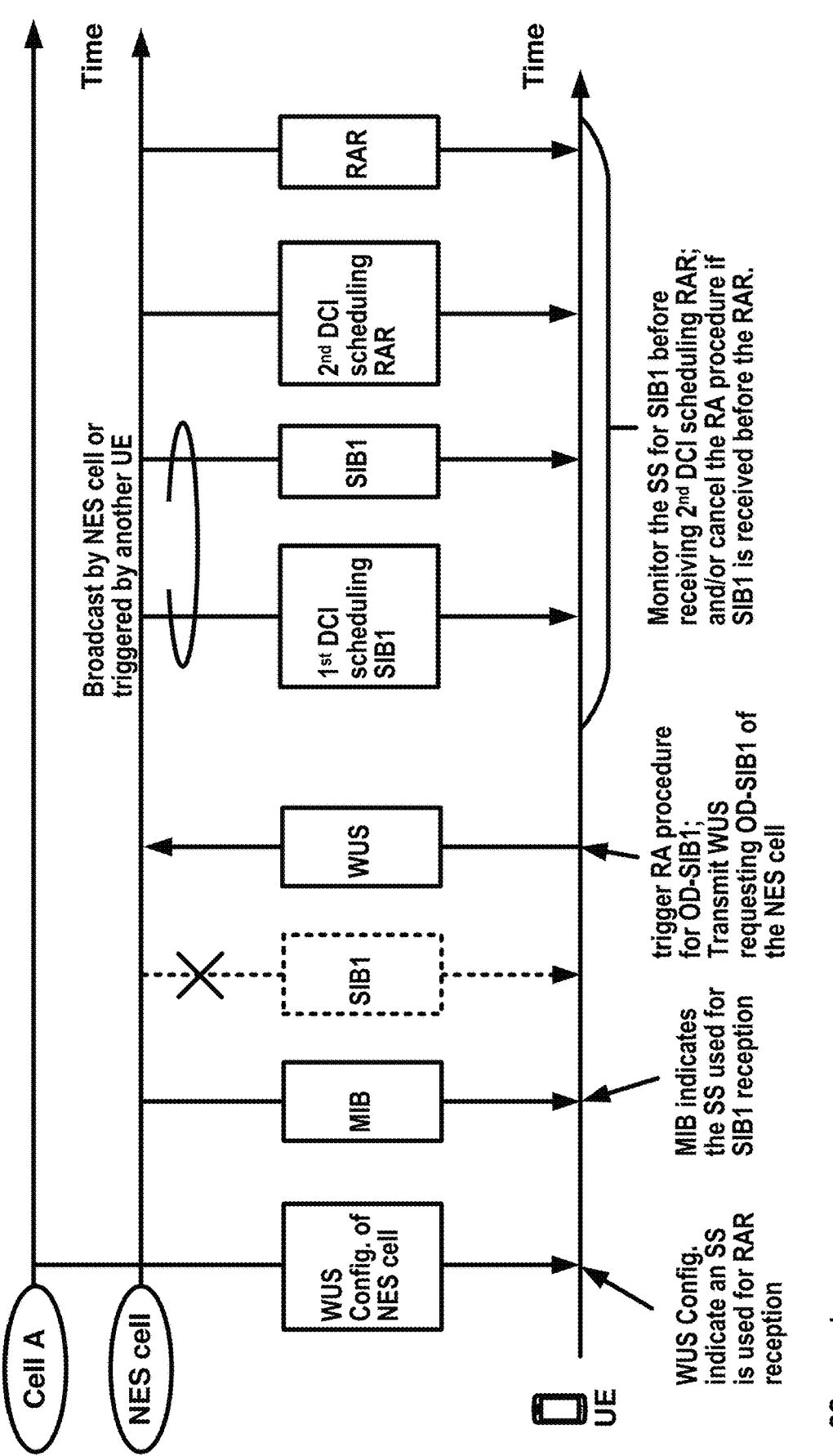
FIG. 35 illustrates an aspect of an example embodiment according to the present disclosure.

FIG. 35 shows an example embodiment of on-demand SIB1 reception.

In the example of FIG. 35, a wireless device (e.g., UE) may receive from a first cell (e.g., Cell A) UL WUS configuration of a NES cell for requesting (on-demand) SIB1 of the NES cell. The UL WUS configuration may be received via a SIB message (e.g., SIB3bis/SIB4bis/SIB26, based on examples of FIG. 33).

Although not shown in FIG. 35, the SIB message may be transmitted via the NES cell, e.g., via a SI change notification procedure, e.g., based on examples of FIG. 32.

In the example of FIG. 35, the WUS configuration may indicate that a search space (SS) (and/or a control resource set) is used for receiving RAR of the NES cell. The SS and/or the control resource set configured for the RAR may be indicated based on example of FIG. 36A and/or FIG. 36B which will be described later in this specification.

In an example, the WUS configuration may further indicate that a search space zero (and/or a control resource set zero) is used for receiving on-demand requested SIB1 of the NES cell. The search space zero (and/or the control resource set zero) used for receiving on-demand requested SIB1 may be indicated based on examples of FIG. 36A and/or FIG. 36B which will be described later in this specification.

In an example, the search space configured for receiving the RAR of the NES cell may be same as the search space zero configured for on-demand SIB1 reception in the UL WUS configuration.

In an example, the search space configured for receiving the RAR of the NES cell may be different from the search space zero configured for on-demand SIB1 reception in the UL WUS configuration.

In an example, when the search space used for receiving the RAR of the NES cell is not configured in the WUS configuration (e.g., when RAsearchSpace IE is not present in WUScomm IE of the SIB message as shown in FIG. 33), the wireless device may determine the search space zero and/or the control resource set zero is used for receiving the RAR of the NES cell.

In an example, the search space may be a type1-PDCCH common search space (CSS).

In an example, the search space may be a type0-PDCCH CSS.

In the example of FIG. 35, the wireless device receives MIB from the NES cell. The MIB may indicate the search space zero and/or the control resource set zero used for receiving SIB1 of the NES cell. The search space zero (searchSpaceZero) and/or the control resource set zero configured in the MIB may be indicated by PDCCH-ConfigSIB1 of the MIB based on examples of FIG. 24A, FIG. 24B and/or FIG. 24C. The base station may transmit the broadcast SIB1 scheduled by a DCI via the search space zero of the control resource set zero of the NES cell based on existing technologies.

In an example, it is noted that MIB message is different from any system information block (SIB) as shown in FIG. 24A, FIG. 24B and/or FIG. 24C.

In an example, the search space zero and/or the control resource set zero configured in the WUS configuration may be same as the search space zero and/or the control resource set zero configured in the MIB.

In an example, the search space zero and/or the control resource set zero configured in the WUS configuration may be different from the search space zero and/or the control resource set zero configured in the MIB.

In the example of FIG. 35, the wireless device, when no SIB1 is received on the NES cell and/or when the wireless device is capable of transmitting UL WUS requesting on-demand SIB1, may trigger an RA procedure for transmission (s) of the WUS requesting on-demand SIB1 of the NES cell, e.g., based on examples of FIG. 32. The wireless device may transmit a preamble/WUS configured in the WUS configuration.

In this specification, an RA/PRACH preamble configured for on-demand SIB1 request of a NES cell may be referred to as an UL WUS, a WUS, or an on-demand SIB1 request. An UL WUS configuration may be referred to as WUS configuration or on-demand SIB1 request configuration.

In the example of FIG. 35, the wireless device may monitor the search space (configured in the WUS configuration) for receiving the RAR and/or monitor the search space zero for receiving the broadcast/on-demand SIB1 of the NES cell.

In the example of FIG. 35, the wireless device, after transmitting the WUS/preamble for requesting the on-demand SIB1 of the NES cell, may receive the (broadcast) SIB1 (scheduled by 1$^{st}$ DCI) of the NES cell. The (broadcast) SIB1 may be broadcast by the base station on the NES cell and/or may be triggered by another wireless device. The 1$^{st}$ DCI scheduling the SIB1 message may be a DCI format 1_0 with CRC being scrambled by a predefined SI-RNTI value (e.g., FFFF in hexa-decimal value).

In the example of FIG. 35, the wireless device may receive the (broadcast) SIB1 before the wireless device receives 2$^{nd}$ DCI scheduling RAR corresponding to the WUS/preamble. The 2$^{nd}$ DCI scheduling the RAR may be a DCI format 1_0 with CRC being scrambled by a RA-RNTI. The value of the RA-RNTI may be determined based on the transmission occasion of the preamble/WUS, e.g., according to examples of FIG. 13A, FIG. 13B and/or FIG. 13C.

In the example of FIG. 35, the wireless device may, before receiving the RAR, cancel/stop/abort the ongoing RA procedure, based on receiving the SIB1 scheduled by a DCI via the search space. The cancellation/stopping/aborting of the ongoing RA procedure may comprise at least one of: stopping monitoring the PDCCH on the search space for the RAR, stopping retransmitting the preamble/WUS, considering the RA procedure being successfully completed, stopping a RA response window, resetting one or more timers/counters associated with the RA procedure, etc.

Although FIG. 35 shows that the search space for receiving the RAR is same as the search space for receiving the SIB1, the example embodiment of FIG. 35 may be extended to the scenario where the search space configured for receiving the RAR is different from the search space configured for receiving the SIB1. In this case, the wireless device may receive the SIB1 scheduled by a first DCI via a first search space of the NES cell before the wireless device receives a second DCI, via a second search space of the NES cell, scheduling the RAR, where the first search space is different from the second search space. Based on the example embodiments, the wireless device may cancel/stop/abort the RA procedure upon receiving the SIB1 before the RAR.

By implementing the one or more example embodiments described above with respect to FIG. 35, the wireless device may reduce power consumption for SIB1 acquisition on the NES cell. Otherwise, if not implementing the example embodiments, the wireless device, after receiving the SIB1 (broadcast by the base station or triggered by another wireless device), may continue monitoring the search space for receiving the RAR and/or retransmitting the preamble/WUS if not receiving the RAR, which may increase power consumption of the wireless device and/or uplink interference to other wireless devices.

By implementing the one or more example embodiments described above with respect to FIG. 35, the base station may reduce power consumption for RAR transmission. Otherwise, if not implementing the example embodiments, the base station, if receiving a preamble/WUS request SIB1 from a first wireless device after transmitting the SIB1 (e.g., broadcast or triggered by a second wireless device), may transmit a DCI scheduling the RAR for the first wireless device, which may increase power consumption of the base station.

In another embodiment different from FIG. 35, the wireless device may start monitoring the search space zero (e.g., for receiving a DCI format 1_0 with CRC being scrambled by SI-RNTI) configured for the SIB1 reception, after and/or upon receiving the RAR scheduled by a DCI via the search space configured for the RAR. In this case, the wireless device does not monitor the search space zero (e.g., for receiving a DCI format 1_0 with CRC being scrambled by SI-RNTI) configured for the SIB1 reception before the wireless device receives the RAR corresponding to the preamble/WUS requesting the on-demand IB1 of the NES cell, even if the MIB indicates the search space zero for the SIB1 reception. In other words, the wireless device determines that WUS configuration has higher priority than the MIB in terms of monitoring the search space zero for SIB1 reception. This example embodiment may simplify the implementation of the wireless device for PDCCH monitoring with the cost of increased SIB1 acquisition latency.

In an example, the base station and/or the wireless device may determine one of these two options (early cancelation of RA procedure upon receiving the SIB1 based on the embodiment of FIG. 35 or delaying PDCCH monitoring search space zero for SIB1 until receiving the RAR) to be implemented based on the requirements of SIB1 acquisition latency and/or power consumption/implementation complexity of the wireless device and/or the base station.

FIG. 36A and FIG. 36B show example embodiments of control resource set and search space configuration for receiving RAR corresponding to on-demand SIB1 request, e.g., based on examples of FIG. 35.

In the example of FIG. 36A, a base station and/or a wireless device may determine to reuse predefined control resource set configuration table(s), (used in legacy system) for control resource set zero (controlResourceSetZero) used for receiving SIB1 of a cell, to indicate control resource set used for receiving RAR corresponding to WUS/preamble/ on-demand SIB1 request. One of the predefined control resource set configuration table(s) may be shown in FIG. 36A which is applicable for the case where the {SS/PBCH block, PDCCH} SCS, of the cell, is {15, 15} KHz for frequency bands with minimum channel bandwidth 3 MHz and channel bandwidth 3 MHz or 5 MHZ. Different SCS and/or bandwidth of a cell may be associated with different predefined control resource set configuration tables. The example embodiment of FIG. 36A may be implemented for different SCS and/or bandwidth of the cell.

In the example of FIG. 36A, the WUS configuration (e.g., based on example of FIG. 35) may comprise a control resource set (CORESET) indication (e.g., $1^{st}$ control resource set as shown in FIG. 36A) for RAR reception (e.g., RAControlResource Set as shown in FIG. 33). The RAControlResourceSet may be a 4-bit value indicating one of the indexes of FIG. 36A. The 4-bit value may indicate SS/PBCH block and CORESET multiplexing pattern, number of RBs of the $1^{st}$ control resource set, number of symbols of the $1^{st}$ control resource set, offset indication, of the $1^{st}$ control resource set, indicating an offset from the smallest RB index of the $1^{st}$ control resource set to the smallest RB index of the common RB overlapping with the first RB of the corresponding SS/PBCH block, after puncturing if any.

In the example of FIG. 36A, the WUS configuration or the MIB may comprise a CORESET indication of control resource set zero for receiving SIB1, e.g., $2^{nd}$ control resource set as shown in FIG. 36A.

In the example of FIG. 36A, the $1^{st}$ control resource set for receiving RAR may be different from the $2^{nd}$ control resource set for receiving SIB1. Configuring different resources for the $1^{st}$ control resource set and the $2^{nd}$ control resource set may avoid resource overlapping for RAR scheduling and SIB1 scheduling.

In an example, the $1^{st}$ control resource set for receiving RAR may be same as the $2^{nd}$ control resource set for receiving SIB1. Configuring the same resources for the $1^{st}$ control resource set and the $2^{nd}$ control resource set may improve resource utilization efficiency for RAR scheduling and SIB1 scheduling.

Based on the example embodiment, the $1^{st}$ control resource set used for receiving RAR may be indicated (by the WUS configuration) from the same (control resource set configuration) table predefined for the $2^{nd}$ control resource set (control resource set zero) used for receiving SIB1. By implementing example embodiments of FIG. 36A (by simply pointing to an index/entry of a predefined table for control resource set indication of RAR reception), the base station and the wireless device may be aligned on how to indicate/configure a control resource set for RAR reception of a NES Cell when the wireless device is in RRC_IDLE state and before the wireless device camps on the NES cell. Otherwise, if not implementing the example embodiments of FIG. 36A, the base station may configure the parameters of the $1^{st}$ control resource set for RAR based on existing RRC messages (e.g., ControlResourceSet IE as shown in FIG. 26). However, the existing control resource set configuration is configured on a specific BWP of a cell via an SIB1 message or a cell/UE specific RRC message. Before the wireless device camps on the cell, there is no BWP configuration available on the cell, and/or there is no SIB1 message or cell/UE specific RRC message received by the wireless device. To indicate the resources of the control resource set for the RAR reception on the NES cell, the existing technologies may increase RRC signaling overhead due to the need of configuring in the UL WUS configuration all necessary parameters (time/frequency/spatial domain, as shown in FIG. 26) of the $1^{st}$ control resource set for the RAR corresponding to the WUS requesting SIB1 message. Example embodiments of FIG. 36A may reduce signaling overhead of control resource set configuration for the RAR reception of the cell when the wireless device is in RRC_IDLE state (or RRC_INACTIVE state) and before the wireless device receives SIB1 on the cell and camps on the cell.

In the example of FIG. 36B, a base station and/or a wireless device may determine to reuse predefined search space set configuration table(s), for search space zero (searchSpaceZero) used for receiving SIB1 of a cell, to indicate (in UL WUS configuration) a search space used for receiving RAR corresponding to WUS/preamble/on-demand SIB1 request. One of the predefined search space configuration table(s) may be shown in FIG. 36B which is applicable for Type0-PDCCH CSS set-SS/PBCH block and CORESET multiplexing pattern 1 and FR1. The example embodiment of FIG. 36B may be similarly implemented for other multiplexing patterns and FR value of a cell.

In the example of FIG. 36B, the WUS configuration (e.g., based on example of FIG. 35) may comprise a search space (SS) indication (e.g., $1^{st}$ search space as shown in FIG. 36B) for RAR reception (e.g., RASearchSpace as shown in FIG. 33). The RASearchSpace may be a 4-bit value indicating one of the indexes of FIG. 36B. The 4-bit value may indicate a M value and an O value (used for determining time domain resources of the search space), number of search space sets per slot, the first symbol index indication of the search space, etc., e.g., based on examples described above with respect to FIG. 29.

In the example of FIG. 36B, the WUS configuration and/or the MIB may comprise a search space indication of a search space zero for receiving SIB1, e.g., $2^{nd}$ search space as shown in FIG. 36B, e.g., based on examples of FIG. 33 and/or FIG. 24A.

In the example of FIG. 36B, the $1^{st}$ search space for RAR may be different from the $2^{nd}$ search space for SIB1. Configuring different resources for the $1^{st}$ search space and the $2^{nd}$ search space may avoid resource overlapping between the $1^{st}$ search space and the $2^{nd}$ search space so that the wireless device may correctly receive the RAR and the SIB1.

In an example, the $1^{st}$ search space for RAR may be same as the $2^{nd}$ search space for SIB1. Configuring the same resources for the $1^{st}$ search space and the $2^{nd}$ search space may improve resource utilization efficiency for the RAR transmission and the SIB1 transmission.

Based on the example embodiment of FIG. 36B, the $1^{st}$ search space used for receiving RAR may be indicated (by the WUS configuration) from the same (search space configuration) table predefined for the $2^{nd}$ search space (search space zero) used for receiving SIB1. By implementing example embodiments of FIG. 36B (by simply pointing to an index/entry of a predefined table for search space indication of RAR reception), the base station and the wireless device may be aligned on how to indicate/configure a search space for RAR reception of a NES Cell when the wireless device is in RRC_IDLE state and before the wireless device camps on the NES cell. Otherwise, if not implementing the example embodiments of FIG. 36B, the base station may configure the parameters of the $1^{st}$ search space for RAR based on existing RRC messages (e.g., searchSpace IE as shown in FIG. 27). However, the existing search space configuration is configured on a specific BWP of a cell via an SIB1 message or a cell/UE specific RRC message. Before the wireless device camps on the cell, there is no BWP configuration available on the cell, and/or there is no SIB1 message or cell/UE specific RRC message received by the wireless device. To indicate the resources of the search space for the RAR reception on the NES cell, the existing technologies may increase RRC signaling overhead due to the need of configuring in the UL WUS configuration all necessary parameters (time/frequency/spatial domain, as shown in FIG. 26) of the $1^{st}$ search space for the RAR corresponding to the WUS requesting SIB1 message. Example embodiments of FIG. 36B may reduce signaling overhead of search space configuration for the RAR reception of the cell when the wireless device is in RRC_IDLE state (or RRC_INACTIVE state) and before the wireless device receives SIB1 on the cell and camps on the cell.

Figure 37:
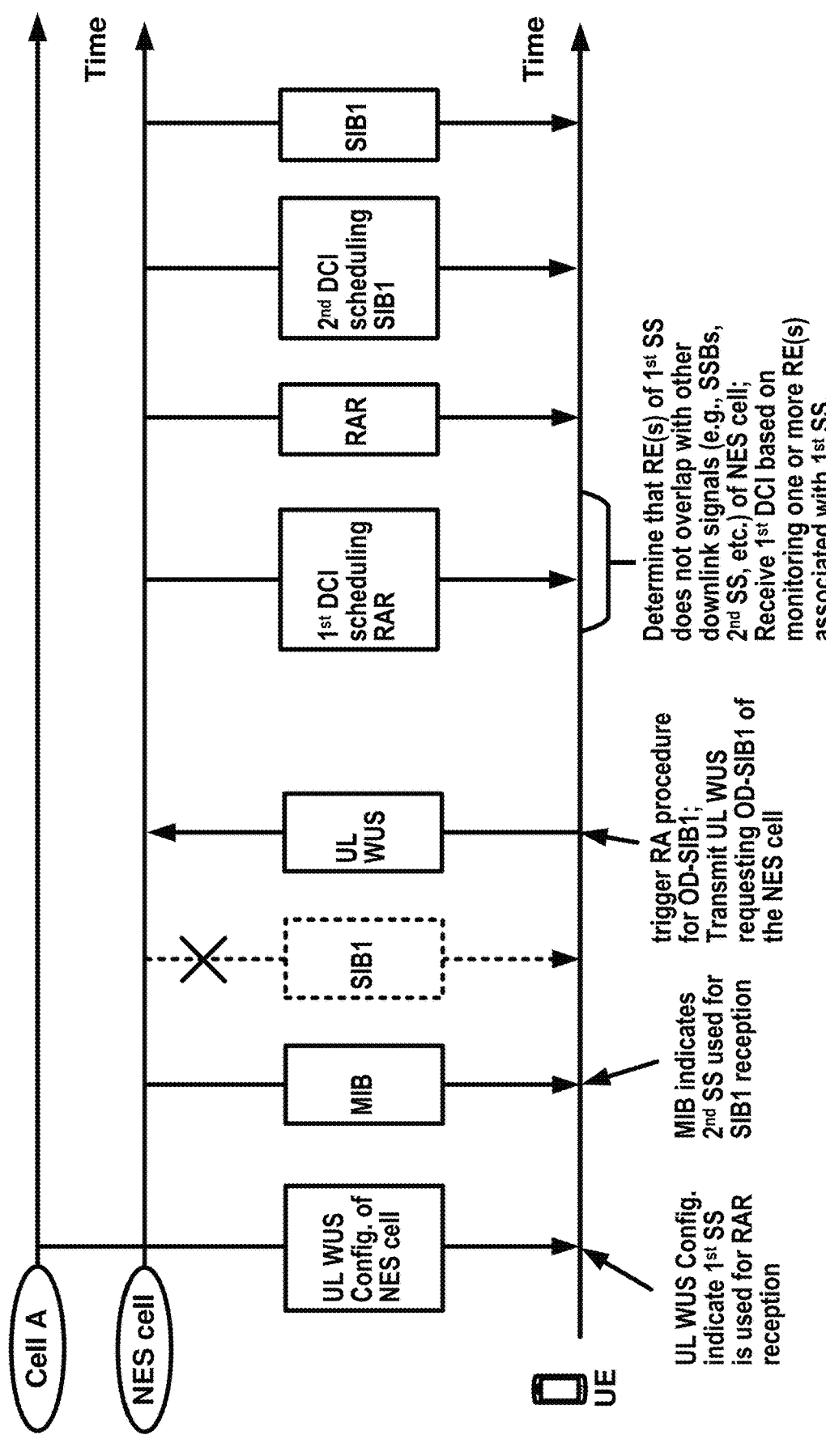
FIG. 37 illustrates an aspect of an example embodiment according to the present disclosure.

FIG. 37 shows an example embodiment of on-demand SIB1 reception, e.g., based on examples of FIG. 35, FIG. 36A and/or FIG. 36B.

In the example of FIG. 37, a wireless device (e.g., UE) may receive from a first cell (e.g., Cell A) (UL) WUS configuration of a NES cell for requesting (on-demand) SIB1 of the NES cell. The UL WUS configuration may be received via a SIB message (e.g., SIB3bis/SIB4bis/SIB26, based on examples of FIG. 33).

Although not shown in FIG. 37, the SIB message may be transmitted via the NES cell, e.g., via a SI change notification procedure, e.g., based on examples of FIG. 32.

In the example of FIG. 37, the UL WUS configuration may indicate that a first ($1^{st}$) search space (SS) (and/or a first control resource set) is used for receiving RAR of the NES cell. The $1^{st}$ SS and/or the $1^{st}$ control resource set configured for the RAR may be indicated based on example of FIG. 36A and/or FIG. 36B.

In an example, the UL WUS configuration may further indicate that a search space zero (and/or a control resource set zero) is used for receiving on-demand requested SIB1 of the NES cell. The search space zero (and/or the control resource set zero) used for receiving on-demand requested SIB1 may be indicated based on examples of FIG. 36A and/or FIG. 36B.

In the example of FIG. 37, the wireless device receives MIB from the NES cell. The MIB may indicate a second search space (e.g., the search space zero) and/or a second control resource set (e.g., the control resource set zero) used for receiving SIB1 of the NES cell. The search space zero (searchSpaceZero) and/or the control resource set zero configured in the MIB may be indicated by PDCCH-ConfigSIB1 of the MIB based on examples of FIG. 24A, FIG. 24B and/or FIG. 24C.

In the example of FIG. 37, the wireless device, when no SIB1 is received on the NES cell, may trigger an RA procedure for transmission(s) of the UL WUS requesting on-demand SIB1 of the NES cell, e.g., based on examples of FIG. 32 and/or FIG. 35. The wireless device may transmit a preamble/WUS configured in the UL WUS configuration.

In the example of FIG. 37, the wireless device may determine that (or may be expected that), and/or the base station may ensure that the $1^{st}$ search space (and/or the $1^{st}$ control resource set) does not overlap (in one or more symbols, in one or more resource elements (REs) with the search space zero (and/or the control resource set zero) configured in the UL WUS configuration or the MIB message.

In an example, a symbol or RE may be implemented based on examples of FIG. 7 and/or FIG. 8.

In the example of FIG. 37, the wireless device may determine that (or may be expected that), and/or the base station may ensure that the $1^{st}$ search space (and/or the $1^{st}$ control resource set) does not overlap (in one or more symbols, in one or more REs) with one or more SSBs of the NES cell. Time/frequency resources of the one or more SSBs may be indicated in the UL WUS configuration and/or the MIB message.

In an example embodiment, the wireless device may determine that (or may be expected that), and/or the base station may ensure that the $1^{st}$ search space (and/or the $1^{st}$ control resource set) does not overlap (in one or more symbols, in one or more REs) with uplink signals/channels of the NES cell. Time/frequency resources of the uplink signals/channels may be indicated (e.g., by tdd-UL-DL-ConfigurationComm IE as shown in FIG. 33) in the UL WUS configuration and/or the MIB message.

In the example of FIG. 37, the wireless device may monitor the (RA) search space (on a RA control resource set associated with the RA search space) (configured in the UL WUS configuration) for receiving the RAR.

In an example, the wireless device may monitor the search space zero for receiving the SIB1 message of the NES cell.

In the example of FIG. 37, the wireless device, after transmitting the WUS/preamble for requesting the on-demand SIB1 of the NES cell, may receive, via the RA search space of the NES cell, $1^{st}$ DCI scheduling RAR corresponding to the WUS/preamble. The $1^{st}$ DCI scheduling the RAR may be a DCI format 1_0 with CRC being scrambled by a RA-RNTI determined based on the transmission occasion of the preamble/WUS. The value of RA-RNTI may be determined based on examples of FIG. 13A, FIG. 13B and/or FIG. 13C.

In the example of FIG. 37, the wireless device, after receiving the RAR (and/or if a preamble index comprised in the RAR is same as the preamble index of the UL WUS), may consider the RA procedure successfully completed. The wireless device may receive a second DCI (e.g., $2^{nd}$ DCI), via the search space zero of the control resource set zero of the NES cell, scheduling the SIB1 message of the NES cell.

By implementing the examples of FIG. 37, ensuring that an (RA) search space (and/or corresponding control resource set) configured for RAR reception does not overlap with search space zero (and/or corresponding control resource set zero), SSB(s) and/or uplink symbols of the NES cell may improve RAR reception success rate. Otherwise, if the RA search space overlaps with the search space zero, or SSB(s) and/or uplink symbols of the NES cell, the wireless device may have difficulties in determining whether to monitor the search space zero (for receiving SIB1) (and/or SSBs) (and/or transmit in the uplink symbols) or to monitor the RA search space for receiving the RAR on the overlapped REs/symbols.

In another embodiment different from FIG. 37, the wireless device and/or the base station may determine a (default) priority (for receiving the RAR or SIB1/SSB or for transmitting uplink symbols) between the RA search space and the search space zero/SSB (or the uplink symbols) if at least one RE of the RA search space overlaps with the search space zero/SSB or the uplink symbols. Based on this embodiment by defining/configuring a (mutually agreed between the base station and the wireless device) monitoring priority, the RA search space may be allowed to overlap with the search space zero/SSB or the uplink symbols, which may increase flexibility of the base station to configure the RA search space and the search space zero/SSB (or the uplink symbols). Example embodiments may improve resource utilization efficiency.

In an example embodiment, if at least one RE of the RA search space overlaps with the search space zero/SSB (or the uplink symbols), the determined priority may be that the RAR reception has higher priority than the SIB1/SSB reception (or transmission on the uplink symbols). In other words, the wireless device may monitor, at least on a first RE, the RA search space for receiving the RAR corresponding to the WUS requesting SIB1 message, if the first RE of the RA search space overlaps with RE(s) of the search space zero/SSB(s) (or the uplink symbols) of the NES cell. The wireless device may not monitor, on the first RE, the search space zero/SSB(s) of the NES cell. The wireless device may not transmit, on the first RE, uplink symbols of the NES cell.

In an example embodiment, if at least one RE of the RA search space overlaps with the search space zero/SSB (or the uplink symbols), the determined priority may be that the RAR reception has lower priority than the SIB1/SSB reception (or transmission on the uplink symbols). In other words, the wireless device may monitor, at least on a first RE, the search space zero for receiving the SIB1 message or monitor the SSBs of the NES cell, if the first RE of the search space zero and/or SSB(s) overlaps with the RA search space. The wireless device may transmit, on the first RE, uplink symbols of the NES cell. The wireless device may not monitor, on the first RE, the RA search space of the NES cell.

Figure 38:
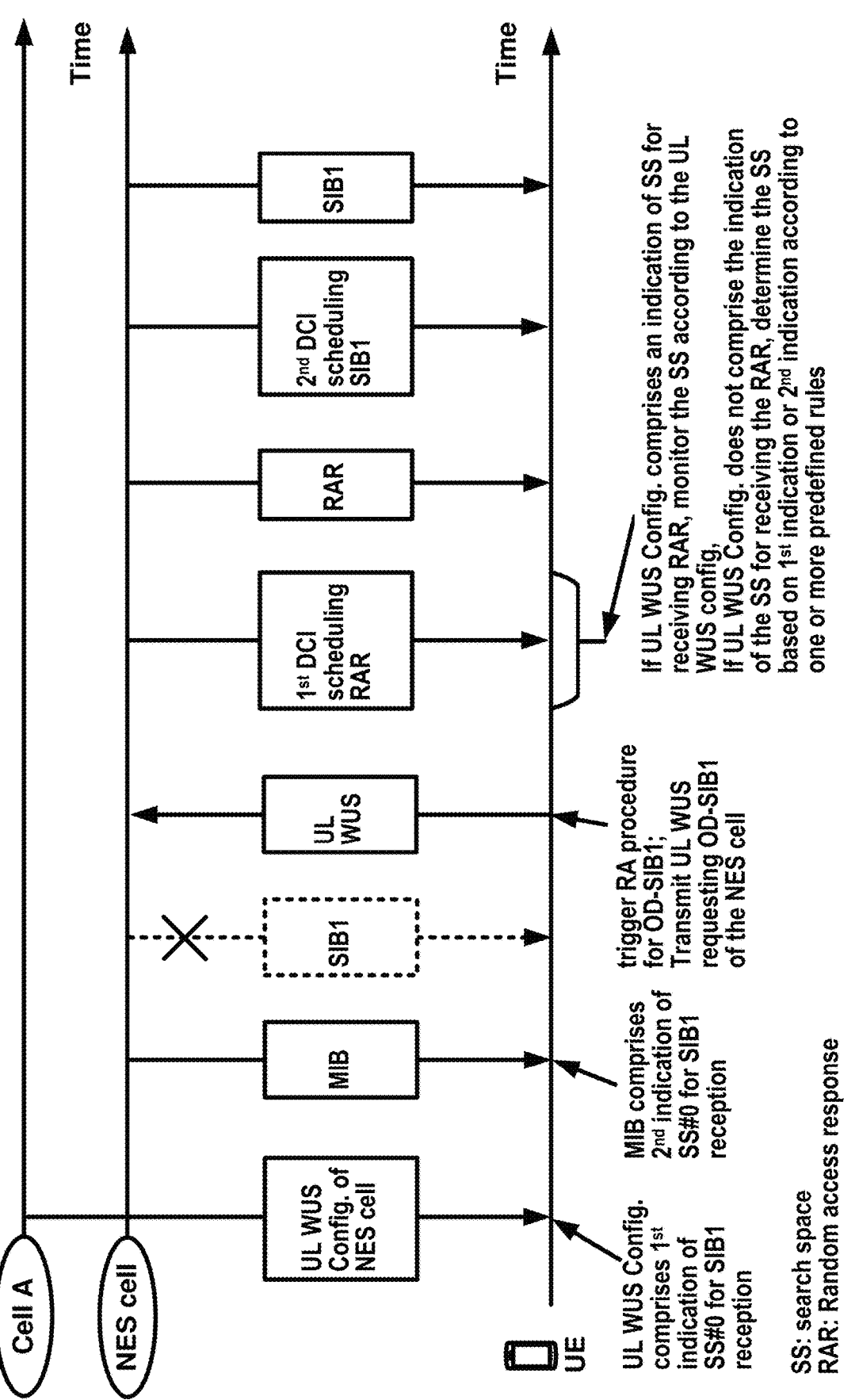
FIG. 38 illustrates an aspect of an example embodiment according to the present disclosure.

FIG. 38 shows an example embodiment of on-demand SIB1 reception, e.g., based on examples of FIG. 35, FIG. 36A, FIG. 36B and/or FIG. 37.

In the example of FIG. 38, a wireless device (e.g., UE) may receive from a first cell (e.g., Cell A) UL WUS configuration of a NES cell for requesting (on-demand) SIB1 of the NES cell. The UL WUS configuration may be received via a SIB message (e.g., SIB3bis/SIB4bis/SIB26, based on examples of FIG. 33).

Although not shown in FIG. 38, the SIB message may be transmitted via the NES cell, e.g., via a SI change notification procedure, e.g., based on examples of FIG. 32.

In the example of FIG. 38, the UL WUS configuration may comprise a first indication of search space zero (searchSpaceZero, SS #0) (and/or control resource set zero (ControlResourceSetZero) used for receiving on-demand requested SIB1 of the NES cell. The search space zero (and/or the control resource set zero) used for receiving on-demand requested SIB1 may be indicated based on examples of FIG. 36A and/or FIG. 36B.

In an example, the UL WUS configuration may comprise an indication of a search space (and/or a control resource set) used for receiving RAR corresponding to UL WUS requesting on-demand SIB1 of the NES cell. In an example, the RASearchSpace and/or RAControlResourceSet may be present in the SIB message as shown in FIG. 33.

In an example, the UL WUS configuration may not comprise an indication of a search space (and/or a control resource set) used for receiving RAR corresponding to UL WUS requesting on-demand SIB1 of the NES cell. In an example, the RASearchSpace and/or RAControlResourceSet may be absent in the SIB message as shown in FIG. 33.

In the example of FIG. 38, the wireless device receives MIB from the NES cell. The MIB may comprise a second indication of search space zero (SS #0 in FIG. 38) (and/or control resource set zero) used for receiving SIB1 of the NES cell. The search space zero (searchSpaceZero) and/or the control resource set zero (ControlResourceSetZero) configured in the MIB may be indicated by PDCCH-ConfigSIB1 of the MIB based on examples of FIG. 24A, FIG. 24B and/or FIG. 24C.

In an example, the search space zero (and/or the control resource set zero) configured in the UL WUS configuration may be different from the search space zero (and/or the control resource set zero) configured in the MIB message.

In an example, the search space zero (and/or the control resource set zero) configured in the UL WUS configuration may be same as the search space zero (and/or the control resource set zero) configured in the MIB message.

In the example of FIG. 38, the wireless device, before triggering an RA procedure for transmission of the UL WUS requesting on-demand SIB1 of the NES cell, may check whether the SIB1 is available. In an example, the base station may transmit the SIB1 periodically on the NES cell, e.g., when the base station determines that a plurality of wireless devices are camping on the NES cell, and/or when the base station has received an on-demand SIB1 request from another wireless device.

In an example embodiment, to check whether SIB1 is available on the NES cell, the wireless device, before triggering an RA procedure, may monitor search space zero and/or control resource set zero configured in the UL WUS configuration for receiving a DCI format 1_0 with CRC being scrambled by SI-RNTI scheduling the SIB1 message. The wireless device may monitor search space zero and/or control resource set zero configured in the UL WUS configuration, e.g., when the MIB does not indicate search space zero and/or control resource set zero. Example embodiments may avoid unnecessary triggering the RA procedure by monitoring the search space zero configured in the UL WUS configuration, if the SIB1 message has already been requested by another wireless device and the SIB1 message is currently transmitted by a DCI via the search space zero configured in the UL WUS configuration.

In an example embodiment, to check whether the SIB1 is available, the wireless device, before triggering an RA procedure, may monitor search space zero and/or control resource set zero configured in the MIB message for receiving a DCI format 1_0 with CRC being scrambled by SI-RNTI scheduling the SIB1 message. The wireless device may monitor search space zero and/or control resource set zero configured in the MIB message, e.g., when the UL WUS configuration does not indicate search space zero and/or control resource set zero. Example embodiments may avoid unnecessary triggering the RA procedure by monitoring the search space zero configured in the MIB message, if the SIB1 message is broadcast by a DCI via the search space zero configured in the MIB message.

In an example embodiment, to check whether the SIB1 is available, the wireless device, before triggering an RA procedure and for receiving a DCI format 1_0 with CRC being scrambled by SI-RNTI scheduling the SIB1 message, may monitor search space zero and/or control resource set zero configured in the UL WUS configuration, and may monitor search space zero and/or control resource set zero configured in the MIB message, if search space zero and/or control resource set zero configured in the UL WUS configuration is different from search space zero and/or control resource set zero configured in the MIB message. Example embodiments may avoid unnecessary triggering the RA procedure by monitoring both the search space zeros configured in the UL WUS configuration and the search space zero configured in the MIB message, if the base station transmits the SIB1 message broadcast by a DCI via the search space zero configured in the MIB message or triggered (by another wireless device) and scheduled by a DCI via the search space zero configured in the UL WUS configuration.

In an example embodiment, to check whether the SIB1 is available, the wireless device, before triggering an RA procedure and for receiving a DCI format 1_0 with CRC being scrambled by SI-RNTI scheduling the SIB1 message, may monitor one of: search space zero and/or control resource set zero configured in the UL WUS configuration, and search space zero and/or control resource set zero configured in the MIB message, if search space zero and/or control resource set zero configured in the UL WUS configuration is different from search space zero and/or control resource set zero configured in the MIB message. In an example, the wireless device may select the search space zero configured by the UL WUS configuration based on determining that the UL WUS configuration has higher priority than the MIB in terms of configuration of search space zero. In other example, the wireless device may select the search space zero configured by the MIB based on determining that the UL WUS configuration has lower priority than the MIB in terms of configuration of search space zero.

By implementing example embodiment of FIG. 38 for checking whether SIB1 is available before triggering UL WUS requesting the SIB1, the wireless device may avoid unnecessary transmission of UL WUS requesting the SIB1. Example embodiments may improve power consumption and/or SIB1 acquisition latency.

In the example of FIG. 38, the wireless device, when no SIB1 is received on the NES cell, may trigger an RA procedure for transmission(s) of the UL WUS requesting on-demand SIB1 of the NES cell, e.g., based on examples of FIG. 32 and/or FIG. 35. The wireless device may transmit a preamble/WUS configured in the UL WUS configuration.

In the example of FIG. 38, the wireless device, based on RASearchSpace and/or RAControlResourceSet being present in the UL WUS configuration of the SIB message (e.g., SIB3bis/SIB4bis/SIB26, based on examples of FIG. 33), may monitor the search space (control resource set) configured by the RASearch Space and/or RAControlResourceSet in the UL WUS configuration, for receiving a DCI (with CRC scrambled by RA-RNTI) scheduling the on-demand requested SIB1 message.

In the example of FIG. 38, the wireless device, based on RASearchSpace and/or RAControlResourceSet being absent in the UL WUS configuration of the SIB message (e.g., SIB3bis/SIB4bis/SIB26, based on examples of FIG. 33), may determine to use the first indication of search space zero (and/or control resource set zero) of the UL WUS configuration, or use the second indication of search space zero (and/or control resource set zero) of the MIB, for RAR reception. In an example embodiment, the wireless device may determine, based on one or more predefined/default rules, to use the first indication of search space zero (and/or control resource set zero) of the UL WUS configuration, or use the second indication of search space zero (and/or control resource set zero) of the MIB, for RAR reception.

In an example embodiment, the base station may ensure that the first indication (of search space zero and/or control resource set zero) configured in the UL WUS configuration may be same as the second indication (of search space zero and/or control resource set zero) configured in the MIB. Based on the example embodiment, the first indication (in the UL WUS configuration) of control resource set zero and the second indication (in the MIB) of control resource set zero may point to the same entry/index of the control resource set configuration table of FIG. 36A for control resource set zero of the cell. Based on the example embodiment, the first indication (in the UL WUS configuration) of search space zero and the second indication (in the MIB) of search space zero may point to the same entry/index of the search space configuration table of FIG. 36B for search space zero of the cell. The example embodiment may improve resource utilization efficiency for search space zero and/or control resource set zero configuration.

In an example embodiment, the first indication (of search space zero and/or control resource set zero) configured in the UL WUS configuration may be different from the second indication (of search space zero and/or control resource set zero) configured in the MIB. The wireless device determines the time/frequency resources (of the search space zero and/or the control resource set zero) based on the first indication comprised in the UL WUS configuration, not based on the second indication comprised in the MIB. In this case, the wireless device determines that the UL WUS configuration has higher priority than the MIB in terms of the configuration of the search space zero and/or the control resource set zero. The wireless device monitors, via the cell, the time/frequency resources (based on the first indication) of the search space zero for receiving the RAR corresponding to the transmission of the UL WUS and/or for receiving the SIB1 of the cell.

In an example embodiment, the first indication (of search space zero and/or control resource set zero) configured in the UL WUS configuration may be different from the second indication (of search space zero and/or control resource set zero) configured in the MIB. The wireless device may determine the time/frequency resources (of the search space zero and/or the control resource set zero) based on the second indication comprised in the MIB, not based on the first indication comprised in the UL WUS configuration. In this case, the wireless device determines that the MIB has higher priority than the UL WUS configuration in terms of the configuration of the search space zero and/or the control resource set zero. The wireless device monitors, via the cell, the time/frequency resources (based on the second indication) of the search space zero and/or the control resource set zero for receiving the RAR corresponding to the transmission of the UL WUS and/or for receiving the SIB1 of the cell.

In an example embodiment, the first indication (of search space zero and/or control resource set zero) configured in the UL WUS configuration may be different from the second indication (of search space zero and/or control resource set zero) configured in the MIB. The wireless device determines only when on-demand SIB1 request is triggered and/or has not been completed (is still pending), the time/frequency resources (of the search space zero and/or the control resource set zero) based on the first indication comprised in the UL WUS configuration, not based on the second indication comprised in the MIB. In this case, the wireless device determines that the first indication comprised in the UL WUS configuration is used for the configuration of the search space zero and/or the control resource set zero when the WUS transmission is triggered (and/or is still pending) for the on-demand SIB1 request. In other words, when the RA procedure is still pending or is not completed for the WUS transmission requesting on-demand SIB1, the wireless device monitors the time/frequency resources, of the search space zero and/or the control resource set zero, indicated by the first indication comprised in the UL WUS configuration, for receiving the RAR and/or the requested on-demand SIB1. After the RA procedure is completed and the requested on-demand SIB1 is received by the wireless device, the wireless device may use the second indication comprised in the MIB to determine the time/frequency resources of the search space zero and/or the control resource set zero of the cell for receiving the (periodic/broadcast) SIB1 of the cell.

In the example of FIG. 38, the wireless device may monitor the determined time/frequency resources (based on the example embodiments described above) of the search space zero (and/or the control resource set zero) for receiving a first DCI ($1^{st}$ DCI) scheduling the RAR.

In an example, the wireless device may monitor the search space zero for receiving a second DCI ($2^{nd}$ DCI) scheduling the SIB1 message of the NES cell.

By implementing one or more example embodiments of FIG. 38, if search space zero (and/or control resource set zero) configured in UL WUS configuration is different from search space zero (and/or control resource set zero) configured in MIB message, the wireless device and/or the base station may be aligned on whether the UL WUS configuration or the MIB message is used for determining search space zero and/or control resource set zero for receiving RAR/SIB1. Example embodiments may improve SIB1 acquisition latency and/or power consumption of the base station and/or the wireless device.

Figure 39:
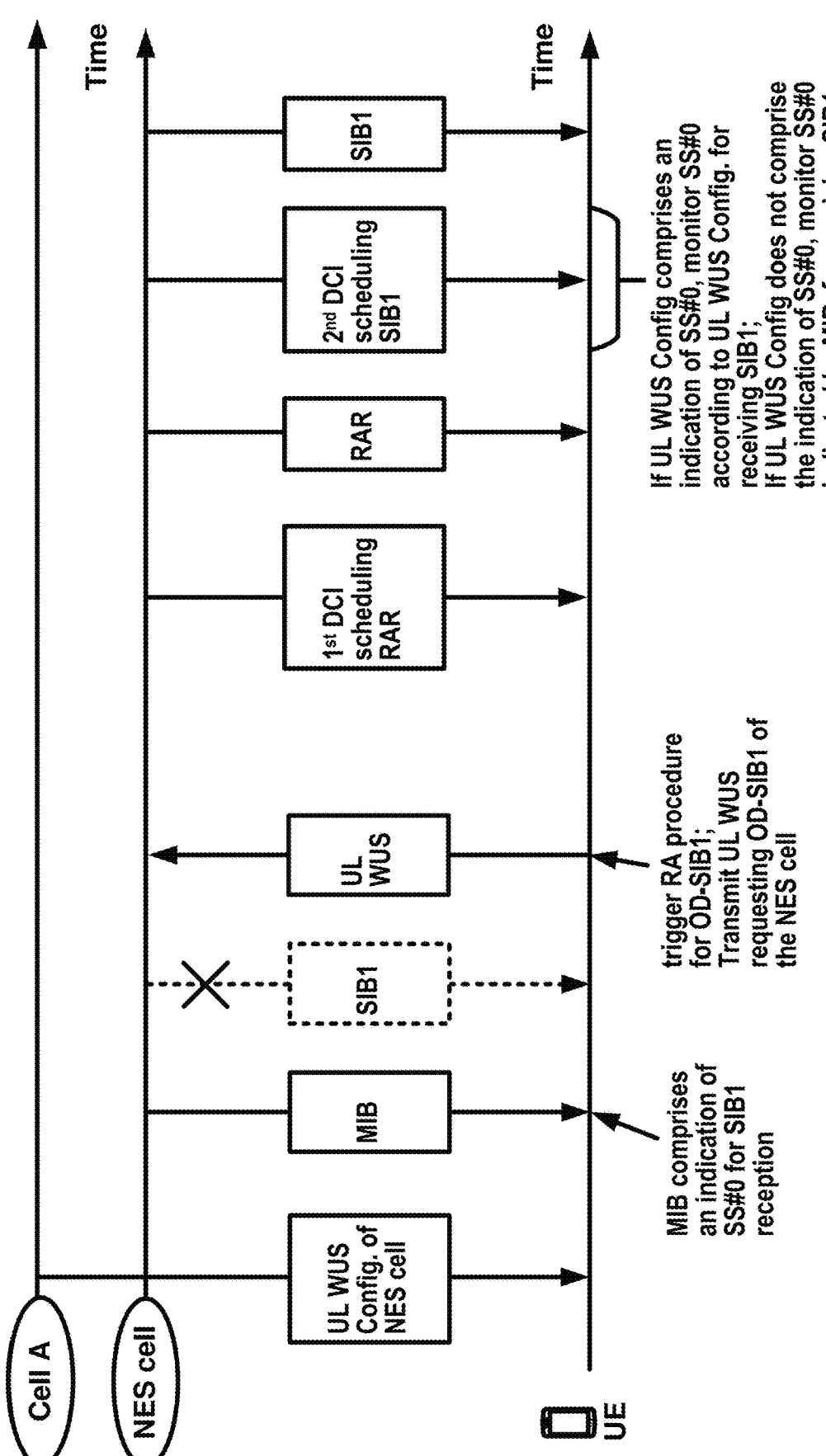
FIG. 39 illustrates an aspect of an example embodiment according to the present disclosure.

FIG. 39 shows an example embodiment of on-demand SIB1 reception, e.g., based on examples of FIG. 35, FIG. 36A, FIG. 36B, FIG. 37 and FIG. 38.

In the example of FIG. 39, a wireless device (e.g., UE) may receive from a first cell (e.g., Cell A) UL WUS configuration of a NES cell for requesting (on-demand) SIB1 of the NES cell. The UL WUS configuration may be received via a SIB message (e.g., SIB3bis/SIB4bis/SIB26, based on examples of FIG. 33).

Although not shown in FIG. 39, the SIB message may be transmitted via the NES cell, e.g., via a SI change notification procedure, e.g., based on examples of FIG. 32.

In an example, the UL WUS configuration may comprise a first indication of search space zero (searchSpaceZero, SS #0) (and/or control resource set zero (ControlResoureSetZero) used for receiving on-demand requested SIB1 of the NES cell. The search space zero (and/or the control resource set zero) used for receiving on-demand requested SIB1 may be indicated based on examples of FIG. 36A and/or FIG. 36B.

In an example, the UL WUS configuration may not comprise the first indication of search space zero (searchSpaceZero, SS #0) (and/or control resource set zero (ControlResoureSetZero) used for receiving on-demand requested SIB1 of the NES cell. In this case, searchSpaceZero and/or ControlResoureSetZero may be absent in the UL WUS configuration as shown in FIG. 33.

In an example, the UL WUS configuration may comprise an indication of a search space (and/or a control resource set) used for receiving RAR corresponding to UL WUS requesting on-demand SIB1 of the NES cell. In an example, the RASearchSpace and/or RAControlResourceSet may be present in the SIB message as shown in FIG. 33.

In an example, the UL WUS configuration may not comprise an indication of a search space (and/or a control resource set) used for receiving RAR corresponding to UL WUS requesting on-demand SIB1 of the NES cell. In an example, the RASearchSpace and/or RAControlResource-Set may be absent in the SIB message as shown in FIG. 33.

In the example of FIG. 39, the wireless device receives MIB from the NES cell. The MIB may comprise an indication of search space zero (SS #0 in FIG. 39) (and/or control resource set zero) used for receiving SIB1 of the NES cell. The search space zero (searchSpaceZero) and/or the control resource set zero (ControlResoureSetZero) configured in the MIB may be indicated by PDCCH-ConfigSIB1 of the MIB based on examples of FIG. 24A, FIG. 24B and/or FIG. 24C.

In an example, the MIB may not comprise an indication of searchSpaceZero and/or ControlResoureSetZero based on examples of FIG. 24A, FIG. 24B and/or FIG. 24C.

In an example, the search space zero (and/or the control resource set zero), if configured in the UL WUS configuration, may be different from the search space zero (and/or the control resource set zero) configured in the MIB message.

In an example, the search space zero (and/or the control resource set zero), if configured in the UL WUS configuration, may be same as the search space zero (and/or the control resource set zero) configured in the MIB message.

In the example of FIG. 39, the wireless device, before triggering an RA procedure for transmission of the UL WUS requesting on-demand SIB1 of the NES cell, may check whether the SIB1 is available based on example embodiments of FIG. 38.

In the example of FIG. 39, the wireless device, when no SIB1 is received on the NES cell, may trigger an RA procedure for transmission(s) of the UL WUS requesting on-demand SIB1 of the NES cell, e.g., based on examples of FIG. 32 and/or FIG. 35. The wireless device may transmit a preamble/WUS configured in the UL WUS configuration.

In the example of FIG. 39, the wireless device, upon transmitting the preamble/WUS configured for on-demand SIB1 request of the NES cell, may monitor a search space of the NES cell for receiving a RAR corresponding to the preamble/WUS, based on examples of FIG. 37 and/or FIG. 38.

In the example of FIG. 39, the wireless device may receive a first DCI ($1^{st}$ DCI) scheduling the RAR. The wireless device may consider the RA procedure to be successfully completed based on the RAR being received (and/or a preamble ID comprised in the RAR being same as the preamble transmitted by the wireless device).

In the example of FIG. 39, if the UL WUS configuration comprises an indication of search space zero and/or control resource set zero, the wireless device may monitor search space zero and control resource set zero, (indicated by the UL WUS configuration), for receiving a second DCI ($2^{nd}$ DCI) scheduling the SIB1 message of the NES cell.

In the example of FIG. 39, if the UL WUS configuration does not comprises an indication of search space zero and/or control resource set zero (or searchSpaceZero and/or ControlResoureSetZero is absent in the UL WUS configuration as shown in FIG. 33), the wireless device may monitor search space zero and control resource set zero, (indicated by the MIB message of the NES cell), for receiving a second DCI ($2^{nd}$ DCI) scheduling the SIB1 message of the NES cell.

In another example embodiment, if the UL WUS configuration does not comprises an indication of search space zero and/or control resource set zero (or searchSpaceZero and/or ControlResoureSetZero is absent in the UL WUS configuration as shown in FIG. 33), the wireless device may consider that the NES cell is barred, e.g., regardless of whether search space zero and/or control resource set zero is configured in the MIB or not.

In an example, if the UL WUS configuration does not comprises an indication of search space zero and/or control resource set zero (or searchSpaceZero and/or ControlRe-sourceSetZero is absent in the UL WUS configuration as shown in FIG. 33) and if the MIB of the NES cell does not indicate searchSpaceZero and/or ControlResourceSetZero, the wireless device may consider that the NES cell is barred and may perform a cell re-selection to other/neighbor cell.

By implementing one or more example embodiments of FIG. 39, if search space zero (and/or control resource set zero) is not configured in UL WUS configuration, the wireless device and/or the base station may be aligned on whether search space zero and/or control resource set zero configured in the MIB is used for receiving SIB1. Example embodiments may improve SIB1 acquisition latency and/or power consumption of the base station and/or the wireless device.

Figure 40:
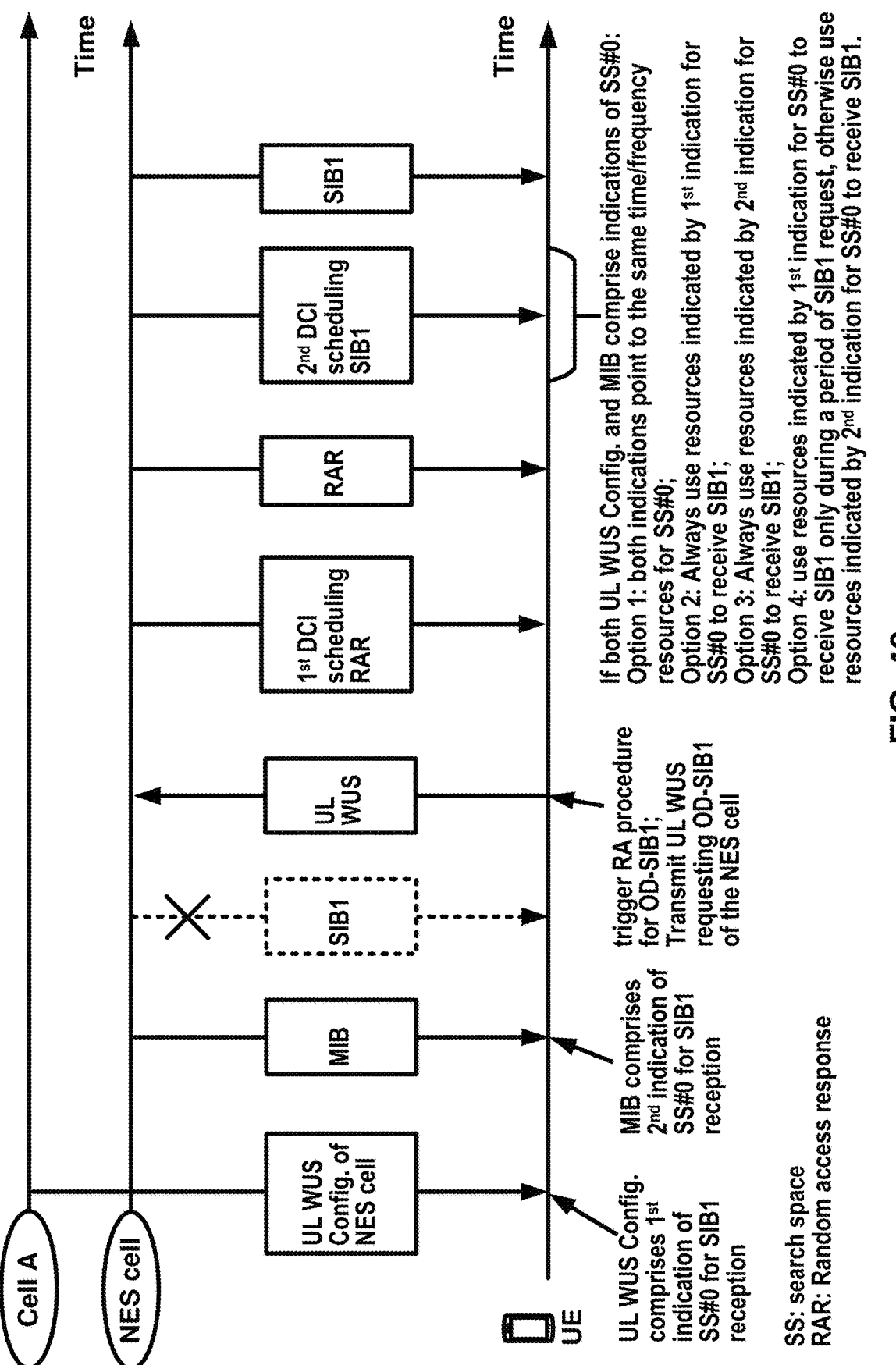
FIG. 40 illustrates an aspect of an example embodiment according to the present disclosure.

FIG. 40 shows an example embodiment of on-demand SIB1 reception, e.g., based on examples of FIG. 35, FIG. 36A, FIG. 36B, FIG. 37, FIG. 38 and/or FIG. 39.

In the example of FIG. 40, a wireless device (e.g., UE) may receive from a first cell (e.g., Cell A) UL WUS configuration of a NES cell for requesting (on-demand) SIB1 of the NES cell. The UL WUS configuration may be received via a SIB message (e.g., SIB3bis/SIB4bis/SIB26, based on examples of FIG. 33).

Although not shown in FIG. 40, the SIB message may be transmitted via the NES cell, e.g., via a SI change notification procedure, e.g., based on examples of FIG. 32.

In an example, the UL WUS configuration may comprise a first indication of search space zero (searchSpaceZero, SS #0) (and/or control resource set zero (ControlResource-SetZero) used for receiving on-demand requested SIB1 of the NES cell. The search space zero (and/or the control resource set zero) used for receiving on-demand requested SIB1 may be indicated based on examples of FIG. 36A and/or FIG. 36B.

In the example of FIG. 40, the wireless device receives MIB from the NES cell. The MIB may comprise an indication of search space zero (SS #0 in FIG. 39) (and/or control resource set zero) used for receiving SIB1 of the NES cell. The search space zero (searchSpaceZero) and/or the control resource set zero (ControlResourceSetZero) configured in the MIB may be indicated by PDCCH-Config-SIB1 of the MIB based on examples of FIG. 24A, FIG. 24B and/or FIG. 24C.

In an example, the search space zero (and/or the control resource set zero), if configured in the UL WUS configuration, may be different from the search space zero (and/or the control resource set zero) configured in the MIB message.

In an example, the search space zero (and/or the control resource set zero), if configured in the UL WUS configuration, may be same as the search space zero (and/or the control resource set zero) configured in the MIB message.

In the example of FIG. 40, the wireless device, before triggering an RA procedure for transmission of the UL WUS requesting on-demand SIB1 of the NES cell, may check whether the SIB1 is available based on example embodiments of FIG. 38. When no SIB1 is received on the NES cell, the wireless device may trigger an RA procedure for transmission(s) of the UL WUS requesting on-demand SIB1 of the NES cell, e.g., based on examples of FIG. 32 and/or FIG. 35. The wireless device may transmit a preamble/WUS configured in the UL WUS configuration.

In the example of FIG. 40, the wireless device, upon transmitting the preamble/WUS configured for on-demand SIB1 request of the NES cell, may monitor a search space of the NES cell for receiving a RAR corresponding to the preamble/WUS, based on examples of FIG. 37 and/or FIG. 38.

In the example of FIG. 40, the wireless device may receive a first DCI (1$^{st}$ DCI) scheduling the RAR. The wireless device may consider the RA procedure to be successfully completed based on the RAR being received (and/or a preamble ID comprised in the RAR being same as the preamble transmitted by the wireless device).

In the example of FIG. 40, if both the UL WUS configuration and the MIB comprise an indication of search space zero and/or control resource set zero, the wireless device may determine, based one or more options, whether to use the UL WUS configuration and/or the MIB to determine search space zero and/or control resource set zero for receiving the SIB1 message of the NES cell.

As a first option, the wireless device may determine that search space zero configured by the UL WUS is same as search space zero configured by the MIB (and/or control resource set zero configured by the UL WUS is same as control resource set zero configured by the MIB). The base station may ensure that search space zero configured by the UL WUS is same as search space zero configured by the MIB (and/or control resource set zero configured by the UL WUS is same as control resource set zero configured by the MIB). Example embodiments may allow the wireless device to determine correct resources for receiving SIB1.

As a second option, the wireless device may always use the UL WUS to determine resources of search space zero and/or control resource set zero, not use the MIB to determine resources of search space zero and/or control resource set zero, for receiving the SIB1.

As a third option, the wireless device may always use the MIB to determine resources of search space zero and/or control resource set zero, not use the UL WUS configuration to determine resources of search space zero and/or control resource set zero, for receiving the SIB1.

As a fourth option, the wireless device may only use the UL WUS configuration to determine resources of search space zero and/or control resource set zero when (e.g., in a time period when) the on-demand SIB1 request is triggered and is not completed. In an example, the time period may be indicated in the UL WUS configuration. The wireless device may use the MIB to determine resources of search space zero and/or control resource set zero for receiving SIB1 when the on-demand SIB1 request is completed and/or the requested SIB1 is received.

In an example, the base station and/or the wireless device may determine to apply one of the one or more options (by default or by indication from the base station) based on requirements of SIB1 acquisition latency, power consumption of the base station and/or the wireless device.

By implementing one or more example embodiments of FIG. 40, if search space zero (and/or control resource set zero) is configured in both UL WUS configuration and MIB message, the wireless device and/or the base station may be aligned on which search space zero and/or control resource set zero is used for receiving SIB1. Example embodiments may improve SIB1 acquisition latency and/or power consumption of the base station and/or the wireless device.

Based on one or more example embodiments of FIG. 35, FIG. 36A, FIG. 36B, FIG. 37, FIG. 38, FIG. 39 and/or FIG. 40, a wireless device receives via a first cell, a SIB message comprising configuration parameters of UL WUS configuration of a second cell, wherein the configuration parameters indicate a first SS, of the second cell, for receiving a RAR corresponding to an UL WUS requesting a SIB1 of the second cell. The wireless device receiving, via the second cell, a MIB message indicating a second SS for receiving the SIB1 of the second cell. The wireless device triggers an RA procedure for requesting the SIB1 of the second cell. The wireless device transmits, based on the initiation of the RA procedure and via the second cell, the UL WUS requesting the SIB1 of the second cell. The wireless device monitors, via the second cell, the first SS for receiving the RAR corresponding to the transmission of the UL WUS. The wireless device cancels, based on receiving the SIB1 via the second SS before receiving the RAR, the RA procedure.

Based on one or more example embodiments of FIG. 35, FIG. 36A, FIG. 36B, FIG. 37, FIG. 38, FIG. 39 and/or FIG. 40, a wireless device receives one or more messages comprising first parameters indicating a first SS, of a cell, for receiving a RAR corresponding to an UL WUS requesting a SIB1 of the cell and second parameters indicating a second SS, of the cell, for receiving the SIB1 of the cell. The wireless device transmits, based on triggering an RA procedure and via the cell, the UL WUS requesting the SIB1 of the cell. The wireless device monitors, via the cell, the first SS for receiving the RAR corresponding to the transmission of the UL WUS. The wireless device cancels, based on receiving the SIB1 via the second SS before receiving the RAR, the RA procedure.

Based on one or more example embodiments of FIG. 35, FIG. 36A, FIG. 36B, FIG. 37, FIG. 38, FIG. 39 and/or FIG. 40, a wireless device transmits, based on triggering an RA procedure on a cell, an UL WUS requesting a SIB1 of the cell. The wireless device monitors a search space zero of the cell for receiving an RAR corresponding to the transmission of the UL WUS. Before receiving the RAR and based on receiving the SIB1 scheduled by a DCI via the search space zero of the cell, the wireless device cancels the RA procedure.

According to an example embodiment, the wireless device receives, via a first cell, a SIB message comprising configuration parameters of UL WUS configuration of the cell, wherein the configuration parameters indicate the search space zero is used for receiving the RAR corresponding to an UL WUS requesting the SIB1 of the cell.

According to an example embodiment, the UL WUS is a preamble.

According to an example embodiment, the wireless device receives, via the cell, a MIB message indicating that the search space zero is used for receiving the SIB1 of the cell.

According to an example embodiment, the wireless device is in an RRC_IDLE state or in an RRC_INACTIVE state.

According to an example embodiment, the wireless device receives the SIB message via the first cell based on camping on the first cell.

According to an example embodiment, the wireless device triggers, the RA procedure on the cell for the UL WUS requesting the SIB1 of the cell, based on at least one of: a measurement of the cell being an offset value greater than the first cell, no SIB1 being received via the cell and/or the UL WUS configuration being received for the cell.

According to an example embodiment, the cancelling the RA procedure comprises, at least one of: stopping monitoring the search space zero for receiving the RAR, stopping retransmitting the UL WUS and/or considering the RA procedure successfully completed.

According to an example embodiment, the wireless device receives, via the search space zero of the cell, a DCI scheduling the SIB1 of the cell, based on the CRC of the DCI being scrambled by a SI-RNTI.

According to an example embodiment, the wireless device monitors the search space zero for receiving the DCI scheduling the SIB1 of the cell, based on the measurement of the cell being an offset value greater than the first cell and/or before the wireless device triggers the RA procedure.

According to an example embodiment, the wireless device performs a cell re-selection to the cell based on receiving the SIB1 of the cell.

According to an example embodiment, the wireless device camps on the cell based on the cell re-selection to the cell.

Based on one or more example embodiments of FIG. 35, FIG. 36A, FIG. 36B, FIG. 37, FIG. 38, FIG. 39 and/or FIG. 40, a wireless device transmits, based on triggering an RA procedure on a cell, an UL WUS requesting a SIB1 of the cell. The wireless device monitors, via the cell, a first SS for receiving a response corresponding to the transmission of the UL WUS, wherein the first SS does not overlap in an RE with an SSB or a search space zero of the cell. The wireless device receiving the response scheduled by a DCI via the first SS. The wireless device receives the SIB1 of the cell.

Based on one or more example embodiments of FIG. 35, FIG. 36A, FIG. 36B, FIG. 37, FIG. 38, FIG. 39 and/or FIG. 40, a wireless device receives a SIB message comprising configuration parameters of UL WUS configuration of a cell. The configuration parameters comprise first parameters of a search space zero for receiving a SIB1 of the cell. The wireless device receives, via the cell, a MIB message comparing second parameters of the search space zero of the cell. The wireless device transmits, based on triggering an RA procedure on the cell, the UL WUS requesting the SIB1 of the cell. The wireless device monitors, via the cell, resources of the search space zero for receiving a response corresponding to the transmission of the UL WUS. The resources are based on one of the first parameters and the second parameters.

According to an example embodiment, the wireless device determines that the resources are based on the first parameters.

According to an example embodiment, the wireless device determines that the resources are based on the second parameters.

According to an example embodiment, the wireless device determines that the resources are based on the first parameters during a period of a SIB1 request or a period of the RA procedure.

Based on one or more example embodiments of FIG. 35, FIG. 36A, FIG. 36B, FIG. 37, FIG. 38, FIG. 39 and/or FIG. 40, a wireless device receives via a first cell, a SIB message comprising configuration parameters of UL WUS configuration of a second cell. The configuration parameters indicate a first SS, of the second cell, for receiving a RAR corresponding to an UL-WUS requesting a SIB1 of the second cell. The wireless device receiving, via the second cell, a MIB message indicating a second SS. The wireless device transmits, based on initiating an RA procedure and via the second cell, the UL WUS requesting the SIB1 of the second cell. The wireless device monitors, via the second cell, the first SS for receiving the RAR corresponding to the transmission of the UL-WUS. The wireless device monitors, via the second cell, the second SS, for receiving the SIB1 of the second cell, based on the configuration parameters not indicating the second SS and the MIB message indicating the second SS.

Based on one or more example embodiments of FIG. 35, FIG. 36A, FIG. 36B, FIG. 37, FIG. 38, FIG. 39 and/or FIG. 40, a wireless device receives a SIB message comprising configuration parameters of UL WUS configuration of a cell. The wireless device transmits, based on initiating an RA procedure and via the cell, an UL WUS requesting a SIB1 of the cell. The wireless device monitors a first SS of the cell for receiving a response corresponding to the UL WUS. The wireless device monitoring a second SS of the cell, for receiving the SIB1 of the cell, wherein the second SS is determined based on: the SIB message in response to the SIB message comprising parameters of the second SS; and a MIB message, of the cell, in response to the SIB message not comprising parameters of the second SS.

Based on one or more example embodiments of FIG. 35, FIG. 36A, FIG. 36B, FIG. 37, FIG. 38, FIG. 39 and/or FIG. 40, a wireless device monitors a SS of a cell, for receiving SIB1 of the cell. The SS is determined based on at least one of: a SIB message in response to parameters of the SS being present in UL WUS configuration comprised in the SIB message; and a MIB message, of the cell, in response to the parameters of the SS not being present in the UL WUS configuration comprised in the SIB message.

Based on one or more example embodiments of FIG. 35, FIG. 36A, FIG. 36B, FIG. 37, FIG. 38, FIG. 39 and/or FIG. 40, a wireless device receives a SIB message comprising configuration parameters of UL WUS configuration of a cell, wherein the configuration parameters comprise first parameters of a search space zero for receiving a SIB1 of the cell. The wireless device receives, via the cell, a MIB message comparing second parameters of the search space zero of the cell. The wireless device transmits, based on initiating an RA procedure and via the cell, an L WUS requesting a SIB1 of the cell. The wireless device monitors a first SS of the cell for receiving a response corresponding to the UL WUS. The wireless device monitors, based on the first parameters being same as the second parameters, the search space zero of the cell, for receiving the SIB1 of the cell.

Based on one or more example embodiments of FIG. 35, FIG. 36A, FIG. 36B, FIG. 37, FIG. 38, FIG. 39 and/or FIG. 40, a wireless device receives a SIB message comprising configuration parameters of UL WUS configuration of a cell. The configuration parameters comprise first parameters of a search space zero for receiving a SIB1 of the cell. The wireless device receives, via the cell, a MIB message comparing second parameters of the search space zero of the cell. The wireless device transmits the UL WUS requesting the SIB1 of the cell. The wireless device monitors, based on the first parameters being same as the second parameters, the search space zero of the cell, for receiving the SIB1 of the cell.

The invention claimed is:

1. A method comprising:
receiving, by a wireless device, two search space zero information elements (IEs) of a second cell and two control resource set (coreset) zero IEs of the second cell, wherein:
a first search space zero IE and a first coreset zero IE of the second cell are comprised in on-demand system information block 1 (OD-SIB1) request configuration IE of a SIB26 message of a first cell; and
a second search space zero IE and a second coreset zero IE of the second cell are comprised in a master information block (MIB) message of the second cell;
transmitting, based on triggering a random access (RA) procedure on the second cell, a preamble indicating a request of the OD-SIB1 of the second cell; and monitoring, on the second cell and in response to an IE, indicating a RA search space associated with the RA procedure, being absent in the OD-SIB1 request configuration IE received via the first cell, a physical downlink control channel (PDCCH), according to the first search space zero IE and the first coreset zero IE comprised in the OD-SIB1 request configuration IE, for receiving a response corresponding to the transmitting the preamble.

2. The method of claim 1, wherein the monitoring the PDCCH is not according to the second search space zero IE and the second coreset zero IE comprised in the MIB message of the second cell.

3. The method of claim 1, wherein the wireless device monitors the PDCCH for receiving a downlink control formation (DCI) with cyclic redundancy check (CRC) bits of the DCI being scrambled by a random access radio network temporary identifier (RA-RNTI), wherein the DCI schedules a physical downlink shared channel (PDSCH) for the response.

4. The method of claim 3, further comprising, after receiving the response, monitoring the PDCCH of the second cell, according to the first search space zero IE and the first coreset zero IE, for receiving a second DCI with CRC bits of the second DCI being scrambled by a system information radio network temporary identifier (SI-RNTI).

5. The method of claim 1, wherein in response to the IE, indicating the RA search space, being present in the OD-SIB1 request configuration IE, the wireless device monitors the PDCCH on the RA search space according to the IE for receiving the response.

6. The method of claim 5, wherein the monitoring the PDCCH on the RA search space is based on none of one or more resource elements (REs), of a PDCCH candidate of the RA search space, overlapping with at least one of one or more REs of a synchronization signal block (SSB) of the second cell, wherein the SSB of the second cell is indicated in the OD-SIB1 request configuration IE of the second cell.

7. The method of claim 6, wherein the wireless device does not monitor the PDCCH on the RA search space based on at least one of the one or more REs, of the PDCCH candidate of the RA search space, overlapping with at least one of the one or more REs of the SSB of the second cell.

8. A wireless device comprising:
one or more processors; and
memory storing instructions that, when executed by the one or more processors, cause the wireless device to:
receive two search space zero information elements (IEs) of a second cell and two control resource set (coreset) zero IEs of the second cell, wherein:
a first search space zero IE and a first coreset zero IE of the second cell are comprised in on-demand system information block 1 (OD-SIB1) request configuration IE of a SIB26 message of a first cell; and
a second search space zero IE and a second coreset zero IE of the second cell are comprised in a master information block (MIB) message of the second cell;
transmit, based on triggering a random access (RA) procedure on the second cell, a preamble indicating a request of the OD-SIB1 of the second cell; and
monitor, on the second cell and in response to an IE, indicating a RA search space associated with the RA procedure, being absent in the OD-SIB1 request configuration IE received via the first cell, a physical downlink control channel (PDCCH), according to the first search space zero IE and the first coreset zero IE comprised in the OD-SIB1 request configuration IE, for receiving a response corresponding to the transmitting the preamble.

9. The wireless device of claim 8, wherein the monitoring the PDCCH is not according to the second search space zero IE and the second coreset zero IE comprised in the MIB message of the second cell.

10. The wireless device of claim 8, wherein the instructions further cause the wireless device to monitor the PDCCH for receiving a downlink control formation (DCI) with cyclic redundancy check (CRC) bits of the DCI being scrambled by a random access radio network temporary identifier (RA-RNTI), wherein the DCI schedules a physical downlink shared channel (PDSCH) for the response.

11. The wireless device of claim 10, wherein the instructions further cause the wireless device to, after receiving the response, monitor the PDCCH of the second cell according to the first search space zero IE and the first coreset zero IE, for receiving a second DCI with CRC bits of the second DCI being scrambled by a system information radio network temporary identifier (SI-RNTI).

12. The wireless device of claim 8, wherein the instructions further cause the wireless device to, in response to the IE, indicating the RA search space, being present in the OD-SIB1 request configuration IE, monitor the PDCCH on the RA search space according to the IE for receiving the response.

13. The wireless device of claim 12, wherein the monitoring the PDCCH on the RA search space is based on none of one or more resource elements (REs), of a PDCCH candidate of the RA search space, overlapping with at least one of one or more REs of a synchronization signal block (SSB) of the second cell, wherein the SSB of the second cell is indicated in the OD-SIB1 request configuration IE of the second cell.

14. The wireless device of claim 13, wherein the instructions further cause the wireless device to not monitor the PDCCH on the RA search space based on at least one of the one or more REs, of the PDCCH candidate of the RA search space, overlapping with at least one of the one or more REs of the SSB of the second cell.

15. A non-transitory computer-readable medium comprising instructions that, when executed by one or more processors of a wireless device, cause the wireless device to:
   receive two search space zero information elements (IEs) of a second cell and two control resource set (coreset) zero IEs of the second cell, wherein:
   a first search space zero IE and a first coreset zero IE of the second cell are comprised in on-demand system information block 1 (OD-SIB1) request configuration IE of a SIB26 message of a first cell; and
   a second search space zero IE and a second coreset zero IE of the second cell are comprised in a master information block (MIB) message of the second cell;
transmit, based on triggering a random access (RA) procedure on the second cell, a preamble indicating a request of the OD-SIB1 of the second cell; and
monitor, on the second cell and in response to an IE, indicating a RA search space associated with the RA procedure, being absent in the OD-SIB1 request configuration IE received via the first cell, a physical downlink control channel (PDCCH), according to the first search space zero IE and the first coreset zero IE comprised in the OD-SIB1 request configuration IE, for receiving a response corresponding to the transmitting the preamble.

16. The non-transitory computer-readable medium of claim 15, wherein the monitoring the PDCCH is not according to the second search space zero IE and the second coreset zero IE comprised in the MIB message of the second cell.

17. The non-transitory computer-readable medium of claim 15, wherein the instructions further cause the wireless device to monitor the PDCCH for receiving a downlink control formation (DCI) with cyclic redundancy check (CRC) bits of the DCI being scrambled by a random access radio network temporary identifier (RA-RNTI), wherein the DCI schedules a physical downlink shared channel (PDSCH) for the response.

18. The non-transitory computer-readable medium of claim 17, wherein the instructions further cause the wireless device to, after receiving the response, monitor the PDCCH of the second cell according to the first search space zero IE and the first coreset zero IE, for receiving a second DCI with CRC bits of the second DCI being scrambled by a system information radio network temporary identifier (SI-RNTI).

19. The non-transitory computer-readable medium of claim 15, wherein the instructions further cause the wireless device to, in response to the IE, indicating the RA search space, being present in the OD-SIB1 request configuration IE, monitor the PDCCH on the RA search space according to the IE for receiving the response.

20. The non-transitory computer-readable medium of claim 19, wherein the monitoring the PDCCH on the RA search space is based on none of one or more resource elements (REs), of a PDCCH candidate of the RA search space, overlapping with at least one of one or more REs of a synchronization signal block (SSB) of the second cell, wherein the SSB of the second cell is indicated in the OD-SIB1 request configuration IE of the second cell.

* * * * *